(12) United States Patent
Huang et al.

(10) Patent No.: US 12,422,650 B2
(45) Date of Patent: Sep. 23, 2025

(54) IMAGE CAPTURING SYSTEM LENS ASSEMBLY, IMAGING APPARATUS AND ELECTRONIC DEVICE

(71) Applicant: LARGAN PRECISION CO., LTD., Taichung (TW)

(72) Inventors: Hsin-Hsuan Huang, Taichung (TW); Meng-Kuan Cho, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 547 days.

(21) Appl. No.: 17/839,779

(22) Filed: Jun. 14, 2022

(65) Prior Publication Data

US 2023/0141883 A1 May 11, 2023

(51) Int. Cl.
G02B 9/60 (2006.01)
G02B 13/00 (2006.01)
G03B 17/17 (2021.01)

(52) U.S. Cl.
CPC ..... G02B 13/0045 (2013.01); G02B 13/0065 (2013.01); G03B 17/17 (2013.01)

(58) Field of Classification Search
CPC .............................. G02B 13/0045; G02B 9/60
See application file for complete search history.

(56) References Cited

U.S. PATENT DOCUMENTS

| | | |
|---|---|---|
| 5,005,955 A | 4/1991 | Oshita |
| 5,251,069 A | 10/1993 | Iizuka |
| 5,270,863 A | 12/1993 | Uzawa |
| 5,278,698 A | 1/1994 | Iizuka et al. |
| 5,305,147 A | 4/1994 | Hasegawa et al. |
| 9,411,135 B2 | 8/2016 | Jojiki |
| 2011/0242685 A1 | 10/2011 | Yamamoto |
| 2013/0107375 A1 | 5/2013 | Huang et al. |
| 2013/0286484 A1 | 10/2013 | Baba |
| 2013/0286488 A1* | 10/2013 | Chae ...................... G02B 13/18 359/714 |
| 2018/0129022 A1 | 5/2018 | Yao et al. |
| 2019/0293907 A1 | 9/2019 | Emi |
| 2021/0096325 A1 | 4/2021 | Wu et al. |
| 2022/0276469 A1 | 9/2022 | Chang |

FOREIGN PATENT DOCUMENTS

| | | |
|---|---|---|
| CN | 204009194 U | 12/2014 |
| CN | 105301739 B | 12/2017 |
| CN | 209070187 U | 7/2019 |
| CN | 110187476 A | 8/2019 |
| CN | 110308544 A | 10/2019 |
| CN | 111045196 A | 4/2020 |

(Continued)

*Primary Examiner* — Joseph P Martinez
(74) *Attorney, Agent, or Firm* — McClure, Qualey & Rodack, LLP

(57) ABSTRACT

An image capturing system lens assembly includes five lens elements, which are, in order from an object side to an image side along an optical path, a first lens element, a second lens element, a third lens element, a fourth lens element and a fifth lens element. Each of the five lens elements has an object-side surface towards the object side and an image-side surface towards the image side. At least one of the object-side surface and the image-side surface of at least one of the first lens element to the fifth lens element includes at least one inflection point.

41 Claims, 48 Drawing Sheets

(56) References Cited

FOREIGN PATENT DOCUMENTS

| | | | |
|---|---|---|---|
| CN | 210323548 | U | 4/2020 |
| CN | 111443469 | A | 7/2020 |
| CN | 105527694 | B | 12/2020 |
| CN | 112748518 | A | 5/2021 |
| CN | 113132583 | A | 7/2021 |
| CN | 113433655 | A | 9/2021 |
| IN | 111443469 | A | 7/2020 |
| JP | H03145614 | A | 6/1991 |
| JP | H0545582 | A | 2/1993 |
| JP | H10274739 | A | 10/1998 |
| JP | 2003344761 | A | 12/2003 |
| JP | 2010079252 | A | 4/2010 |
| JP | 2010197599 | A | 9/2010 |
| JP | 2011085744 | A | 4/2011 |
| JP | 2015034885 | A | 2/2015 |
| TW | 105301739 | B | 12/2017 |
| TW | M598410 | U | 7/2020 |
| TW | I704387 | B | 9/2020 |
| TW | 202119076 | A | 5/2021 |
| TW | I746031 | B | 11/2021 |
| WO | 2012105181 | A1 | 8/2012 |
| WO | 2021035493 | A1 | 3/2021 |

\* cited by examiner

IMAGE CAPTURING SYSTEM LENS ASSEMBLY, IMAGING APPARATUS AND ELECTRONIC DEVICE

RELATED APPLICATIONS

This application claims priority to Taiwan Application Serial Number 110141420, filed Nov. 5, 2021, which is herein incorporated by reference.

BACKGROUND

Technical Field

The present disclosure relates to an image capturing system lens assembly and an imaging apparatus. More particularly, the present disclosure relates to an image capturing system lens assembly and an imaging apparatus with compact size applicable to electronic devices.

Description of Related Art

With recent technology of semiconductor process advances, performances of image sensors are enhanced, so that the smaller pixel size can be achieved. Therefore, optical lens assemblies with high image quality have become an indispensable part of many modern electronics. With rapid developments of technology, applications of electronic devices equipped with optical lens assemblies increase and there is a wide variety of requirements for optical lens assemblies. However, in a conventional optical lens assembly, it is hard to balance among image quality, sensitivity, aperture size, volume or field of view. Thus, there is a demand for an image capturing system lens assembly that meets the aforementioned needs.

SUMMARY

According to one aspect of the present disclosure, an image capturing system lens assembly includes five lens elements, the five lens elements being, in order from an object side to an image side along an optical path, a first lens element, a second lens element, a third lens element, a fourth lens element and a fifth lens element. Each of the five lens elements has an object-side surface towards the object side and an image-side surface towards the image side. The second lens element has positive refractive power. At least one of the object-side surface and the image-side surface of at least one of the first lens element to the fifth lens element includes at least one inflection point. The image capturing system lens assembly further includes an aperture stop. When an axial distance between the aperture stop and an image surface is SL, an axial distance between the object-side surface of the first lens element and the image surface is TL, a focal length of the image capturing system lens assembly is f, a composite focal length of the third lens element and the fourth lens element is f34, a composite focal length of the fourth lens element and the fifth lens element is f45, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a curvature radius of the object-side surface of the second lens element is R3, a curvature radius of the image-side surface of the second lens element is R4, a curvature radius of the object-side surface of the third lens element is R5, a curvature radius of the image-side surface of the third lens element is R6, a central thickness of the second lens element is CT2, a central thickness of the third lens element is CT3, a central thickness of the fourth lens element is CT4, and a central thickness of the fifth lens element is CT5, the following conditions are satisfied: $0.76 < SL/TL < 1.50$; $0.82 < T12/f < 1.38$; $-1.05 < (R3+R4)/(R3-R4) < 0.70$; $-3.50 < (R5+R6)/(R5-R6) < 3.00$; $-2.50 < f/f45 < 0.88$; $-5.00 < f34/f45 < 3.60$; and $0.30 < (CT2+T23+CT3+T34+CT4+T45+CT5)/f < 2.02$.

According to one aspect of the present disclosure, an image capturing system lens assembly includes five lens elements, the five lens elements being, in order from an object side to an image side along an optical path, a first lens element, a second lens element, a third lens element, a fourth lens element and a fifth lens element. Each of the five lens elements has an object-side surface towards the object side and an image-side surface towards the image side. The second lens element has positive refractive power. At least one of the object-side surface and the image-side surface of at least one of the first lens element to the fifth len's element includes at least one inflection point. The image capturing system lens assembly further includes an aperture stop. When an axial distance between the aperture stop and an image surface is SL, an axial distance between the object-side surface of the first lens element and the image surface is TL, a focal length of the image capturing system lens assembly is f, a composite focal length of the first lens element and the second lens element is f12, a composite focal length of the first lens element, the second lens element and the third lens element is f123, a composite focal length of the second lens element, the third lens element and the fourth lens element is f234, an axial distance between the first lens element and the second lens element is T12, a curvature radius of the object-side surface of the third lens element is R5, a curvature radius of the image-side surface of the third lens element is R6, and a maximum image height of the image capturing system lens assembly is ImgH, the following conditions are satisfied: $0.74 < SL/TL < 1.05$; $0.80 < T12/f < 1.40$; $-2.70 < (R5+R6)/(R5-R6) < 2.70$; $0.40 < f/f12 < 2.00$; $-0.40 < f123/f234 < 1.85$; and $0.80 < f/ImgH < 2.25$.

According to one aspect of the present disclosure, an image capturing system lens assembly includes five lens elements, the five lens elements being, in order from an object side to an image side along an optical path, a first lens element, a second lens element, a third lens element, a fourth lens element and a fifth lens element. Each of the five lens elements has an object-side surface towards the object side and an image-side surface towards the image side. The second lens element has positive refractive power. At least one of the object-side surface and the image-side surface of at least one of the first lens element to the fifth lens element includes at least one inflection point. The image capturing system lens assembly further includes an aperture stop. When an axial distance between the aperture stop and an image surface is SL, an axial distance between the object-side surface of the first lens element and the image surface is TL, a focal length of the image capturing system lens assembly is f, a composite focal length of the third lens element and the fourth lens element is f34, a composite focal length of the fourth lens element and the fifth lens element is f45, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a maximum image height of the image capturing system lens assembly is ImgH, a central thickness of the second lens element is CT2, a central thickness of the third lens element is CT3, a central thickness of the fourth lens element is CT4, and a central thickness of the fifth lens element is CT5, the following conditions are satisfied: 0.74<T12/f<1.40; 0.74<SL/TL<1.50; −2.50<f/f45<1.04; −8.00<f34/f45<2.02; 0.80<f/ImgH<1.45; and 0.30<(CT2+T23+CT3+T34+CT4+T45+CT5)/f<3.40.

According to one aspect of the present disclosure, an imaging apparatus includes the image capturing system lens assembly of the aforementioned aspect and an image sensor, wherein the image sensor is disposed on the image surface of the image capturing system lens assembly.

According to one aspect of the present disclosure, an electronic device includes the imaging apparatus of the aforementioned aspect.

According to one aspect of the present disclosure, an image capturing system lens assembly includes five lens elements, the five lens elements being, in order from an object side to an image side along an optical path, a first lens element, a second lens element, a third lens element, a fourth lens element and a fifth lens element. Each of the five lens elements has an object-side surface towards the object side and an image-side surface towards the image side. At least one of the object-side surface and the image-side surface of at least one of the first lens element to the fifth lens element includes at least one inflection point; at least one of the first lens element to the fifth lens element is made of plastic material and has the object-side surface and the image-side surface being both aspheric. The image capturing system lens assembly further includes an aperture stop. When an axial distance between the aperture stop and an image surface is SL, an axial distance between the object-side surface of the first lens element and the image surface is TL, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a maximum among T12, T23, T34, T45 is ATmax, an axial distance between the image-side surface of the fifth lens element and the image surface is BL, a focal length of the image capturing system lens assembly is f, a focal length of the second lens element is f2, a focal length of the third lens element is f3, and a curvature radius of the object-side surface of the first lens element is R1, the following conditions are satisfied: 0.75<SL/TL<1.50; 0.78<ATmax/f<9.00; 1.50<ATmax/BL<7.00; 1.00<<5.00; −5.00<f/R1<0.45; −0.60<f/f2<3.00; and −2.00<f/f3<0.85.

According to one aspect of the present disclosure, an imaging apparatus includes the image capturing system lens assembly of the aforementioned aspect and an image sensor, wherein the image sensor is disposed on the image surface of the image capturing system lens assembly.

According to one aspect of the present disclosure, an electronic device includes the imaging apparatus of the aforementioned aspect.

According to one aspect of the present disclosure, an image capturing system lens assembly includes five lens elements, the five lens elements being, in order from an object side to an image side along an optical path, a first lens element, a second lens element, a third lens element, a fourth lens element and a fifth lens element. Each of the five lens elements has an object-side surface towards the object side and an image-side surface towards the image side. At least one of the object-side surface and the image-side surface of at least one of the first lens element to the fifth lens element includes at least one inflection point. The image capturing system lens assembly further includes an aperture stop. When an axial distance between the aperture stop and an image surface is SL, an axial distance between the object-side surface of the first lens element and the image surface is TL, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a maximum among T12, T23, T34, T45 is ATmax, an axial distance between the image-side surface of the fifth lens element and the image surface is BL, a focal length of the image capturing system lens assembly is f, and a focal length of the second lens element is f2, the following conditions are satisfied: 0.75<SL/TL<1.50; 0.78<ATmax/f<9.00; 2.00<ATmax/BL<7.00; 2.60<TL/f<5.00; 0<T45/f<0.90; and −0.60<f/f2<3.00.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1A:
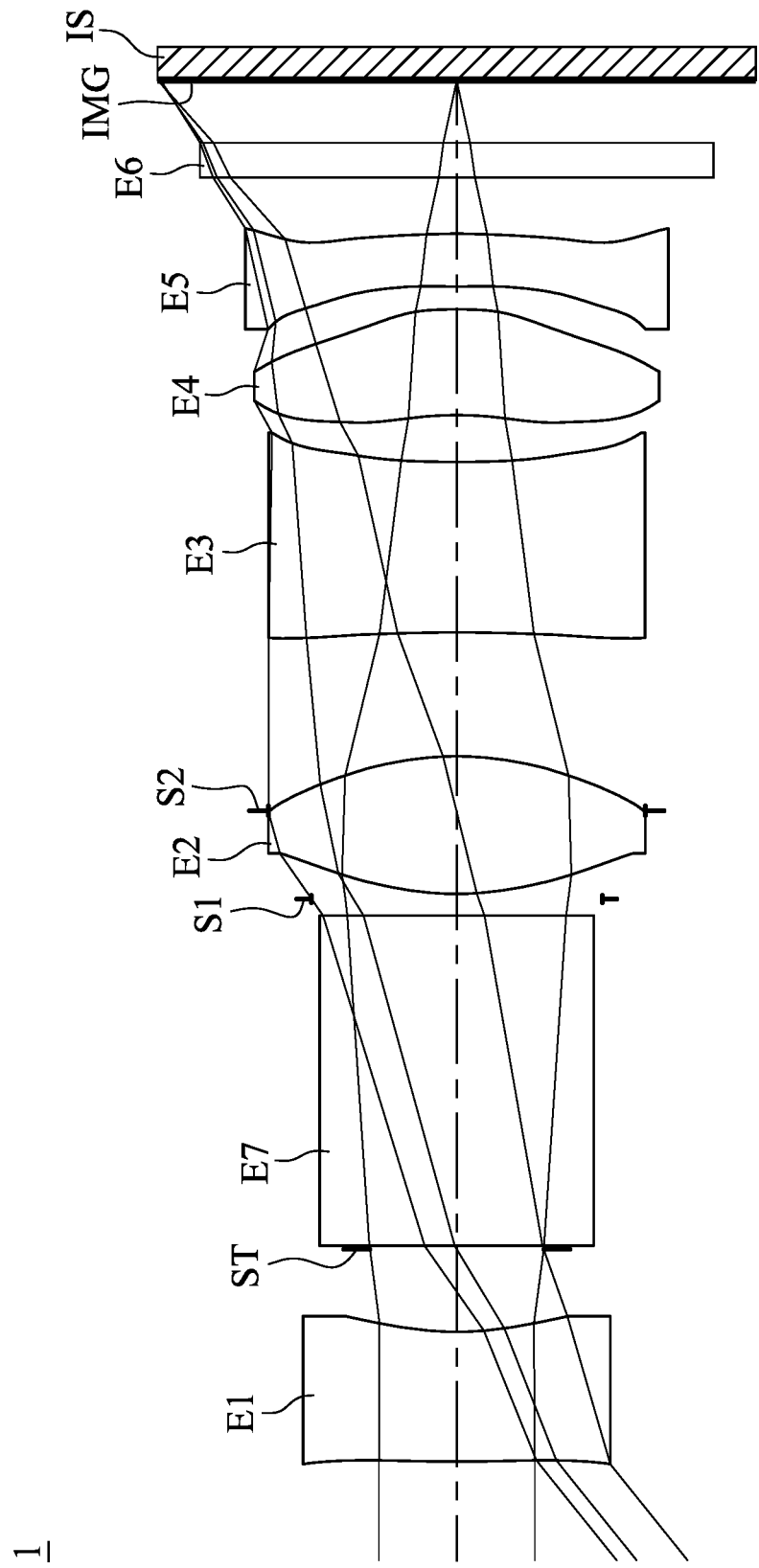
FIG. 1A is a schematic view of an imaging apparatus according to the 1st embodiment of the present disclosure.

The present disclosure provides an image capturing system lens assembly, which includes five lens elements. The five lens elements are, in order from an object side to an image side along an optical path, a first lens element, a second lens element, a third lens element, a fourth lens element and a fifth lens element. Each of the five lens elements has an object-side surface towards the object side and an image-side surface towards the image side. There can be an air gap between each of adjacent lens elements of the five lens elements. Therefore, the contact between adjacent lens elements can be avoided, so that the manufacture of lens elements and the difficulty of assembling can be reduced so as to increase the yield rate.

The object-side surface of the first lens element can be concave in a paraxial region thereof, which is favorable for enlarging field of view and reducing the effective radius of the first lens element.

The second lens element can have positive refractive power, so that it is favorable for reducing the effective radius of the image capturing system lens assembly by cooperating with the first lens element. The object-side surface of the second lens element can be convex in a paraxial region thereof, so that it is favorable for correcting aberrations by adjusting the surface shape and refractive power of the second lens element. The image-side surface of the second lens element can be convex in a paraxial region thereof, so that it is favorable for enhancing the image quality in the central area by cooperating with the surface shape of the third lens element.

The third lens element can have negative refractive power, which is favorable for correcting aberrations, such as spherical aberrations etc. by cooperating with the fourth lens element.

The image-side surface of the fourth lens element can be convex in a paraxial region thereof, which is favorable for enhancing light converging quality in the paraxial region of the image capturing system lens assembly.

The image-side surface of the fifth lens element is concave in a paraxial region thereof, so that it is favorable for reducing the total track length of the image capturing system lens assembly by adjusting the back focal length thereof. Further, the image-side surface of the fifth lens element can include at least one critical point. Therefore, it is favorable for correcting the distortion of the peripheral field.

At least one of the object-side surface and the image-side surface of at least one of the first lens element to the fifth lens element includes at least one inflection point. Therefore, it is favorable for enlarging the size of the image surface and reducing field curvature.

At least one of the first lens element to the fifth lens element can be made of plastic material and can have the object-side surface and the image-side surface being both aspheric. Therefore, it is favorable for reducing the manufacturing cost and enhancing the image quality of the peripheral field.

The first lens element belongs to a front lens group, the second lens element, the third lens element, the fourth lens element and the fifth lens element belong to a rear lens group, there is a relative displacement between the rear lens group and the front lens group. Therefore, the focusing position can be more ideal during capturing the image with different object distances so as to enhance the image quality. In detailed, the displacing way of the rear lens group can be the displacement parallel to the optical axis, the displacement perpendicular with the optical axis, rotation etc., and the present disclosure will not be limited thereto. Further, there is a relative displacement between the first lens element and the fifth lens element. Therefore, the relative position of the first lens element and the fifth lens element can be adjusted so as to provide different focal lengths for image capturing.

The image capturing system lens assembly can further include a reflective element, which can be disposed between the first lens element and the fifth lens element. Therefore, it is favorable for obtaining compact size of the image capturing system lens assembly by folding the optical axis. Specifically, the reflective element can be prism, mirror etc., and will not be limited thereto. When the reflective element is prism, which can be made of glass or plastic etc. The incident surface of the prism can be planar or curved. The exiting surface of the prism can be planar or curved.

The image capturing system lens assembly can further include an aperture stop. When an axial distance between the aperture stop and the image surface is SL, and an axial distance between the object-side surface of the first lens element and the image surface is TL, the following condition is satisfied: $0.74<SL/TL<1.50$. Therefore, it is favorable for balancing the image size and the size of the front opening of the image capturing system lens assembly by adjusting the distance between the aperture stop and the image surface. Further, the following condition can be satisfied: $0.75<SL/TL<1.50$. Furthermore, the following condition can be satisfied: $0.76<SL/TL<1.50$. Moreover, the following condition can be satisfied: $0.74<SL/TL<1.05$. Furthermore, the following condition can be satisfied: $0.80<SL/TL<0.98$.

When an axial distance between the first lens element and the second lens element is T12, and a focal length of the image capturing system lens assembly is f, the following condition is satisfied: $0.74<T12/f<1.40$. Therefore, it is favorable for balancing the distribution of the volume of the image capturing system lens assembly by adjusting the arrangement of the lens elements. Further, the following condition can be satisfied: $0.80<T12/f<1.40$. Furthermore, the following condition can be satisfied: $0.82<T12/f<1.38$. Moreover, the following condition can be satisfied: $0.90<T12/f<1.20$.

When a curvature radius of the object-side surface of the second lens element is R3, and a curvature radius of the image-side surface of the second lens element is R4, the following condition is satisfied: $-1.05<(R3+R4)/(R3-R4)<0.70$. Therefore, it is favorable for reducing the effective radius of the second lens element by adjusting the surface shape and the refractive power of the second lens element. Further, the following condition can be satisfied: $-1.00<(R3+R4)/(R3-R4)<1.50$. Furthermore, the following condition can be satisfied: $-0.80<(R3+R4)/(R3-R4)<1.50$. Moreover, the following condition can be satisfied: $-0.80<(R3+R4)/(R3-R4)<0.50$.

When a curvature radius of the object-side surface of the third lens element is R5, and a curvature radius of the image-side surface of the third lens element is R6, the following condition is satisfied: $-3.50<(R5+R6)/(R5-R6)<3.00$. Therefore, it is favorable for enhancing the image quality of the central area by cooperating the third lens element with the second lens element. Further, the following condition can be satisfied: $-2.70<(R5+R6)/(R5-R6)<2.70$. Furthermore, the following condition can be satisfied: $-2.40<(R5+R6)/(R5-R6)<2.50$.

When the focal length of the image capturing system lens assembly is f, and a composite focal length of the fourth lens element and the fifth lens element is f45, the following condition is satisfied: $-2.50<f/f45<1.04$. Therefore, it is favorable for adjusting the back focal length by arranging the entire focal length of the fourth lens element and the fifth lens element. Further, the following condition can be satisfied: $-2.50<f/f45<0.88$; or $-2.00<f/f45<0.88$. Furthermore, the following condition can be satisfied: $-1.00<f/f45<0.70$.

When a composite focal length of the third lens element and the fourth lens element is f34, and the composite focal length of the fourth lens element and the fifth lens element is f45, the following condition is satisfied: $-5.00<f34/f45<3.60$. Therefore, the entire focal length of the third lens element and the fourth lens element and the entire focal length of the fourth lens element and the fifth lens element can be adjusted, so that it is favorable for enhancing the light converging quality in the paraxial region by arranging the ratio of the refractive power of the rear end of the image capturing system lens assembly. Further, the following condition can be satisfied: $-8.00<f34/f45<2.02$. Furthermore, the following condition can be satisfied: $-4.00<f34/f45<1.7$.

When the focal length of the image capturing system lens assembly is f, an axial distance between the second lens element and the third lens element is T23, an axial distance between the third lens element and the fourth lens element is T34, an axial distance between the fourth lens element and the fifth lens element is T45, a central thickness of the second lens element is CT2, a central thickness of the third lens element is CT3, a central thickness of the fourth lens element is CT4, and a central thickness of the fifth lens element is CT5, the following condition is satisfied: $0.30<(CT2+T23+CT3+T34+CT4+T45+CT5)/f<3.40$. Therefore, it is favorable for reducing the total track length of the image capturing system lens assembly by adjusting the ratio between the total track length from the object-side surface of the second lens element to the image-side surface of the fifth lens element and the focal length. Further, the following condition can be satisfied: $0.30<(CT2+T23+CT3+T34+CT4+T45+CT5)/f<2.02$.

When the focal length of the image capturing system lens assembly is f, and a composite focal length of the first lens element and the second lens element is f12, the following condition is satisfied: $0.40<f/f12<2.00$. Therefore, it is favorable for correcting the astigmatism of aberrations by adjusting the entire focal length of the first lens element and the second lens element. Further, the following condition can be satisfied: $0.60<f/f12<1.50$.

When a composite focal length of the first lens element, the second lens element and the third lens element is f123, and a composite focal length of the second lens element, the third lens element and the fourth lens element is f234, the following condition is satisfied: $-0.40<f123/f234<1.85$. Therefore, the entire refractive of the first lens element to the third lens element and the entire refractive of the second lens element to the fourth lens element can be adjusted, so that excessive geometric differences among the lens elements can be avoided by decreasing the ratio of refractive power so as to reduce the manufacturing difficulty. Further, the following condition can be satisfied: $-0.20<f123/f234<1.60$.

When the focal length of the image capturing system lens assembly is f, and a maximum image height of the image capturing system lens assembly is ImgH, the following condition is satisfied: $0.80<f/ImgH<2.25$. Therefore, it is favorable for maintaining the image size by adjusting the ratio between the focal length and the image height. Further, the following condition can be satisfied: $0.80<f/ImgH<1.45$. Furthermore, the following condition can be satisfied: $0.90<f/ImgH<2.10$.

When the axial distance between the first lens element and the second lens element is T12, the axial distance between the second lens element and the third lens element is T23, the axial distance between the third lens element and the fourth lens element is T34, the axial distance between the fourth lens element and the fifth lens element is T45, the maximum among T12, T23, T34, T45 is ATmax, and the focal length of the image capturing system lens assembly is f, the following condition is satisfied: $0.78<ATmax/f<9.00$. Therefore, it is favorable for balancing the ratio of the distances among the lens elements and reducing the assembling error by adjusting the ratio between the focal length and the maximum distance between the lens elements. Further, the following condition can be satisfied: $0.85<ATmax/f<2.0$.

When the axial distance between the first lens element and the second lens element is T12, the axial distance between the second lens element and the third lens element is T23, the axial distance between the third lens element and the fourth lens element is T34, the axial distance between the fourth lens element and the fifth lens element is T45, the maximum among T12, T23, T34, T45 is ATmax, and an axial distance between the image-side surface of the fifth lens element and the image surface is BL, the following condition is satisfied: $1.50<ATmax/BL<7.00$. Therefore, it is favorable for balancing the ratio of the distances among the lens elements and reducing the assembling error by adjusting the ratio between the back focal length and the maximum distance between the lens elements. Further, the following condition can be satisfied: $2.00<ATmax/BL<7.00$. Furthermore, the following condition can be satisfied: $2.0<ATmax/BL<3.5$.

When the axial distance between the object-side surface of the first lens element and the image surface is TL, and the focal length of the image capturing system lens assembly is f, the following condition is satisfied: $1.00<TL/f<5.00$. Therefore, it is favorable for balancing the compression of the total track length and the expansion of the image surface, and also favorable for enlarging field of view. Further, the following condition can be satisfied: $2.60<TL/f<5.00$.

When the focal length of the image capturing system lens assembly is f, and a curvature radius of the object-side surface of the first lens element is R1, the following condition is satisfied: $-5.00<f/R1<0.45$. Therefore, it is favorable for enlarging field of view by adjusting refractive power of the image capturing system lens assembly and the surface shape of the first lens element. Further, the following condition can be satisfied: $-2.50<f/R1<0.35$.

When the focal length of the image capturing system lens assembly is f, and a focal length of the second lens element is f2, the following condition is satisfied: $-0.60<f/f2<3.00$. Therefore, it is favorable for enhancing light converging quality by adjusting refractive power of the second lens element. Further, the following condition can be satisfied: $-0.30<f/f2<2.0$. Furthermore, the following condition can be satisfied: $0.30<f/f2<1.80$.

When the focal length of the image capturing system lens assembly is f, and a focal length of the third lens element is f3, the following condition is satisfied: $-2.00<f/f3<0.85$. Therefore, it is favorable for reducing spherical aberration by adjusting refractive power of the third lens element and cooperating with the fourth lens element. Further, the following condition can be satisfied: $-1.50<f/f3<0$.

When the axial distance between the fourth lens element and the fifth lens element is T45, and the focal length of the image capturing system lens assembly is f, the following condition is satisfied: $0<T45/f<0.90$. Therefore, it is favorable for balancing the ratio between the total track length and the back focal length by adjusting the ratio of distance between the fourth lens element and the fifth lens element to the focal length. Further, the following condition can be satisfied: $0<T45/f<0.60$. Furthermore, the following condition can be satisfied: $0<T45/f<0.30$. Moreover, the following condition can be satisfied: $0<T45/f<0.10$.

When a maximum field of view of the image capturing system lens assembly is FOV, the following condition is satisfied: 50 degrees<FOV<120 degrees. Therefore, the image capturing system lens assembly can obtain characteristic of wide field of view, and aberrations, such as distortion etc., due to the excessive field of view can be reduced. Further, the following condition can be satisfied: 65 degrees<FOV<105 degrees.

When the axial distance between the second lens element and the third lens element is T23, the axial distance between the third lens element and the fourth lens element is T34, the axial distance between the fourth lens element and the fifth lens element is T45, and a sum of all axial distances between adjacent lens elements of the image capturing system lens assembly is ΣAT, the following condition is satisfied: $0.10<(T23+T34+T45)/ΣAT<0.50$. Therefore, it is favorable for reducing the total track length of the image capturing system lens assembly by adjusting the distance ratio among the second lens element to the fifth lens element. Further, the following condition can be satisfied: $0.12<(T231+T34+T45)/ΣAT<0.5$.

When a maximum distance between an optical effective region of the object-side surface of the first lens element and the optical axis is Y11, and a maximum distance between an optical effective region of the image-side surface of the fifth lens element and the optical axis is Y52, the following condition is satisfied: $0.90<Y52/Y11<2.10$. Therefore, it is favorable for compressing the volume and increasing the compactness of the electronic device by adjusting the effective radius of each of the first lens element and the fifth lens element. Further, the following condition can be satisfied:

1.00<Y52/Y11<2.00. Furthermore, the following condition can be satisfied: 1.10<Y52/Y11<2.00. Moreover, the following condition can be satisfied: 1.20<Y52/Y11<1.80.

When the focal length of the image capturing system lens assembly is f, and the curvature radius of the object-side surface of the second lens element is R3, the following condition is satisfied: 0.70<f/R3<1.81. Therefore, it is favorable for reducing the effective radius of the second lens element by adjusting the refractive power of the image capturing system lens assembly and the surface shape of the second lens element.

When the focal length of the image capturing system lens assembly is f, and the curvature radius of the image-side surface of the second lens element is R4, the following condition is satisfied: −2.50<f/R4<−0.50. Therefore, it is favorable for correcting spherical aberration of the central field by adjusting refractive power of the image capturing system lens assembly and the surface shape of the second lens element. Further, the following condition can be satisfied: −2.70<f/R4<−0.40.

When a curvature radius of the object-side surface of the fourth lens element is R7, and a curvature radius of the image-side surface of the fourth lens element is R8, the following condition is satisfied: −1.00<(R7−R8)/(R7+R8) <1.00. Therefore, the surface shape and refractive power of the fourth lens element can be adjusted so as to improve chromatic aberration of the central region.

When a refractive index of the third lens element is N3, and a refractive index of the fifth lens element is N5, the following condition is satisfied: 1.60<(N3+N5)/2<1.90. Therefore, the average of the refractive indices of the third lens element and the fifth lens element can be adjusted so as to expand the image size.

When the axial distance between the first lens element and the second lens element is T12, and the maximum image height of the image capturing system lens assembly is ImgH, the following condition is satisfied: 0.90<T12/ImgH<1.90. Therefore, it is convenient for disposing other optical elements among the lens elements by adjusting the arrangement of the lens elements.

When an f-number of the image capturing system lens assembly is Fno, the following condition is satisfied: 1.60<Fno<2.5. Therefore, it is favorable for balancing the illumination and the depth of field.

When the curvature radius of the object-side surface of the first lens element is R1, and the curvature radius of the image-side surface of the first lens element is R2, the following condition is satisfied: −1.00<(R1−R2)/(R1+R2) <1.00. Therefore, it is favorable for increasing field of view by adjusting the focal length of the lens elements on the front end of the image capturing system lens assembly.

When the axial distance between the aperture stop and the image surface is SL, the axial distance between the object-side surface of the first lens element and the image surface is TL, and the focal length of the image capturing system lens assembly is f, the following condition is satisfied: 0.30<(TL−SL)/f<0.85. Therefore, it is favorable for balancing the length of the front end of the image capturing system lens assembly and field of view by adjusting the distance between the opening of the image capturing system lens assembly and the aperture stop. Further, the following condition can be satisfied: 0.45<(TL−SL)/f<0.71.

When the maximum distance between the optical effective region of the object-side surface of the first lens element and the optical axis is Y11, the axial distance between the first lens element and the second lens element is T12, the axial distance between the second lens element and the third lens element is T23, the axial distance between the third lens element and the fourth lens element is T34, the axial distance between the fourth lens element and the fifth lens element is T45, and the maximum among T12, T23, T34, T45 is ATmax, the following condition is satisfied: 1.80<ATmax/Y11<3.40. Therefore, it is favorable for reducing the opening size and screen-to-body ratio by adjusting the ratio between the effective radius of the first lens element and the maximum distance between the lens elements. Further, the following condition can be satisfied: 2.00<ATmax/Y11<3.00.

When the maximum distance between the optical effective region of the object-side surface of the first lens element and the optical axis is Y11, and the maximum image height of the image capturing system lens assembly is ImgH, the following condition is satisfied: 0.34<Y11/ImgH<0.70. Therefore, it is favorable for enhancing the compactness of the electronic device and reducing screen-to-body ratio by adjusting the ratio between the opening of the image capturing system lens assembly and the image size. Further, the following condition can be satisfied: 0.42<Y11/ImgH<0.62.

When a central thickness of the first lens element is CT1, the central thickness of the second lens element is CT2, the central thickness of the third lens element is CT3, the central thickness of the fourth lens element is CT4, the central thickness of the fifth lens element is CT5, and a maximum among CT1, CT2, CT3, CT4, CT5 is CTmax, the following condition is satisfied: 0.50<CT1/CTmax≤1.0. Therefore, it is favorable for reducing the effective radius of the second lens element and the thickness of the electronic device by adjusting the ratio between the thickness of the first lens element and the maximum thickness. Further, the following condition can be satisfied: 0.70<CT1/CTmax≤1.0. Furthermore, the following condition can be satisfied: 0.80<CT1/CTmax≤1.0.

When an Abbe number of one of the lens elements is Vi, and a refractive index of the lens element is Ni, at least one of the five lens elements satisfies the following condition: 5.0<Vi/Ni<11.9, wherein i=1, 2, 3, 4, 5. Therefore, it is favorable for adjusting chromatic aberration of the peripheral field and enhancing the image size.

Each of the aforementioned features of the image capturing system lens assembly can be utilized in various combinations for achieving the corresponding effects.

According to the image capturing system lens assembly of the present disclosure, the lens elements thereof can be made of glass or plastic materials. When the lens elements are made of glass materials, the distribution of the refractive power of the image capturing system lens assembly may be more flexible to design. The glass lens element can either be made by grinding or molding. When the lens elements are made of plastic materials, manufacturing costs can be effectively reduced. Furthermore, surfaces of each lens element can be arranged to be aspheric (ASP), since the aspheric surface of the lens element is easy to form a shape other than a spherical surface so as to have more controllable variables for eliminating aberrations thereof, and to further decrease the required amount of lens elements in the image capturing system lens assembly. Therefore, the total track length of the image capturing system lens assembly can also be reduced. The aspheric surfaces may be formed by a plastic injection molding method, a glass molding method or other manufacturing methods.

According to the image capturing system lens assembly of the present disclosure, additives can be selectively added into any one (or more) material of the lens elements so as to change the transmittance of the lens element in a particular wavelength range. Therefore, the stray light and chromatic aberration can be reduced. For example, the additives can have the absorption ability for light in a wavelength range of 600 nm-800 nm in the image capturing system lens assembly so as to reduce extra red light or infrared light, or the additives can have the absorption ability for light in a wavelength range of 350 nm-450 nm in the image capturing system lens assembly so as to reduce blue light or ultraviolet light. Therefore, additives can prevent the image from interfering by light in a particular wavelength range. Furthermore, the additives can be homogeneously mixed with the plastic material, and the lens elements can be made by the injection molding method. Moreover, the additives can be coated on the lens surfaces to provide the aforementioned effects.

According to the image capturing system lens assembly of the present disclosure, when a surface of the lens element is aspheric, it indicates that entire optical effective region of the surface of the lens element or a part thereof is aspheric.

According to the image capturing system lens assembly of the present disclosure, when the lens elements have surfaces being convex and the convex surface position is not defined, it indicates that the aforementioned surfaces of the lens elements can be convex in the paraxial region thereof. When the lens elements have surfaces being concave and the concave surface position is not been defined, it indicates that the aforementioned surfaces of the lens elements can be concave in the paraxial region thereof. In the image capturing system lens assembly of the present disclosure, if the lens element has positive refractive power or negative refractive power, or the focal length of the lens element, all can be referred to the refractive power, or the focal length, in the paraxial region of the lens element.

According to the image capturing system lens assembly of the present disclosure, a critical point is a non-axial point of the lens surface where its tangent is perpendicular to the optical axis; an inflection point is a point on a lens surface with a curvature changing from positive to negative or from negative to positive.

According to the image capturing system lens assembly of the present disclosure, the image surface thereof, based on the corresponding image sensor, can be flat or curved. In particular, the image surface can be a concave curved surface facing towards the object side. Furthermore, the image capturing system lens assembly of the present disclosure can selectively include at least one image correcting element (such as a field flattener) inserted between the lens element closest to the image surface and the image surface, thus the effect of correcting image aberrations (such as field curvature) can be achieved. The optical properties of the aforementioned image correcting element, such as curvature, thickness, refractive index, position, surface shape (convex or concave, spherical or aspheric, diffraction surface and Fresnel surface, etc.) can be adjusted corresponding to the demands of the imaging apparatus. Generally, a preferred configuration of the image correcting element is to dispose a thin plano-concave element having a concave surface toward the object side on the position closed to the image surface.

Figure 31A:
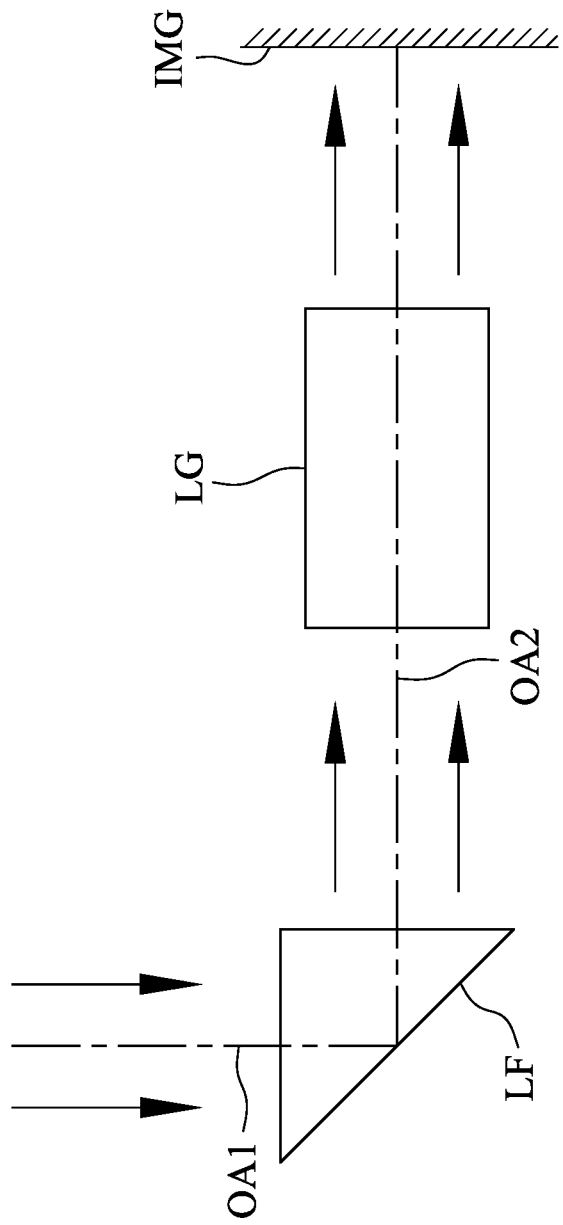
FIG. 31A is a schematic view of an arrangement of a light path folding element in the image capturing system lens assembly of the present disclosure.
Figure 31B:
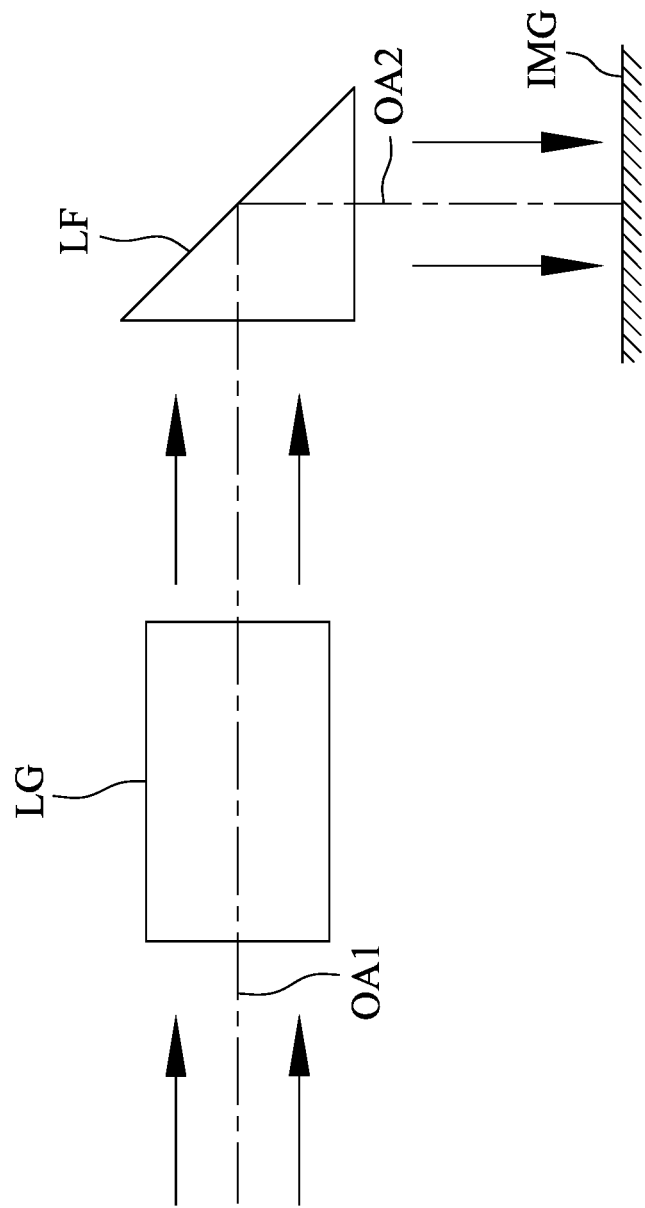
FIG. 31B is a schematic view of another arrangement of the light path folding element in the image capturing system lens assembly of the present disclosure.
Figure 31C:
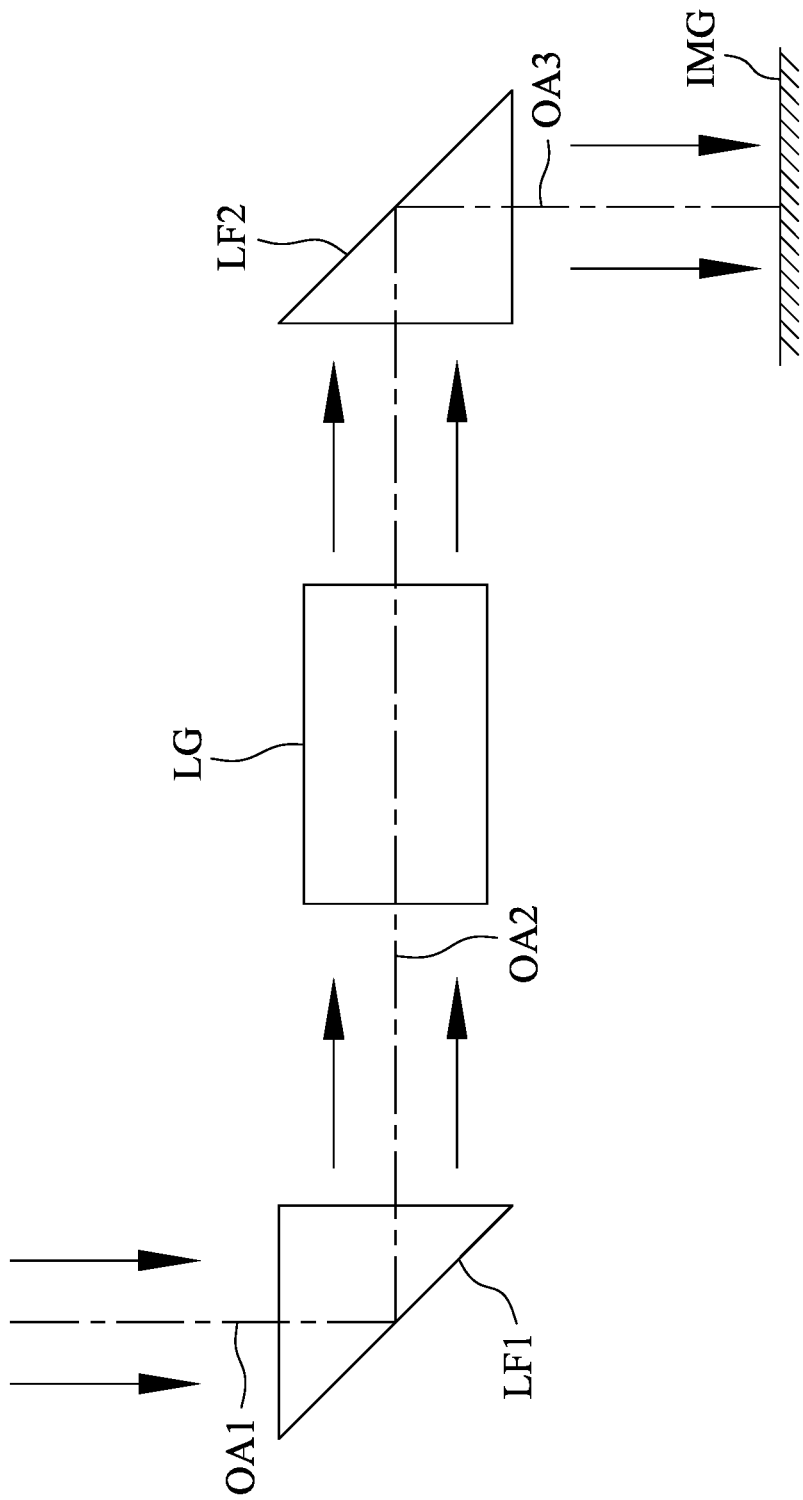
FIG. 31C is a schematic view of an arrangement of two light path folding elements in the image capturing system lens assembly of the present disclosure.

According to the image capturing system lens assembly of the present disclosure, at least one element with light path folding function can be selectively disposed between the imaged object and the image surface, such as a prism or a mirror, etc. Therefore it is favorable for providing high flexible space arrangement of the image capturing system lens assembly, so that the compactness of the electronic device would not be restricted by the optical total track length of the image capturing system lens assembly. FIG. 31A is a schematic view of an arrangement of a light path folding element LF in the image capturing system lens assembly of the present disclosure. FIG. 31B is a schematic view of another arrangement of the light path folding element LF in the image capturing system lens assembly of the present disclosure. As shown in FIGS. 31A and 31B, the image capturing system lens assembly includes, in order from an imaged object (not shown in drawings) to an image surface IMG, a first optical axis OA1, the light path folding element LF and a second optical axis OA2, wherein the light path folding element LF can be disposed between the imaged object and a lens group LG of the image capturing system lens assembly as shown in FIG. 31A, or can be disposed between the lens group LG of the image capturing system lens assembly and the image surface IMG as shown in FIG. 31B. Moreover, FIG. 31C is a schematic view of an arrangement of two light path folding elements LF1, LF2 in the image capturing system lens assembly of the present disclosure. As shown in FIG. 31C, the image capturing system lens assembly includes, in order from an imaged object (not shown in drawings) to an image surface IM, a first optical axis OA1, the light path folding element LF1, a second optical axis OA2, the light path folding element LF2 and a third optical axis OA3, wherein the light path folding element LF1 is disposed between the imaged object and a lens group LG of the image capturing system lens assembly, and the light path folding element LF2 is disposed between the lens group LG of the image capturing system lens assembly and the image surface IMG. The image capturing system lens assembly can also be selectively disposed with three or more light path folding element, the type, amount and location of the light path folding element will not be limited to the present disclosure.

Furthermore, according to the image capturing system lens assembly of the present disclosure, the image capturing system lens assembly can include at least one stop, such as an aperture stop, a glare stop or a field stop, for eliminating stray light and thereby improving image resolution thereof.

According to the image capturing system lens assembly of the present disclosure, the aperture stop can be configured as a front stop or a middle stop, wherein the front stop indicates that the aperture stop is disposed between an object and the first lens element, and the middle stop indicates that the aperture stop is disposed between the first lens element and the image surface. When the aperture stop is a front stop, a longer distance between an exit pupil of the image capturing system lens assembly and the image surface can be obtained, and thereby obtains a telecentric effect and improves the image-sensing efficiency of the image sensor, such as CCD or CMOS. The middle stop is favorable for enlarging the field of view of the image capturing system lens assembly and thereby provides a wider field of view for the same.

According to the image capturing system lens assembly of the present disclosure, an aperture control unit can be properly configured. The aperture control unit can be a mechanical element or a light controlling element, and the dimension and the shape of the aperture control unit can be electrically controlled. The mechanical element can include a moveable component such a blade group or a shielding plate. The light controlling element can include a screen component such as a light filter, an electrochromic material, a liquid crystal layer or the like. The amount of incoming light or the exposure time of the image can be controlled by the aperture control unit to enhance the image moderation ability. In addition, the aperture control unit can be the aperture stop of the image capturing system lens assembly according to the present disclosure, so as to moderate the image quality by changing f-number such as changing the depth of field or the exposure speed.

According to the image capturing system lens assembly of the present disclosure, the image capturing system lens assembly of the present disclosure can be applied to 3D (three-dimensional) image capturing applications, in products such as digital cameras, mobile devices, digital tablets, smart TVs, surveillance systems, motion sensing input devices, driving recording systems, rearview camera systems, wearable devices, unmanned aerial vehicles, and other electronic imaging products.

According to the present disclosure, an imaging apparatus including the aforementioned image capturing system lens assembly and an image sensor is provided, wherein the image sensor is disposed on the image surface of the image capturing system lens assembly. By the arrangement of the aperture stop and the image surface, it is favorable for balancing the image size and the size of the front opening of the image capturing system lens assembly. Moreover, the imaging apparatus can further include a barrel member, a holder member or a combination thereof.

According to the present disclosure, an electronic device including the aforementioned imaging apparatus is provided. Therefore, the image quality can be increased. Moreover, the electronic device can further include a control unit, a display, a storage unit, a random-access memory unit (RAM) or a combination thereof.

According to the above description of the present disclosure, the following specific embodiments are provided for further explanation.

1st Embodiment

Figure 2:
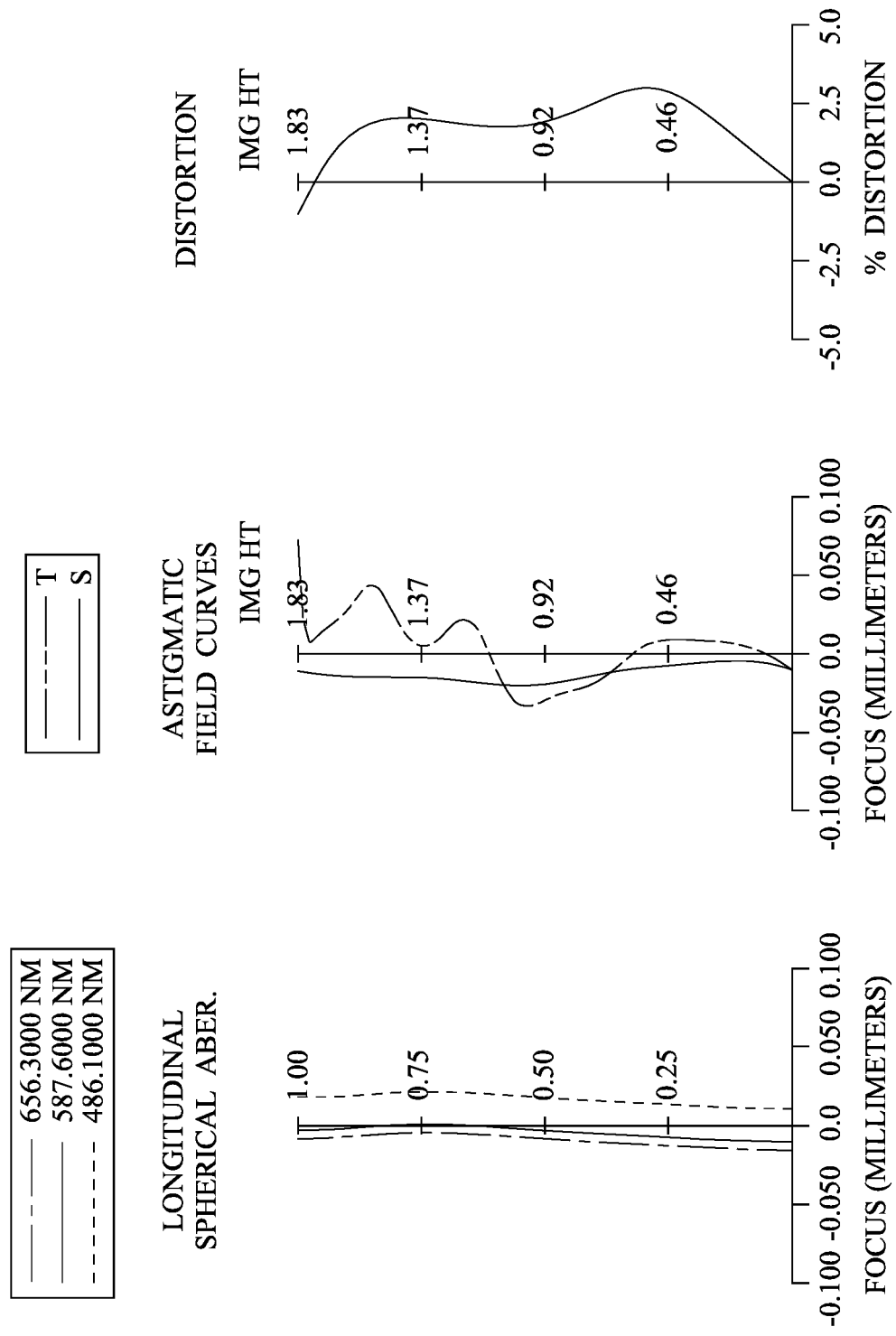
FIG. 2 shows spherical aberration curves, astigmatic field curves and a distortion curve of the imaging apparatus according to the 1st embodiment.

FIG. 1A is a schematic view of an imaging apparatus 1 according to the 1st embodiment of the present disclosure. FIG. 2 shows spherical aberration curves, astigmatic field curves and a distortion curve of the imaging apparatus 1 according to the 1st embodiment. In FIG. 1A, the imaging apparatus 1 includes an image capturing system lens assembly (its reference numeral is omitted) and an image sensor IS. The image capturing system lens assembly includes, in order from an object side to an image side along an optical path, a first lens element E1, an aperture stop ST, a reflective element E7, a stop S1, a second lens element E2, a stop S2, a third lens element E3, a fourth lens element E4, a fifth lens element E5, a filter E6 and an image surface IMG, wherein the image sensor IS is disposed on the image surface IMG of the image capturing system lens assembly. The image capturing system lens assembly includes five lens elements (E1, E2, E3, E4, E5) without additional one or more lens elements inserted between the first lens element E1 and the fifth lens element E5.

Figure 23A:
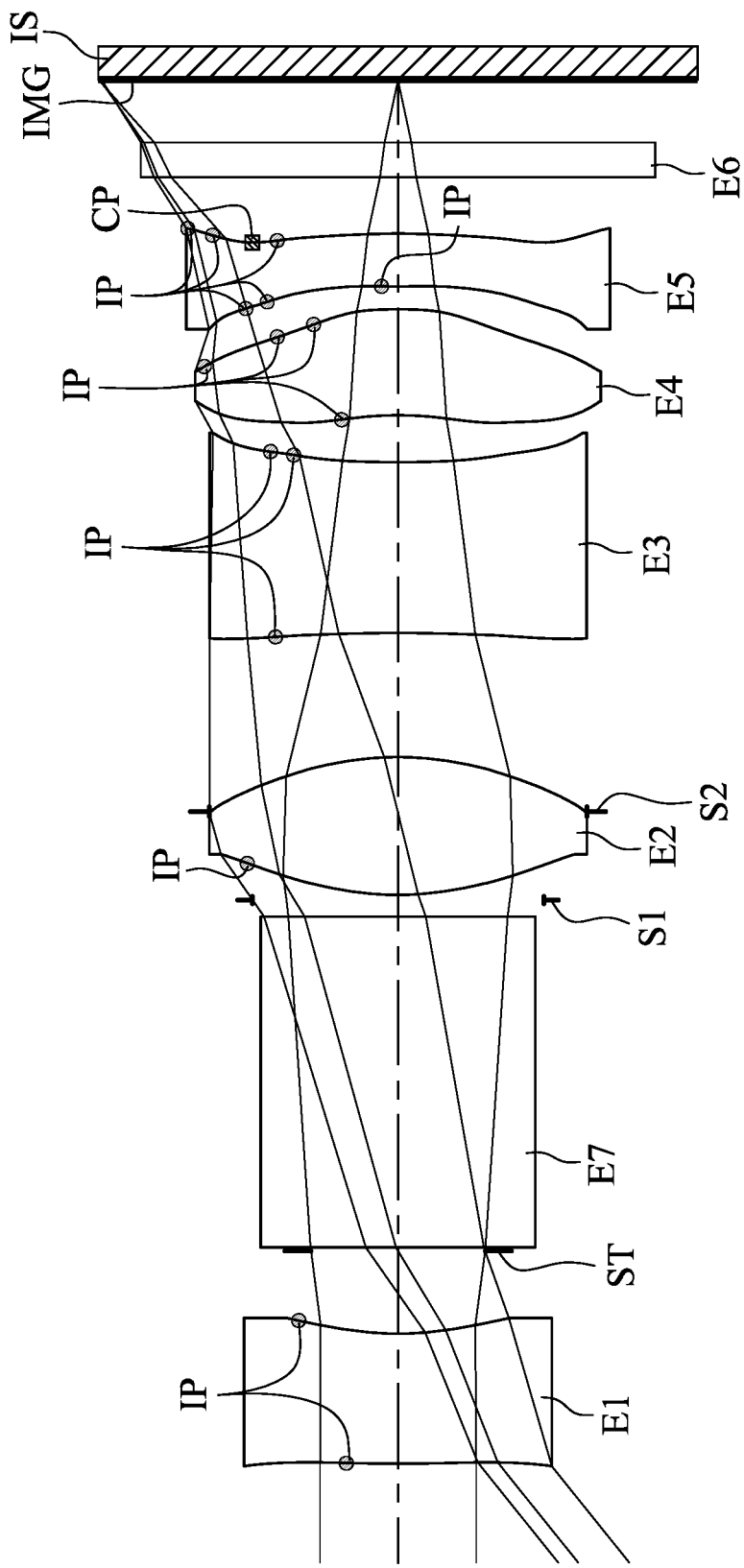
FIG. 23A is a schematic view of partial parameters, the inflection points of each lens element and the critical points according to the 1st embodiment of FIG. 1A.

The first lens element E1 with negative refractive power has an object-side surface being convex in a paraxial region thereof and an image-side surface being concave in a paraxial region thereof. The first lens element E1 is made of a plastic material, and has the object-side surface and the image-side surface being both aspheric. Furthermore, FIG. 23A is a schematic view of partial parameters, the inflection points IP of each lens element and the critical points CP according to the 1st embodiment. In FIG. 23A, the object-side surface of the first lens element E1 includes one inflection point IP, and the image-side surface of the first lens element E1 includes one inflection point IP.

The second lens element E2 with positive refractive power has an object-side surface being convex in a paraxial region thereof and an image-side surface being convex in a paraxial region thereof. The second lens element E2 is made of a plastic material, and has the object-side surface and the image-side surface being both aspheric. Furthermore, the object-side surface of the second lens element E2 includes one inflection point IP (as shown in FIG. 23A).

The third lens element E3 with negative refractive power has an object-side surface being concave in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point IP (as shown in FIG. 23A), and the image-side surface of the third lens element E3 includes two inflection points IP (as shown in FIG. 23A).

The fourth lens element E4 with negative refractive power has an object-side surface being concave in a paraxial region thereof and an image-side surface being convex in a paraxial region thereof. The fourth lens element E4 is made of a plastic material, and has the object-side surface and the image-side surface being both aspheric. Furthermore, the object-side surface of the fourth lens element E4 includes one inflection point IP (as shown in FIG. 23A), and the image-side surface of the fourth lens element E4 includes three inflection points IP (as shown in FIG. 23A).

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes three inflection points IP (as shown in FIG. 23A), and the image-side surface of the fifth lens element E5 includes three inflection points IP and one critical point (as shown in FIG. 23A).

According to the 1st embodiment, the reflective element E7 is a prism, which is made of glass material and disposed between the first lens element E1 and the second lens element E2.

The filter E6 is made of a glass material, which is located between the fifth lens element E5 and the image surface IMG in order, and will not affect the focal length of the image capturing system lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the displacement in parallel with an optical axis from the intersection point of the aspheric surface and the optical axis to a point at a distance of Y from the optical axis on the aspheric surface;

Y is the vertical distance from the point on the aspheric surface to the optical axis;

R is the curvature radius;

k is the conic coefficient; and

Ai is the i-th aspheric coefficient.

In the image capturing system lens assembly according to the 1st embodiment, when a focal length of the image capturing system lens assembly is f, an f-number of the image capturing system lens assembly is Frio, and half of a maximum field of view of the image capturing system lens assembly is HFOV, these parameters have the following values: f=2.25 mm; Fno=2.39; and HFOV=38.7 degrees.

Figure 24:
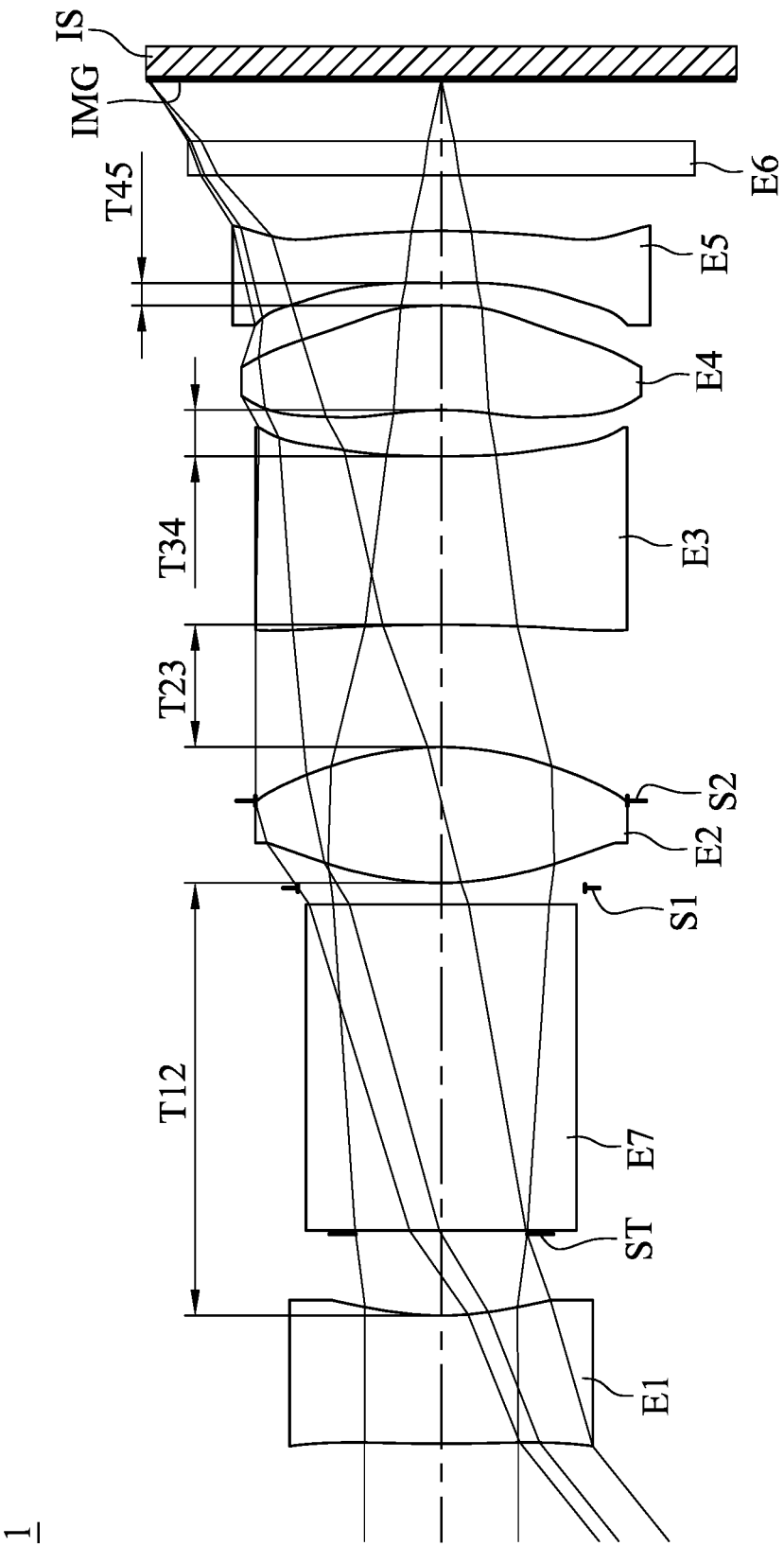
FIG. 24 is a schematic view of partial parameters according to the 1st embodiment.

In the image capturing system lens assembly according to the 1st embodiment, when an axial distance between the first lens element E1 and the second lens element E2 is T12, an axial distance between the second lens element E2 and the third lens element E3 is T23, an axial distance between the third lens element E3 and the fourth lens element E4 is T34, an axial distance between the fourth lens element E4 and the fifth lens element E5 is T45, a maximum among T12, T23, T34, T45 is ATmax, an axial distance between the image-side surface of the fifth lens element E5 and the image surface IMG is BL, a maximum distance between an optical effective region of the object-side surface of the first lens element E1 and the optical axis is Y11, and the focal length of the image capturing system lens assembly is f, the following conditions are satisfied: ATmax/BL=2.85; ATmax/Y11=2.85; and ATmax/f=1.18; in FIG. 24, which is a schematic view of partial parameters according to the 1st embodiment, ATmax=T12.

In the image capturing system lens assembly according to the 1st embodiment, when a central thickness of the first lens element E1 is CT1, a central thickness of the second lens element E2 is CT2, a central thickness of the third lens element E3 is CT3, a central thickness of the fourth lens element E4 is CT4, a central thickness of the fifth lens element E5 is CT5, and a maximum among CT1, CT2, CT3, CT4, CT5 is CTmax, the following condition is satisfied: CT1/CTmax=0.76.

In the image capturing system lens assembly according to the 1st embodiment, when the axial distance between the second lens element E2 and the third lens element E3 is T23, the axial distance between the third lens element E3 and the fourth lens element E4 is T34, the axial distance between the fourth lens element E4 and the fifth lens element E5 is T45, the central thickness of the second lens element E2 is CT2, the central thickness of the third lens element E3 is CT3, the central thickness of the fourth lens element E4 is CT4, the central thickness of the fifth lens element E5 is CT5, and the focal length of the image capturing system lens assembly is f, the following condition is satisfied: (CT2+T23+CT3+T34+CT4+T45+CT5)/f=1.78.

In the image capturing system lens assembly according to the 1st embodiment, when the focal length of the image capturing system lens assembly is f, a focal length of the second lens element E2 is f2, a focal length of the third lens element E3 is f3, a composite focal length of the first lens element E1 and the second lens element E2 is f12, and a composite focal length of the fourth lens element E4 and the fifth lens element E5 is f45, the following conditions are satisfied: f/f12=1.17; f/f2=1.18; f/f3=−0.36; and f/f45=0.55.

In the image capturing system lens assembly according to the 1st embodiment, when the focal length of the image capturing system lens assembly is f, and a maximum image height of the image capturing system lens assembly is ImgH, the following condition is satisfied: f/ImgH=1.25.

In the image capturing system lens assembly according to the 1st embodiment, when the focal length of the image capturing system lens assembly is f, a curvature radius of the object-side surface of the first lens element E1 is R1, a curvature radius of the object-side surface of the second lens element E2 is R3, and a curvature radius of the image-side surface of the second lens element E2 is R4, the following conditions are satisfied: f/R1=0.23; f/R3=1.15; and f/R4=−1.20.

In the image capturing system lens assembly according to the 1st embodiment, when a composite focal length of the first lens element E1, the second lens element E2 and the third lens element E3 is f123, and a composite focal length of the second lens element E2, the third lens element E3 and the fourth lens element E4 is f234, the following condition is satisfied: f123/f234=1.16.

In the image capturing system lens assembly according to the 1st embodiment, when a composite focal length of the third lens element E3 and the fourth lens element E4 is f34, and the composite focal length of the fourth lens element E4 and the fifth lens element E5 is f45, the following condition is satisfied: f34/f45=−1.08.

In the image capturing system lens assembly according to the 1st embodiment, when a refractive index of the third lens element E3 is N3, and a refractive index of the fifth lens element E5 is N5, the following condition is satisfied: (N3+N5)/2=1.650.

In the image capturing system lens assembly according to the 1st embodiment, when the curvature radius of the object-side surface of the first lens element E1 is R1, and a curvature radius of the image-side surface of the first lens element E1 is R2, the following condition is satisfied: (R1−R2)/(R1+R2)=0.68.

In the image capturing system lens assembly according to the 1st embodiment, when the curvature radius of the object-side surface of the second lens element E2 is R3, and a curvature radius of the image-side surface of the second lens element E2 is R4, the following condition is satisfied: (R3+R4)/(R3−R4)=0.02.

In the image capturing system lens assembly according to the 1st embodiment, when a curvature radius of the object-side surface of the third lens element E3 is R5, and a curvature radius of the image-side surface of the third lens element E3 is R6, the following condition is satisfied: (R5+R6)/(R5−R6)=0.09.

In the image capturing system lens assembly according to the 1st embodiment, when a curvature radius of the object-side surface of the fourth lens element E4 is R7, and a curvature radius of the image-side surface of the fourth lens element E4 is R8, the following condition is satisfied: (R7−R8)/(R7+R8)=−0.24.

In the image capturing system lens assembly according to the 1st embodiment, when an axial distance between the aperture stop ST and the image surface IMG is SL, and an axial distance between the object-side surface of the first lens element E1 and the image surface IMG is TL, the following condition is satisfied: SL/TL=0.85.

In the image capturing system lens assembly according to the 1st embodiment, when the axial distance between the first lens element E1 and the second lens element E2 is T12, the focal length of the image capturing system lens assembly is f, and the maximum image height of the image capturing system lens assembly is ImgH, the following conditions are satisfied: T12/f=1.18; and T12/ImgH=1.47.

In the image capturing system lens assembly according to the 1st embodiment, when the axial distance between the first lens element E1 and the second lens element E2 is T12, the axial distance between the second lens element E2 and the third lens element E3 is T23, the axial distance between the third lens element E3 and the fourth lens element E4 is T34, the axial distance between the fourth lens element E4 and the fifth lens element E5 is T45, and a sum of all axial distances between adjacent lens elements of the image capturing system lens assembly is ΣAT, the following condition is satisfied: (T23+T34+T45)/ΣAT=0.31. In according to the 1st embodiment, an axial distance between two adjacent lens elements indicates a distance along the optical axis between two adjacent lens surfaces of the adjacent lens elements; $\Sigma AT=T12+T23+T34+T45$.

In the image capturing system lens assembly according to the 1st embodiment, when the axial distance between the fourth lens element E4 and the fifth lens element E5 is T45, and the focal length of the image capturing system lens assembly is f, the following condition is satisfied: T45/f=0.06.

In the image capturing system lens assembly according to the 1st embodiment, when the focal length of the image capturing system lens assembly is 1, the axial distance between the object-side surface of the first lens element E1 and the image surface IMG is TL, and the axial distance between the aperture stop ST and the image surface IMG is SL, the following conditions are satisfied: TL/f=3.72; and (TL-SL)/f=0.57.

In the image capturing system lens assembly according to the 1st embodiment, when an Abbe number of the first lens element E1 is V1, an Abbe number of the second lens element E2 is V2, an Abbe number of the third lens element E3 is V3, an Abbe number of the fourth lens element E4 is V4, an Abbe number of the fifth lens element E5 is V5, a refractive index of the first lens element E1 is N1, a refractive index of the second lens element E2 is N2, the refractive index of the third lens element E3 is N3, a refractive index of the fourth lens element E4 is N4, and the refractive index of the fifth lens element E5 is N5, the following conditions are satisfied: V1/N1=10.90; V2/N2=36.26; V3/N3=10.90; V4/N4=36.48; and V5/N5=15.85.

In the image capturing system lens assembly according to the 1st embodiment, when the maximum distance between the optical effective region of the object-side surface of the first lens element E1 and the optical axis is Y11, a maximum distance between an optical effective region of the image-side surface of the fifth lens element E5 and the optical axis is Y52, and a maximum image height of the image capturing system lens assembly is ImgH, the following conditions are satisfied: Y11/ImgH=0.52; and Y52/Y11=1.38.

In the image capturing system lens assembly according to the 1st embodiment, when a maximum field of view of the image capturing system lens assembly is FOV, the following condition is satisfied: FOV=77.4 degrees.

The detailed optical data of the 1st embodiment are shown in Table 1A and the aspheric surface data are shown in Table 1 B below.

TABLE 1A

1st Embodiment
f = 2.25 mm, Fno = 2.39, HFOV = 38.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 9.9108 | ASP | 0.785 | Plastic | 1.686 | 18.4 | −3.54 |
| 2 | | 1.8879 | ASP | 0.500 | | | | |
| 3 | Ape. Stop | Plano | | 0.022 | | | | |
| 4 | Prism | Plano | | 2.000 | Glass | 1.945 | 17.9 | — |
| 5 | | Plano | | 0.100 | | | | |
| 6 | Stop | Plano | | 0.030 | | | | |
| 7 | Lens 2 | 1.9645 | ASP | 0.835 | Plastic | 1.544 | 56.0 | 1.91 |
| 8 | | −1.8687 | ASP | −0.330 | | | | |
| 9 | Stop | Plano | | 1.080 | | | | |
| 10 | Lens 3 | −9.7276 | ASP | 1.033 | Plastic | 1.686 | 18.4 | −6.34 |
| 11 | | 8.1979 | ASP | 0.281 | | | | |
| 12 | Lens 4 | −2.4115 | ASP | 0.643 | Plastic | 1.534 | 56.0 | −13.71 |
| 13 | | −3.9290 | ASP | 0.138 | | | | |
| 14 | Lens 5 | 3.9870 | ASP | 0.320 | Plastic | 1.614 | 25.6 | 3.49 |
| 15 | | −4.4840 | ASP | 0.340 | | | | |
| 16 | Filter | Plano | | 0.210 | Glass | 1.517 | 64.2 | — |
| 17 | | Plano | | 0.381 | | | | |
| 18 | Image | Plano | | — | | | | |

Reference wavelength is 587.6 nm (d-line).
Effective radius of Surface 6 (stop S1) is 0.880 mm.
Effective radius of Surface 9 (stop S2) is 1.140 mm.

TABLE 1B

Aspheric Coefficients

| Surface # | 1 | 2 | 7 | 8 | 10 |
|---|---|---|---|---|---|
| k= | −2.3431800E+01 | −1.7197400E+01 | −7.9061200E−01 | 1.1809100E+00 | −9.0000000E+01 |
| A4= | −9.9805636E−02 | 1.4898073E−01 | −3.1461667E−02 | 9.0526258E−02 | 7.5868436E−02 |
| A6= | 1.8234516E−01 | −3.0978898E−01 | 1.0575458E−01 | 1.5436579E−02 | −2.1228211E−01 |
| A8= | −8.8255735E−01 | −9.4691141E−01 | −6.8341573E−01 | −3.2915438E−01 | 9.9579491E−02 |
| A10= | 2.4712806E+00 | 8.6907588E+00 | 2.1330630E+00 | 9.8980261E−01 | −2.6342732E−01 |
| A12= | −3.9395586E+00 | −2.9142963E+01 | −3.9485913E+00 | −1.4449666E+00 | 2.1375271E+00 |
| A14= | 3.4491798E+00 | 4.9133032E+01 | 4.5442874E+00 | 1.2180940E+00 | −4.8877517E+00 |
| A16= | −1.4453295E+00 | −3.3860120E+01 | −3.2174497E+00 | −5.9284085E−01 | 5.5123630E+00 |

TABLE 1B-continued

| Aspheric Coefficients | | | | | |
|---|---|---|---|---|---|
| A18= | 1.7949499E−01 | −3.5921953E−01 | 1.2905098E+00 | 1.5151716E−01 | −3.4322478E+00 |
| A20= | | | −2.2709907E−01 | −1.5511153E−02 | 1.1309050E+00 |
| A22= | | | | | −1.5374577E−01 |

| Surface # | 11 | 12 | 13 | 14 | 15 |
|---|---|---|---|---|---|
| k= | 3.7377900E+01 | −9.0000000E+01 | 7.7310800E+00 | 1.8221900E+00 | −2.1304200E+01 |
| A4= | 6.7308833E−02 | −1.1782929E+00 | −2.5677679E+00 | −2.1993791E+00 | 3.1063750E−02 |
| A6= | 2.9302679E−01 | 7.5163345E+00 | 1.1436400E+01 | 8.7652430E+00 | 8.9722397E−01 |
| A8= | 1.9821155E+00 | −1.9855493E+01 | −2.6434288E+01 | −1.4353442E+01 | −3.7882255E+00 |
| A10= | −1.7565268E+01 | 3.1052925E+01 | 3.8460522E+01 | −1.2508447E+01 | 4.9972926E+00 |
| A12= | 5.0364392E+01 | −3.3408923E+01 | −3.7899260E+01 | 9.3814645E+01 | −3.7618398E−01 |
| A14= | −7.8533145E+01 | 2.6790107E+01 | 2.6410906E+01 | −1.7519460E+02 | −5.0009059E+00 |
| A16= | 7.4223383E+01 | −1.5934706E+01 | −1.3201684E+01 | 1.7432934E+02 | 5.1701549E+00 |
| A18= | −4.2503981E+01 | 6.4805831E+00 | 4.5505638E+00 | −1.0017920E+02 | −2.3519057E+00 |
| A20= | 1.3559963E+01 | −1.5603147E+00 | −9.5465594E−01 | 3.1391485E+01 | 5.1318680E−01 |
| A22= | −1.8466011E+00 | 1.6452890E−01 | 8.9459348E−02 | −4.1571984E+00 | −4.2459373E−02 |

In Table 1A, the curvature radius, the thickness and the focal length are shown in millimeters (mm). Surface numbers 0-18 represent the surfaces sequentially arranged from the object side to the image side along the optical axis. In Table 1B, k represents the conic coefficient of the equation of the aspheric surface profiles. A4-A22 represent the aspheric coefficients ranging from the 4th order to the 22th order. The tables presented below for each embodiment correspond to schematic parameter and aberration curves of each embodiment, and term definitions of the tables are the same as those in Table 1A and Table 1B of the 1st embodiment. Therefore, an explanation in this regard will not be provided again.

Figure 1B:
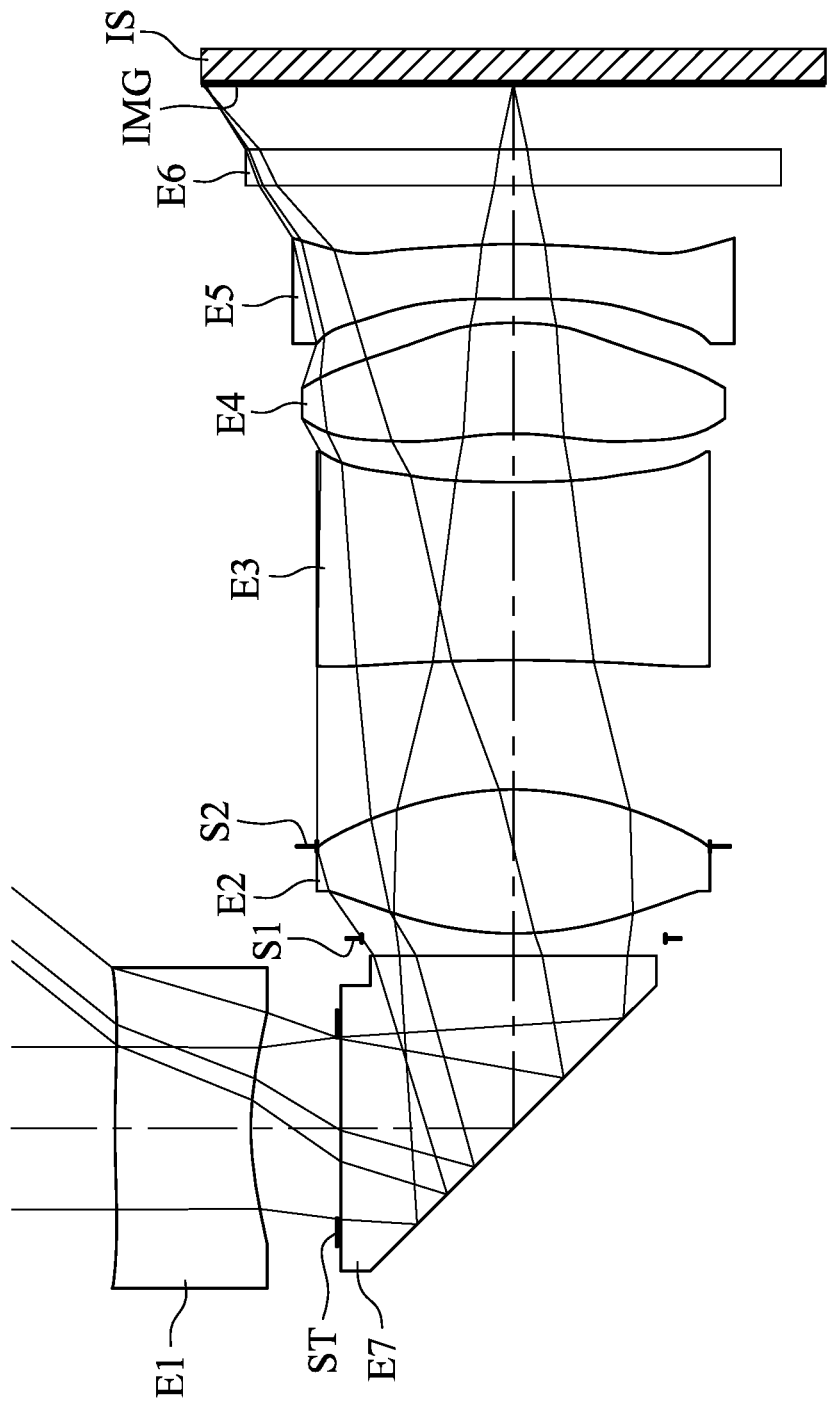
FIG. 1B is a schematic view of the imaging apparatus with another reflective element according to the 1st embodiment of the present disclosure.
Figure 23B:
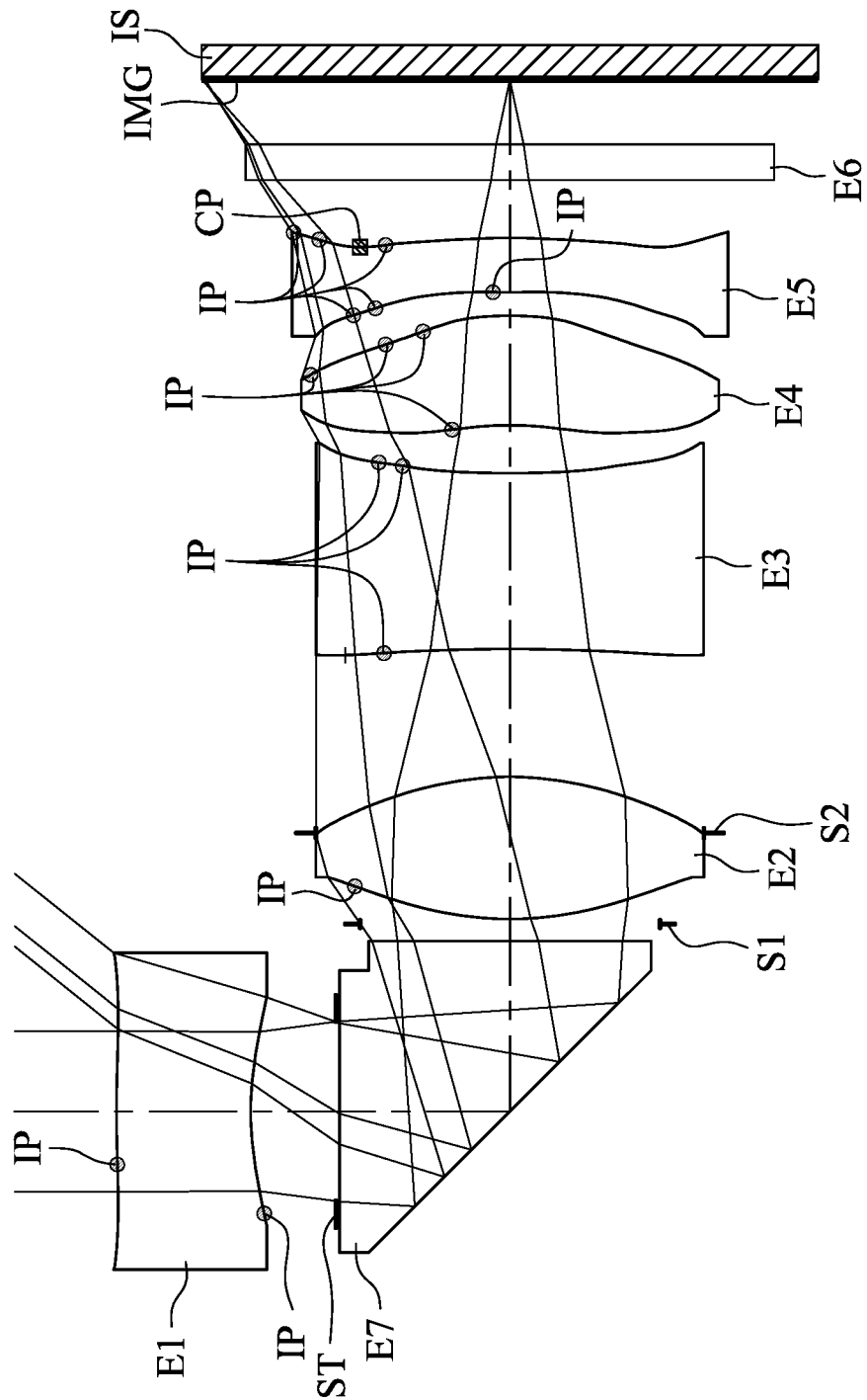
FIG. 23B is a schematic view of partial parameters, the inflection points of each lens element and the critical points according to the 1st embodiment of FIG. 1B.

Please refer to FIG. 1B and FIG. 23B, wherein FIG. 1B is a schematic view of the imaging apparatus 1 with another reflective element E7 according to the 1st embodiment of the present disclosure, and FIG. 23B is a schematic view of partial parameters, the inflection points IP of each lens element and the critical points CP according to the 1st embodiment of FIG. 1B. The difference between the FIG. 1B, FIG. 23B and FIG. 1A, FIG. 23A is that the reflective element E7 of FIG. 1B and FIG. 23B can fold the direction of the optical axis, so that the arrangement is favorable for adapting the electronic device with different requirements.

Figure 25A:
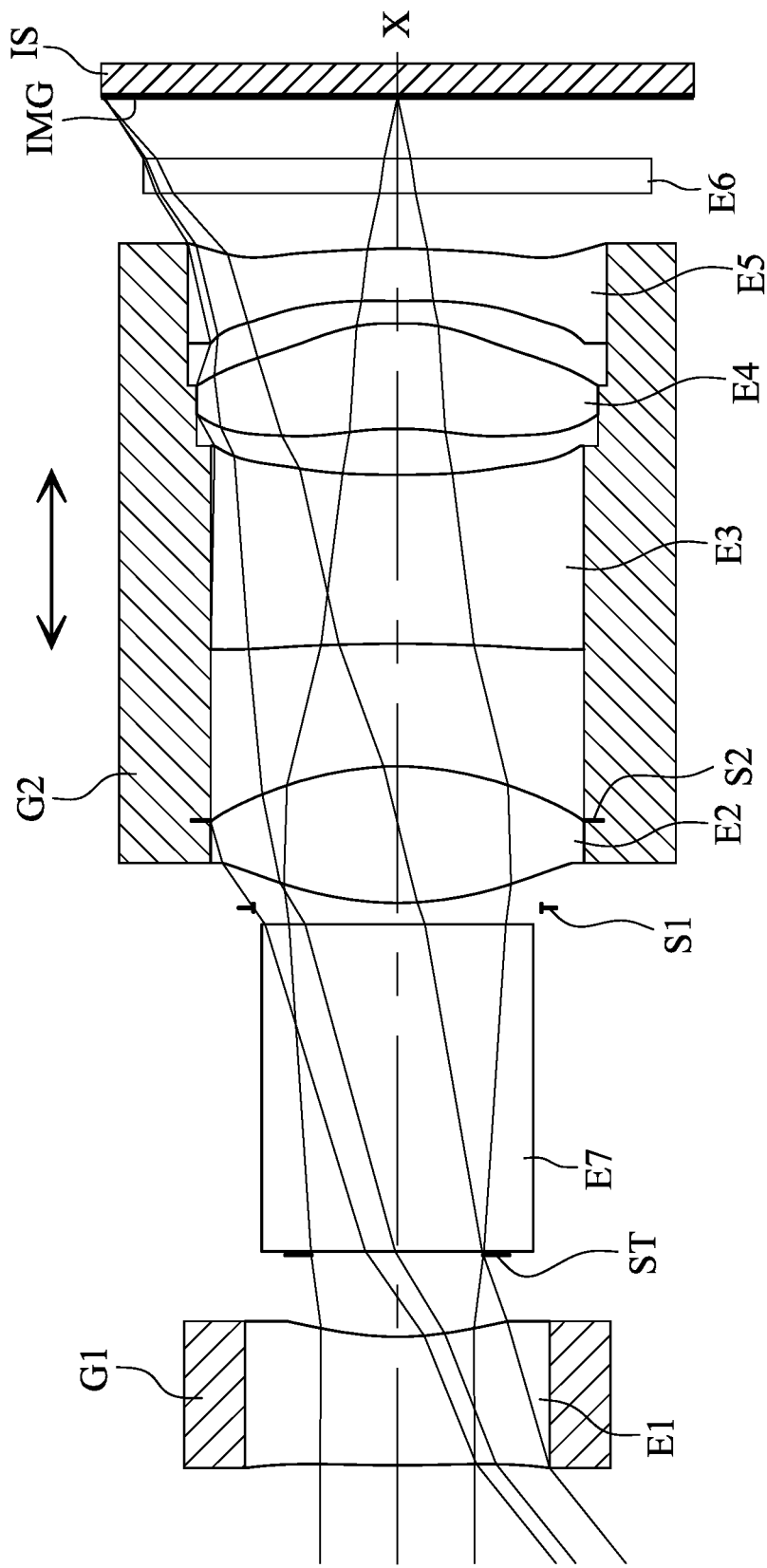
FIG. 25A is a schematic view of the imaging apparatus according to the 1st embodiment of FIG. 1A which is arranged with lens barrels.
Figure 25B:
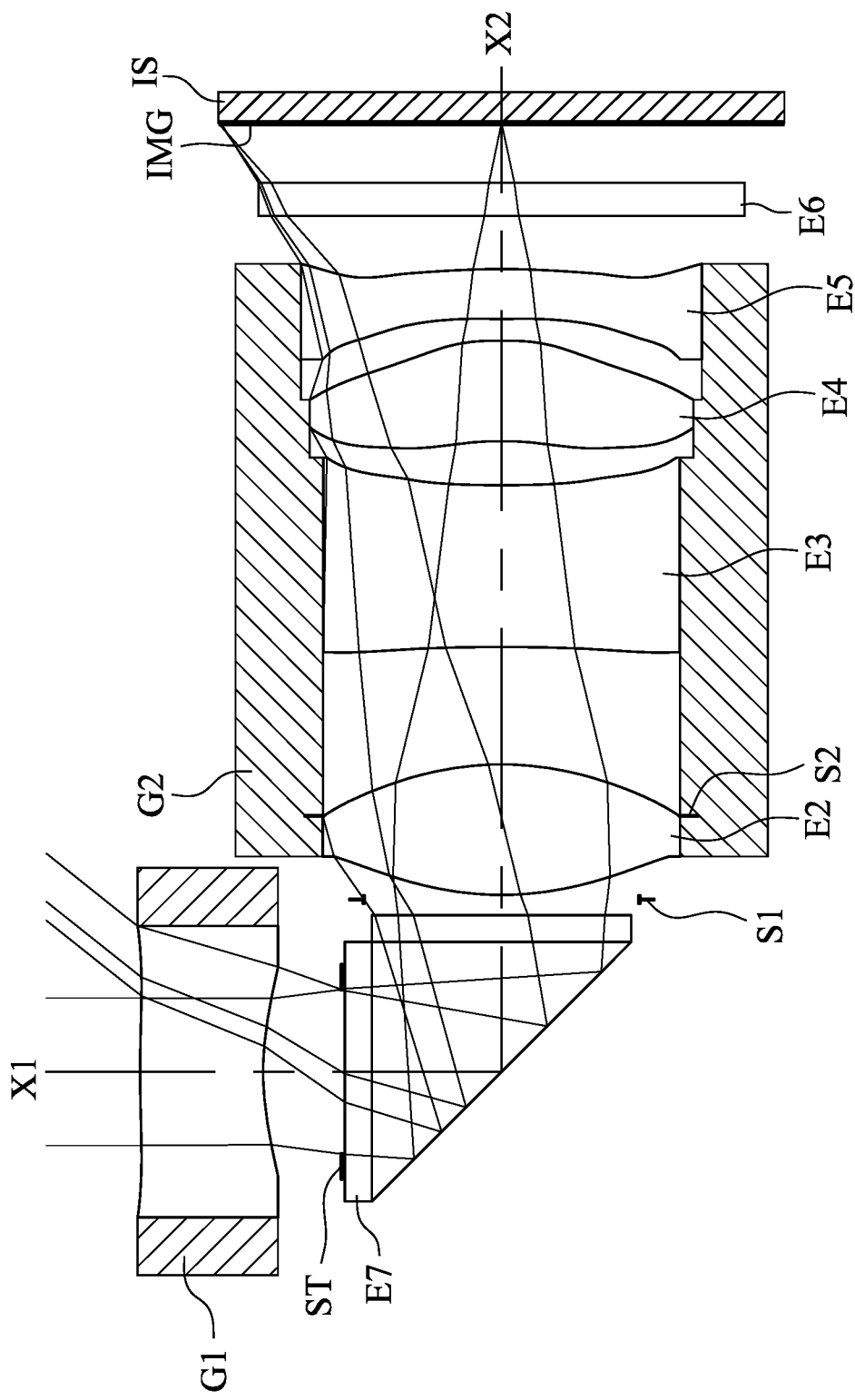
FIG. 25B is a schematic view of the imaging apparatus according to the 1st embodiment of FIG. 1B which is arranged with lens barrels.

Further, FIG. 25A is a schematic view of the imaging apparatus 1 according to the 1st embodiment of FIG. 1A which is arranged with lens barrels G1, G2, and FIG. 25B is a schematic view of the imaging apparatus 1 according to the 1st embodiment of FIG. 1B which is arranged with lens barrels G1, G2. In FIG. 25A and FIG. 25B, the first lens element E1 is disposed in the lens barrel G1 which belongs to a front lens group. The second lens element E2, the third lens element E3, the fourth lens element E4 and the fifth lens element E5 are disposed in the lens barrel G2 which are belong to a rear lens group. There is a relative displacement between the rear lens group and the front lens group. In detailed, in FIG. 25A, the rear lens group is displaced along the optical axis X relative to the front lens group, and there is a relative displacement between the first lens element E1 and the fifth lens element E5. In FIG. 25B, the rear lens group is displaced along a second optical axis X2 relative to the front lens group due to a first optical axis X1 is folded into the second optical axis X2 by the reflective E7; that is the rear lens group is displaced along a direction perpendicular with the first optical axis X1 relative to the front lens group.

2nd Embodiment

Figure 3A:
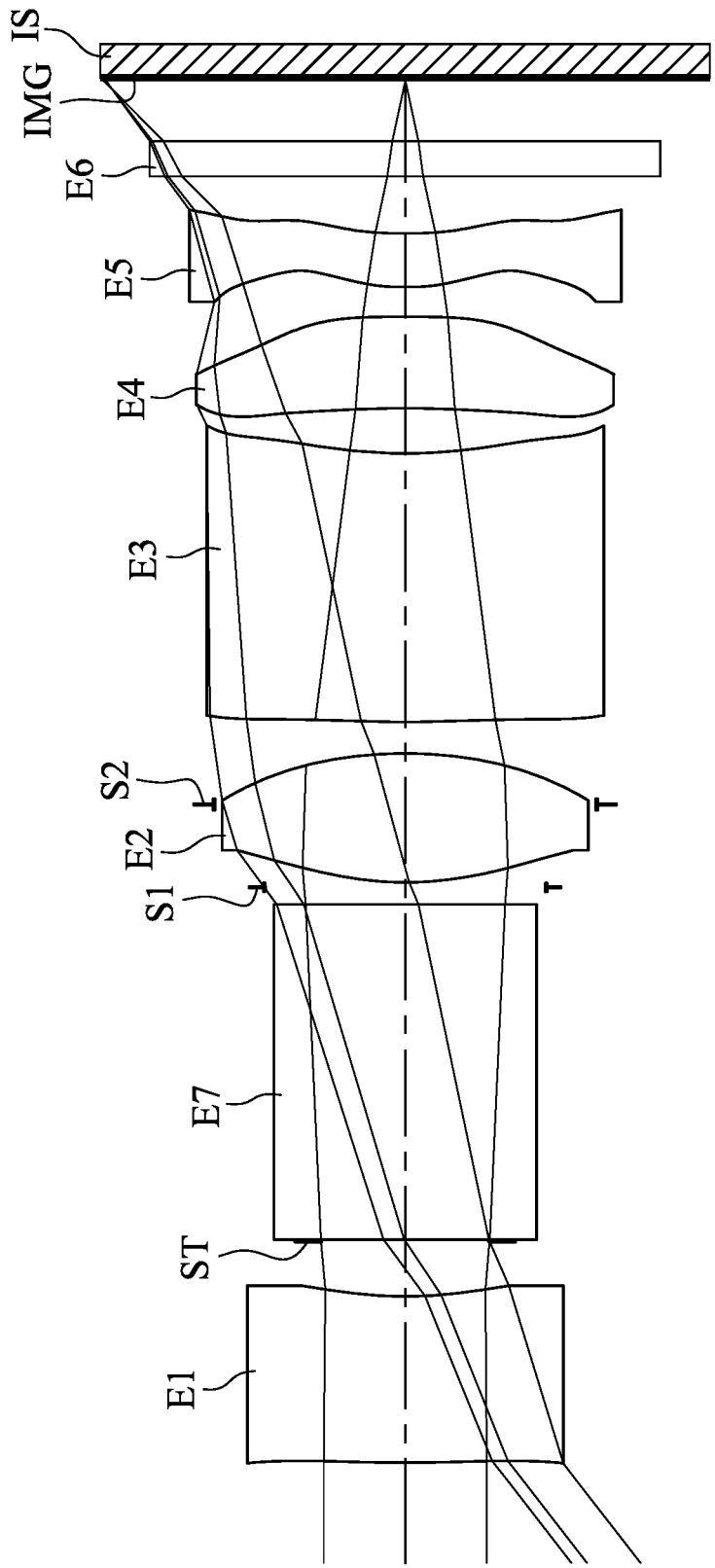
FIG. 3A is a schematic view of an imaging apparatus according to the 2nd embodiment of the present disclosure.
Figure 4:
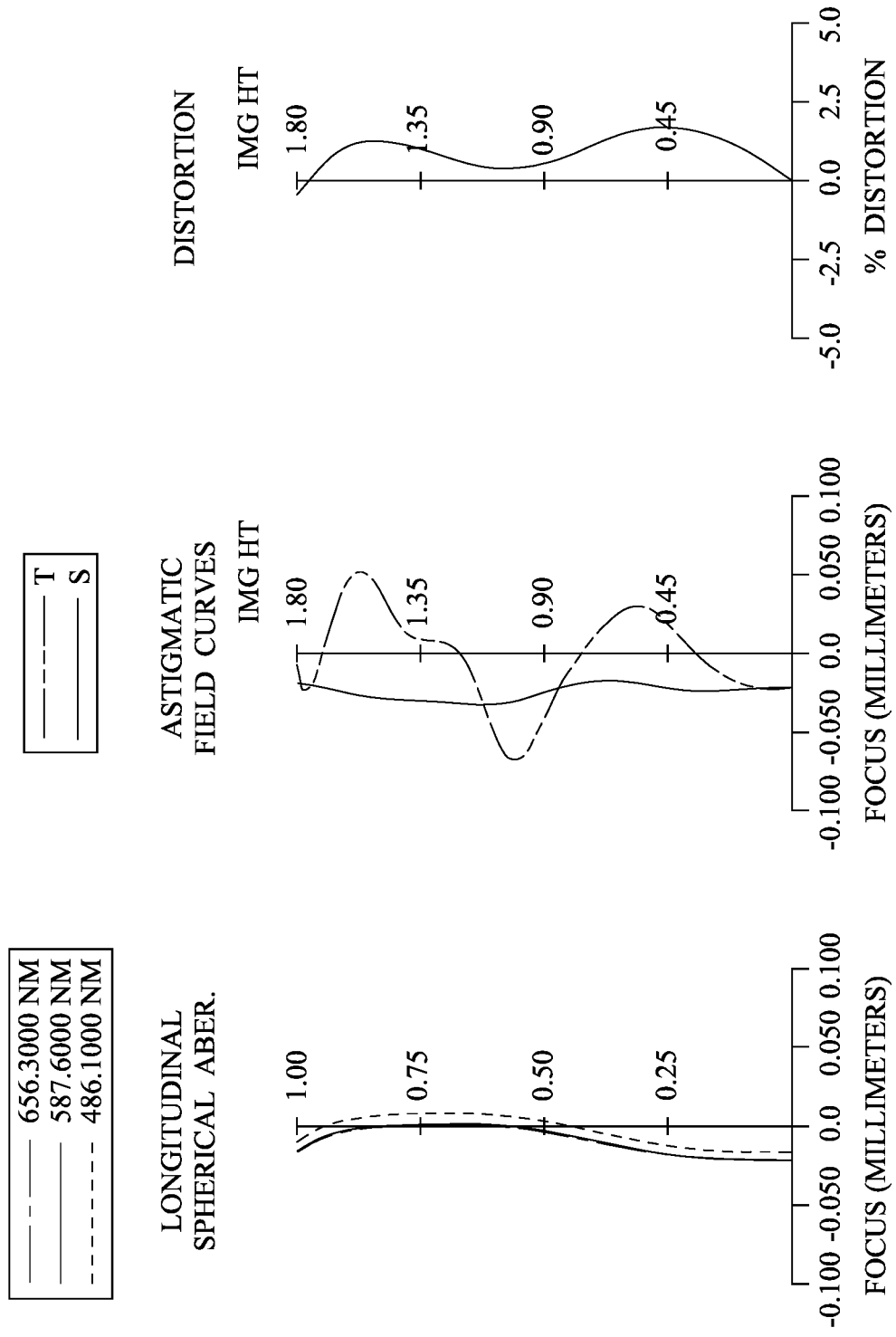
FIG. 4 shows spherical aberration curves, astigmatic field curves and a distortion curve of the imaging apparatus according to the 2nd embodiment.

FIG. 3A is a schematic view of an imaging apparatus 2 according to the 2nd embodiment of the present disclosure. FIG. 4 shows spherical aberration curves, astigmatic field curves and a distortion curve of the imaging apparatus 2 according to the 2nd embodiment. In FIG. 3A, the imaging apparatus 2 includes an image capturing system lens assembly (its reference numeral is omitted) and an image sensor IS. The image capturing system lens assembly includes, in order from an object side to an image side along an optical path, a first lens element E1, an aperture stop ST, a reflective element E7, a stop S1, a second lens element E2, a stop S2, a third lens element E3, a fourth lens element E4, a fifth lens element E5, a filter E6 and an image surface IMG, wherein the image sensor IS is disposed on the image surface IMG of the image capturing system lens assembly. The image capturing system lens assembly includes five lens elements (E1, E2, E3, E4, E5) without additional one or more lens elements inserted between the first lens element E1 and the fifth lens element E5.

The first lens element E1 with negative refractive power has an object-side surface being convex in a paraxial region thereof and an image-side surface being concave in a paraxial region thereof. The first lens element E1 is made of a plastic material, and has the object-side surface and the image-side surface being both aspheric. Furthermore, the object-side surface of the first lens element E1 includes one inflection point, and the image-side surface of the first lens element E1 includes one inflection point.

The second lens element E2 with positive refractive power has an object-side surface being convex in a paraxial region thereof and an image-side surface being convex in a paraxial region thereof. The second lens element E2 is made of a plastic material, and has the object-side surface and the image-side surface being both aspheric. Furthermore, the object-side surface of the second lens element E2 includes one inflection point.

The third lens element E3 with negative refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes two inflection points, and the image-side surface of the third lens element E3 includes two inflection points.

The fourth lens element E4 with positive refractive power has an object-side surface being concave in a paraxial region thereof and an image-side surface being convex in a paraxial region thereof. The fourth lens element E4 is made of a plastic material, and has the object-side surface and the image-side surface being both aspheric. Furthermore, the object-side surface of the fourth lens element E4 includes three inflection points, and the image-side surface of the fourth lens element E4 includes three inflection points.

The fifth lens element E5 with positive refractive power has an object-side surface being convex in a paraxial region thereof and an image-side surface being concave in a paraxial region thereof. The fifth lens element E5 is made of a plastic material, and has the object-side surface and the image-side surface being both aspheric. Furthermore, the object-side surface of the fifth lens element E5 includes one inflection point, and the image-side surface of the fifth lens element E5 includes four inflection points and two critical points.

According to the 2nd embodiment, the reflective element E7 is a prism, which is made of glass material and disposed between the first lens element E1 and the second lens element E2.

The filter E6 is made of a glass material, which is located between the fifth lens element E5 and the image surface IMG in order, and will not affect the focal length of the image capturing system lens assembly.

The detailed optical data of the 2nd embodiment are shown in Table 2A and the aspheric surface data are shown in Table 2B below.

TABLE 2A

2nd Embodiment
f = 2.32 mm, Fno = 2.39, HFOV = 37.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 9.8039 | ASP | 0.991 | Plastic | 1.660 | 20.4 | −5.06 |
| 2 | | 2.3898 | ASP | 0.330 | | | | |
| 3 | Ape. Stop | Plano | | 0.010 | | | | |
| 4 | Prism | Plano | | 2.000 | Glass | 1.945 | 17.9 | — |
| 5 | | Plano | | 0.100 | | | | |
| 6 | Stop | Plano | | 0.030 | | | | |
| 7 | Lens 2 | 1.9492 | ASP | 0.769 | Plastic | 1.544 | 56.0 | 2.28 |
| 8 | | −2.9505 | ASP | −0.305 | | | | |
| 9 | Stop | Plano | | 0.494 | | | | |
| 10 | Lens 3 | 8.3949 | ASP | 1.600 | Plastic | 1.686 | 18.4 | −6.54 |
| 11 | | 2.6970 | ASP | 0.270 | | | | |
| 12 | Lens 4 | −9.0129 | ASP | 0.547 | Plastic | 1.544 | 56.0 | 27.88 |
| 13 | | −5.7743 | ASP | 0.177 | | | | |
| 14 | Lens 5 | 1.7530 | ASP | 0.320 | Plastic | 1.686 | 18.4 | 3.70 |
| 15 | | 5.2569 | ASP | 0.340 | | | | |
| 16 | Filter | Plano | | 0.210 | Glass | 1.517 | 64.2 | — |
| 17 | | Plano | | 0.378 | | | | |
| 18 | Image | Plano | | — | | | | |

Reference wavelength is 587.6 nm (d-line).
Effective radius of Surface 6 (stop S1) is 0.840 mm.
Effective radius of Surface 9 (stop S2) is 1.140 mm.

TABLE 2B

Aspheric Coefficients

| Surface # | 1 | 2 | 7 | 8 | 10 |
|---|---|---|---|---|---|
| k= | 2.1208600E+01 | −5.3522400E+01 | −1.7243500E+00 | 3.0908000E+00 | 3.8717700E+01 |
| A4= | −1.0192138E−01 | 2.7997745E−01 | −1.4769582E−01 | −2.3797074E−01 | −1.6073625E−01 |
| A6= | 3.6402271E−01 | 1.5309626E−01 | 7.0686388E−01 | 1.1132251E+00 | 4.6031623E−01 |
| A8= | −1.5748152E+00 | −1.3503865E+01 | −2.3619497E+00 | −2.8783062E+00 | −7.4751648E−01 |
| A10= | 3.9164661E+00 | 9.6509359E+01 | 4.6740386E+00 | 4.2366057E+00 | −3.8188427E−01 |
| A12= | −5.7548121E+00 | −3.4422468E+02 | −5.8862277E+00 | −3.7029560E+00 | 3.2949583E+00 |
| A14= | 4.7631825E+00 | 6.4294542E+02 | 4.7718549E+00 | 1.9504175E+00 | −5.4349415E+00 |
| A16= | −1.9399317E+00 | −5.3737869E+02 | −2.4575727E+00 | −6.3005004E−01 | 4.6786278E+00 |
| A18= | 2.5479145E−01 | 9.2728193E+01 | 7.5456326E−01 | 1.3686488E−01 | −2.3177718E+00 |
| A20= | | | −1.0872166E−01 | −1.9554558E−02 | 6.2761903E−01 |
| A22= | | | | | −7.2307086E−02 |

| Surface # | 11 | 12 | 13 | 14 | 15 |
|---|---|---|---|---|---|
| k= | −9.0000000E+01 | −9.0000000E+01 | 1.6507200E+01 | −2.6395600E+00 | −3.5192300E−01 |
| A4= | 3.2105564E−01 | −1.6030761E−01 | 4.5477252E−01 | 1.3375718E+00 | 1.6357659E+00 |
| A6= | −1.4026242E+00 | 2.8761728E−01 | −5.9963430E+00 | −8.1312898E+00 | −6.9738418E+00 |
| A8= | 5.3143496E+00 | 1.8550064E+00 | 2.2939610E+01 | 2.5531325E+01 | 1.3364951E+01 |
| A10= | −1.4421043E+01 | −9.2907003E+00 | −5.1479805E+01 | −7.2619666E+01 | −1.6669319E+01 |
| A12= | 2.4998723E+01 | 1.8892058E+01 | 7.5545067E+01 | 1.5751597E+02 | 1.6051856E+01 |
| A14= | −2.7950867E+01 | −2.2029370E+01 | −7.3778746E+01 | −2.2464928E+02 | −1.2023790E+01 |

TABLE 2B-continued

| Aspheric Coefficients | | | | | |
|---|---|---|---|---|---|
| A16= | 2.0233466E+01 | 1.6012744E+01 | 4.7467665E+01 | 2.0224498E+02 | 6.3790391E+00 |
| A18= | −9.1480135E+00 | −7.2160663E+00 | −1.9358893E+01 | −1.1095141E+02 | −2.1454497E+00 |
| A20= | 2.3405629E+00 | 1.8505801E+00 | 4.5470676E+00 | 3.3887610E+01 | 3.9793640E−01 |
| A22= | −2.5815462E−01 | −2.0658342E−01 | −4.6944548E−01 | −4.4145681E+00 | −3.0015317E−02 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 2A and Table 2B as the following values and satisfy the following conditions in Table 2C:

TABLE 2C

| 2nd Embodiment | | | |
|---|---|---|---|
| f [mm] | 2.32 | (R1 − R2)/(R1 + R2) | 0.61 |
| Fno | 2.39 | (R3 + R4)/(R3 − R4) | −0.20 |
| HFOV [degrees] | 37.7 | (R5 + R6)/(R5 − R6) | 1.95 |
| ATmax/BL | 2.66 | (R7 − R8)/(R7 + R8) | 0.22 |
| ATmax/Y11 | 2.62 | SL/TL | 0.84 |
| ATmax/f | 1.06 | T12/f | 1.06 |
| CT1/CTmax | 0.62 | T12/ImgH | 1.37 |
| (CT2 + T23 + CT3 + T34 + CT4 + T45 + CT5)/f | 1.67 | (T23 + T34 + T45)/ΣAT | 0.20 |
| f/f12 | 0.86 | T45/f | 0.08 |
| f/f2 | 1.02 | TL/f | 3.56 |
| f/f3 | −0.35 | (TL − SL)/f | 0.57 |
| f/f45 | 0.72 | V1/N1 | 12.29 |
| f/ImgH | 1.29 | V2/N2 | 36.26 |
| f/R1 | 0.24 | V3/N3 | 10.90 |
| f/R3 | 1.19 | V4/N4 | 36.26 |
| f/R4 | −0.79 | V5/N5 | 10.90 |
| f123/f234 | 1.44 | Y11/ImgH | 0.52 |
| f34/f45 | −2.75 | Y52/Y11 | 1.37 |
| (N3 + N5)/2 | 1.686 | FOV [degrees] | 75.4 |

Figure 3B:
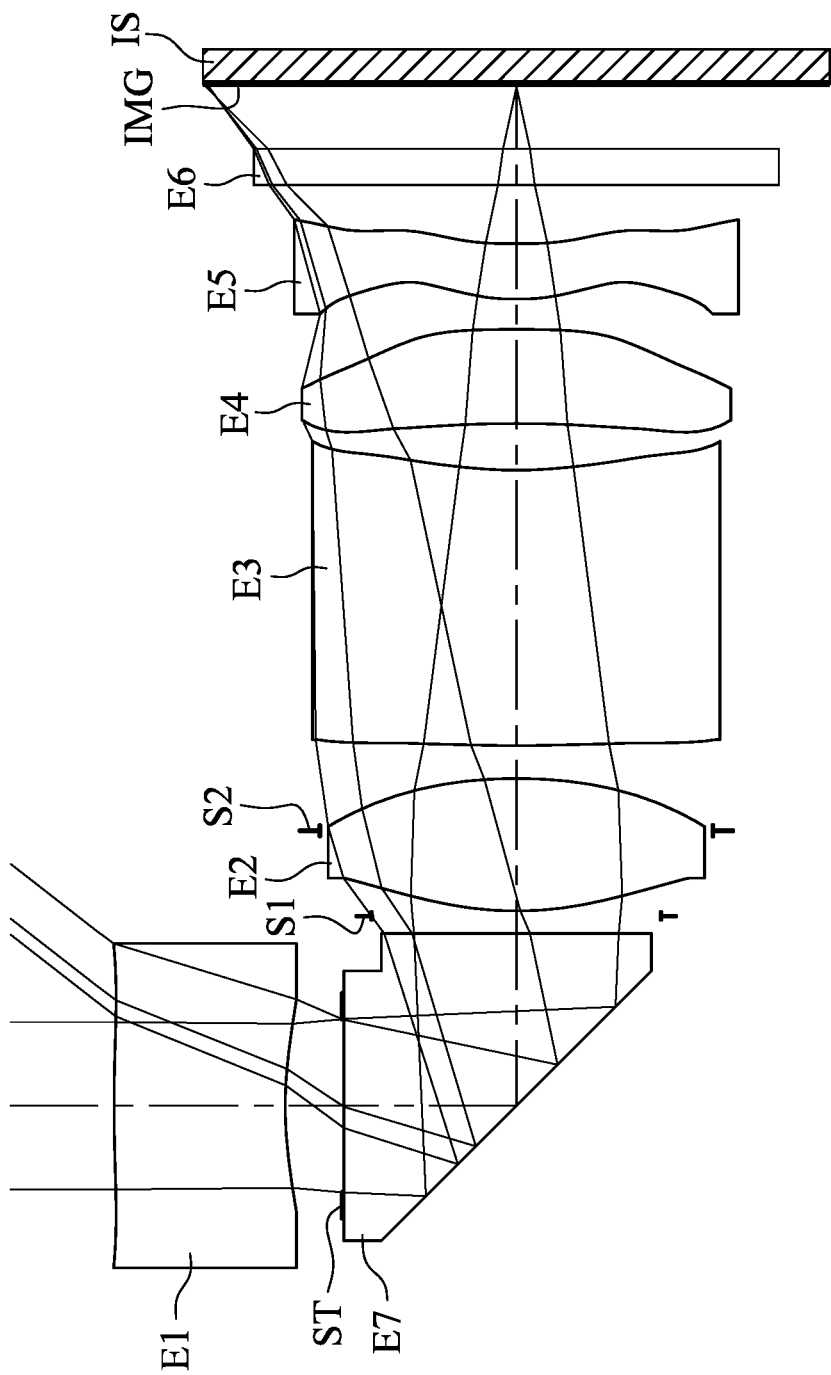
FIG. 3B is a schematic view of the imaging apparatus with another reflective element according to the 2nd embodiment of the present disclosure.

Please refer to FIG. 3B, which is a schematic view of the imaging apparatus 2 with another reflective element E7 according to the 2nd embodiment of the present disclosure. The difference between the FIG. 3B and FIG. 3A is that the reflective element E7 of FIG. 3B can fold the direction of the optical axis, so that the arrangement is favorable for adapting the electronic device with different requirements.

3rd Embodiment

Figure 5A:
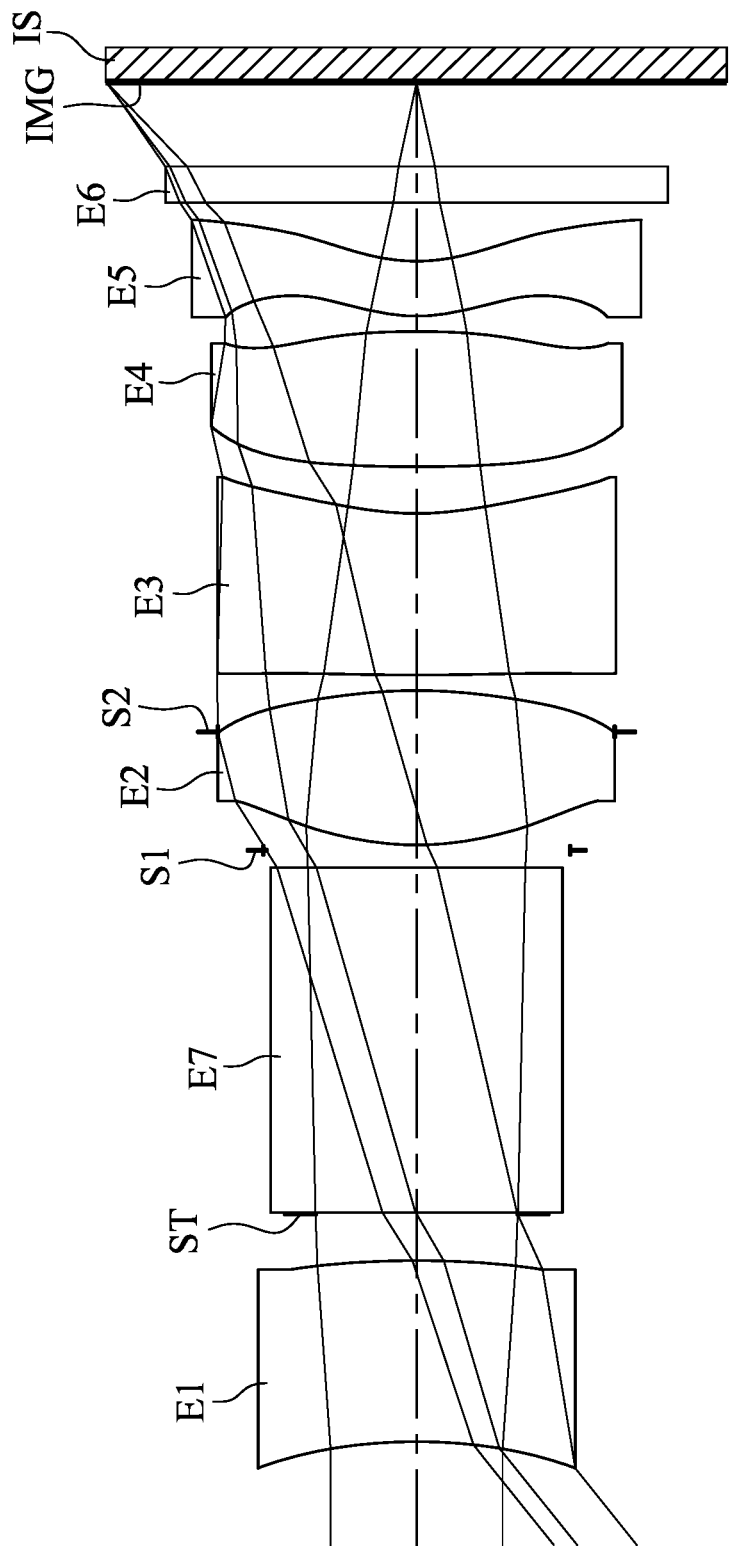
FIG. 5A is a schematic view of an imaging apparatus according to the 3rd embodiment of the present disclosure.
Figure 6:
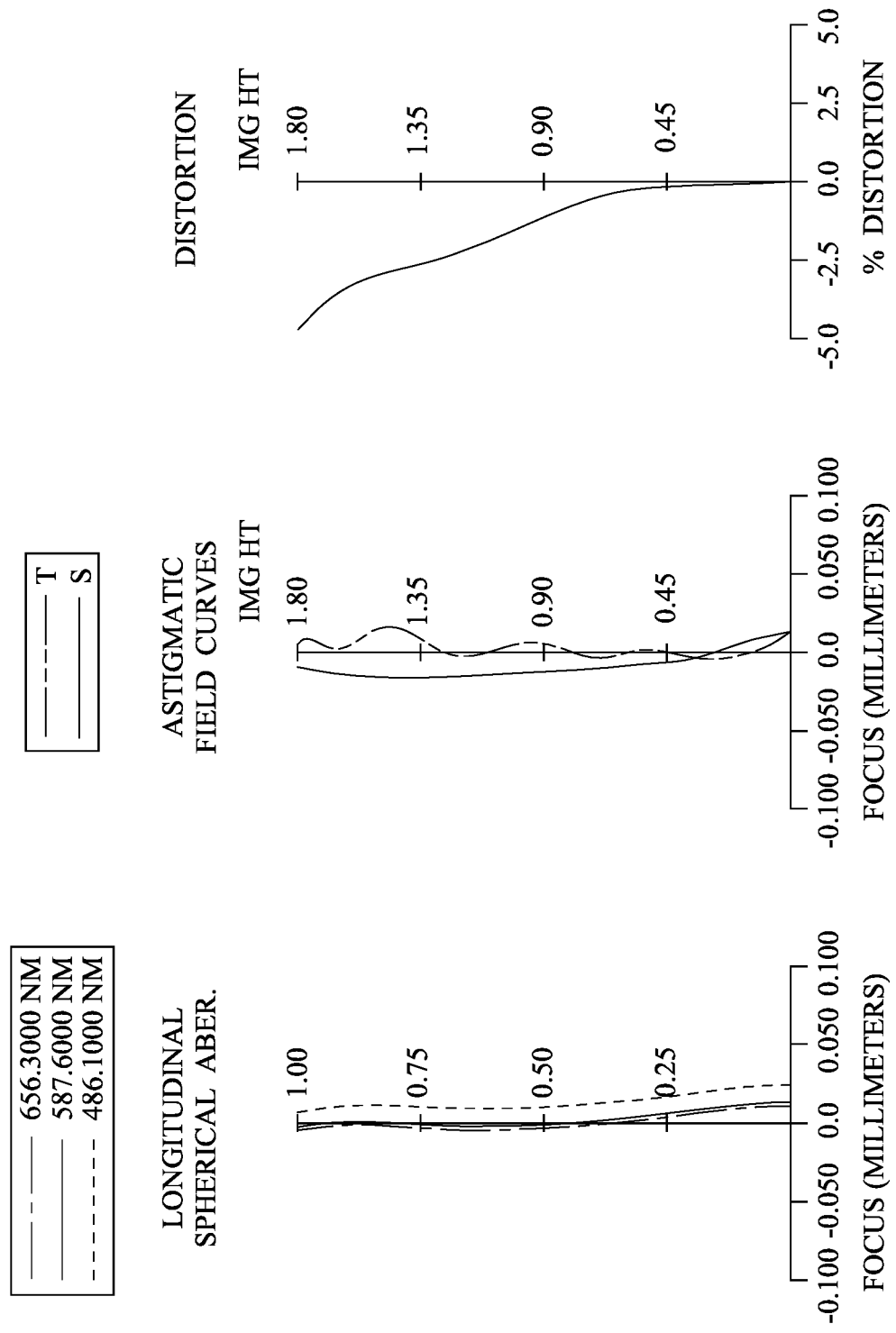
FIG. 6 shows spherical aberration curves, astigmatic field curves and a distortion curve of the imaging apparatus according to the 3rd embodiment.

FIG. 5A is a schematic view of an imaging apparatus 3 according to the 3rd embodiment of the present disclosure. FIG. 6 shows spherical aberration curves, astigmatic field curves and a distortion curve of the imaging apparatus 3 according to the 3rd embodiment. In FIG. 5A, the imaging apparatus 3 includes an image capturing system lens assembly (its reference numeral is omitted) and an image sensor IS. The image capturing system lens assembly includes, in order from an object side to an image side along an optical path, a first lens element E1, an aperture stop ST, a reflective element E7, a stop S1, a second lens element E2, a stop S2, a third lens element E3, a fourth lens element E4, a fifth lens element E5, a filter E6 and an image surface IMG, wherein the image sensor IS is disposed on the image surface IMG of the image capturing system lens assembly. The image capturing system lens assembly includes five lens elements (E1, E2, E3, E4, E5) without additional one or more lens elements inserted between the first lens element E1 and the fifth lens element E5.

The first lens element E1 with negative refractive power has an object-side surface being concave in a paraxial region thereof and an image-side surface being convex in a paraxial region thereof. The first lens element E1 is made of a plastic material, and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of a plastic material, and has the object-side surface and the image-side surface being both aspheric. Furthermore, the object-side surface of the second lens element E2 includes one inflection point.

The third lens element E3 with negative refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes two inflection points.

The fourth lens element E4 with positive refractive power has an object-side surface being convex in a paraxial region thereof and an image-side surface being convex in a paraxial region thereof. The fourth lens element E4 is made of a plastic material, and has the object-side surface and the image-side surface being both aspheric. Furthermore, the image-side surface of the fourth lens element E4 includes one inflection point.

The fifth lens element E5 with positive refractive power has an object-side surface being convex in a paraxial region thereof and an image-side surface being concave in a paraxial region thereof. The fifth lens element E5 is made of a plastic material, and has the object-side surface and the image-side surface being both aspheric. Furthermore, the object-side surface of the fifth lens element E5 includes one inflection point, and the image-side surface of the fifth lens element E5 includes one inflection point.

According to the 3rd embodiment, the reflective element E7 is a prism, which is made of glass material and disposed between the first lens element E1 and the second lens element E2.

The filter E6 is made of a glass material, which is located between the fifth lens element E5 and the image surface IMG in order, and will not affect the focal length of the image capturing system lens assembly.

The detailed optical data of the 3rd embodiment are shown in Table 3A and the aspheric surface data are shown in Table 3B below.

TABLE 3A

3rd Embodiment
f = 2.37 mm, Fno = 2.38, HFOV = 38.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.0740 | ASP | 1.050 | Plastic | 1.703 | 17.7 | −9.80 |
| 2 | | −6.3322 | ASP | 0.270 | | | | |
| 3 | Ape. Stop | Plano | | 0.010 | | | | |
| 4 | Prism | Plano | | 2.000 | Glass | 1.820 | 32.5 | — |
| 5 | | Plano | | 0.100 | | | | |
| 6 | Stop | Plano | | 0.030 | | | | |
| 7 | Lens 2 | 1.8385 | ASP | 0.898 | Plastic | 1.544 | 56.0 | 2.27 |
| 8 | | −3.1061 | ASP | −0.240 | | | | |
| 9 | Stop | Plano | | 0.330 | | | | |
| 10 | Lens 3 | 10.9449 | ASP | 0.938 | Plastic | 1.686 | 18.4 | −3.23 |
| 11 | | 1.7771 | ASP | 0.271 | | | | |
| 12 | Lens 4 | 9.8510 | ASP | 0.782 | Plastic | 1.544 | 56.0 | 7.86 |
| 13 | | −7.3426 | ASP | 0.090 | | | | |
| 14 | Lens 5 | 1.0462 | ASP | 0.320 | Plastic | 1.686 | 18.4 | 9.84 |
| 15 | | 1.0840 | ASP | 0.340 | | | | |
| 16 | Filter | Plano | | 0.210 | Glass | 1.517 | 64.2 | — |
| 17 | | Plano | | 0.490 | | | | |
| 18 | Image | Plano | | — | | | | |

Reference wavelength is 587.6 nm (d-line).
Effective radius of Surface 6 (stop S1) is 0.890 mm.
Effective radius of Surface 9 (stop S2) is 1.150 mm.

TABLE 3B

Aspheric Coefficients

| Surface # | 1 | 2 | 7 | 8 | 10 |
|---|---|---|---|---|---|
| k= | 8.1024300E+00 | 2.8846500E+01 | −8.5911000E−01 | 3.1871100E+00 | 7.2305700E+01 |
| A4= | 3.0821857E−02 | −1.9381584E−02 | −7.8869193E−03 | 2.3741379E−02 | −1.1585322E−01 |
| A6= | −1.1826878E−01 | 1.1898970E−01 | 1.7794505E−03 | 8.8004665E−02 | 1.4327133E−01 |
| A8= | 7.7199476E−01 | −1.5662106E+00 | −6.4446851E−02 | −1.8989793E−02 | 1.2559841E−03 |
| A10= | −2.6038638E+00 | 9.9943914E+00 | 1.7066787E−01 | −2.4620242E−01 | −2.3544203E−01 |
| A12= | 5.5004778E+00 | −3.3889233E+01 | −3.0773292E−01 | 2.6516029E−01 | 1.7056414E−01 |
| A14= | −6.8524815E+00 | 6.2382705E+01 | 2.9475625E−01 | −8.3486213E−02 | 4.3237950E−02 |
| A16= | 4.6242313E+00 | −5.7929680E+01 | −1.5220913E−01 | −1.0145818E−02 | −7.5592434E−02 |
| A18= | −1.2801142E+00 | 2.0717119E+01 | 3.2820439E−02 | 7.2927162E−03 | 1.8954438E−02 |

| Surface # | 11 | 12 | 13 | 14 | 15 |
|---|---|---|---|---|---|
| k= | −2.9918400E+01 | 5.5274300E+01 | 5.4683800E−01 | −4.5280000E+00 | −2.2542600E+00 |
| A4= | 2.8353790E−01 | −4.0793099E−02 | −6.2513529E−01 | −2.2638576E−01 | 1.1512865E−01 |
| A6= | −1.0961027E+00 | 8.4060159E−01 | 3.3933571E+00 | 8.9623437E−01 | −1.5713332E+00 |
| A8= | 2.3083651E+00 | −3.8369224E+00 | −1.3204649E+01 | −6.1182514E+00 | 3.2742050E+00 |
| A10= | −2.8394068E+00 | 9.4493523E+00 | 3.4746815E+01 | 1.6109295E+01 | −3.8054068E+00 |
| A12= | 2.0413340E+00 | −1.3612183E+01 | −6.1080186E+01 | −2.3188816E+01 | 2.9006424E+00 |
| A14= | −8.1922702E−01 | 1.1943746E+01 | 7.2553653E+01 | 2.0216758E+01 | −1.4781704E+00 |
| A16= | 1.7462281E−01 | −6.3130536E+00 | −5.7301956E+01 | −1.0655872E+01 | 4.7713123E−01 |
| A18= | −1.8959565E−02 | 1.8573070E+00 | 2.8632601E+01 | 3.0978152E+00 | −8.6033918E−02 |
| A20= | | −2.3494451E−01 | −8.1342340E+00 | −3.7745122E−01 | 6.3788905E−03 |
| A22= | | | 9.9483430E−01 | | |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 3A and Table 3B as the following values and satisfy the following conditions in Table 3C:

TABLE 3C

| 3rd Embodiment | |
|---|---|
| f [mm] | 2.37 |
| Fno | 2.38 |
| HFOV [degrees] | 38.7 |
| ATmax/BL | 2.32 |
| ATmax/Y11 | 2.62 |
| ATmax/f | 1.02 |
| CT/CTmax | 1.00 |
| (CT2 + T23 + CT3 + T34 + CT4 + T45 + CT5)/f | 1.43 |

TABLE 3C-continued

3rd Embodiment

| | |
|---|---|
| f/f12 | 1.14 |
| f/f2 | 1.05 |
| f/f3 | −0.74 |
| f/f45 | 0.57 |
| f/ImgH | 1.32 |
| f/R1 | −0.77 |
| f/R3 | 1.29 |
| f/R4 | −0.76 |
| f123/f234 | 1.37 |
| f34/f45 | −1.46 |
| (N3 + N5)/2 | 1.686 |
| (R1 − R2)/(R1 + R2) | −0.35 |
| (R3 + R4)/(R3 − R4) | −0.26 |
| (R5 + R6)/(R5 − R6) | 1.39 |
| (R7 − R8)/(R7 + R8) | 6.85 |
| SL/TL | 0.83 |
| T12/f | 1.02 |
| T12/ImgH | 1.34 |
| (T23 + T34 + T45)/ΣAT | 0.16 |
| T45/f | 0.04 |
| TL/f | 3.33 |
| (TL − SL)/f | 0.56 |
| V1/N1 | 10.36 |
| V2/N2 | 36.26 |
| V3/N3 | 10.90 |
| V4/N4 | 36.26 |
| V5/N5 | 10.90 |
| Y11/ImgH | 0.51 |
| Y52/Y11 | 1.42 |
| FOV [degrees] | 77.4 |

Figure 5B:
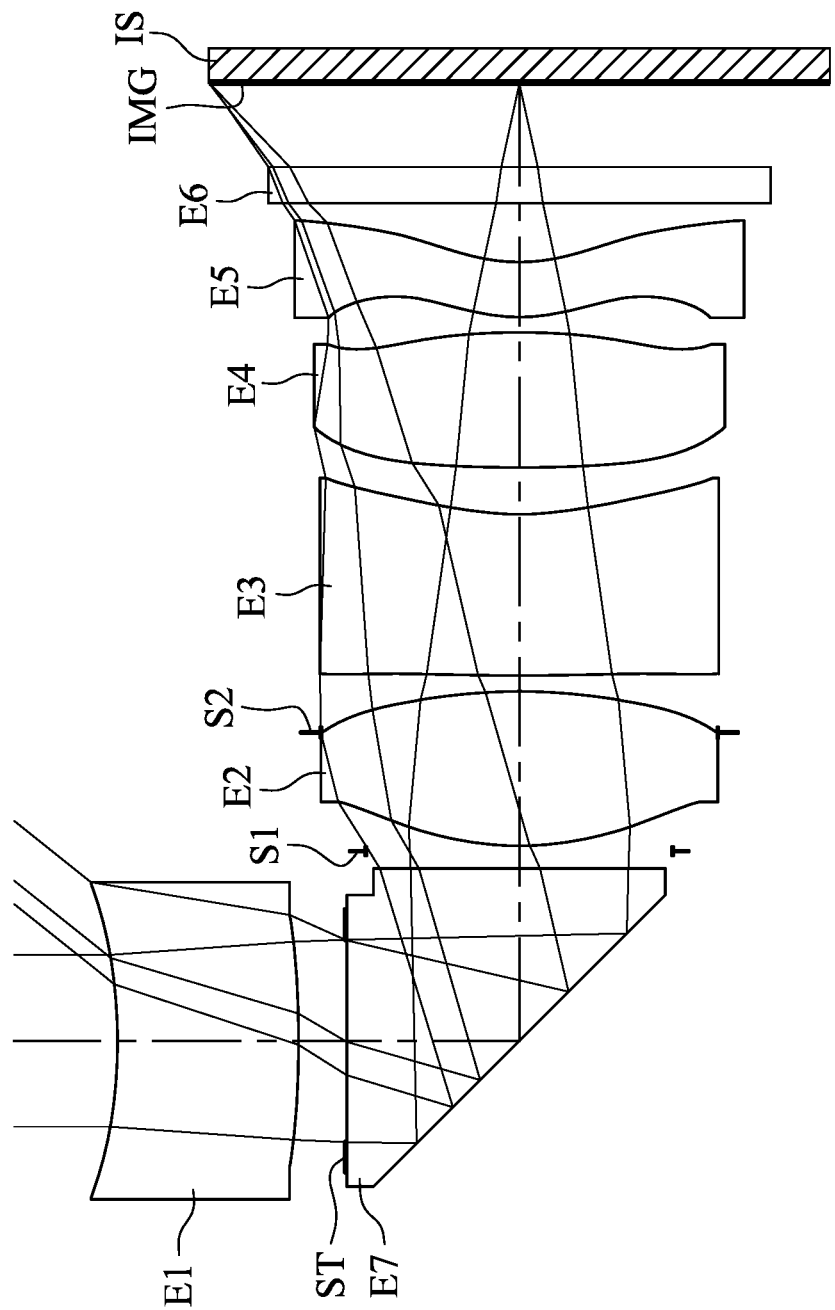
FIG. 5B, which is a schematic view of the imaging apparatus with another reflective element according to the 3rd embodiment of the present disclosure.

Please refer to FIG. 5B, which is a schematic view of the imaging apparatus 3 with another reflective element E7 according to the 3rd embodiment of the present disclosure. The difference between the FIG. 5B and FIG. 5A is that the reflective element E7 of FIG. 5B can fold the direction of the optical axis, so that the arrangement is favorable for adapting the electronic device with different requirements.

4th Embodiment

Figure 7A:
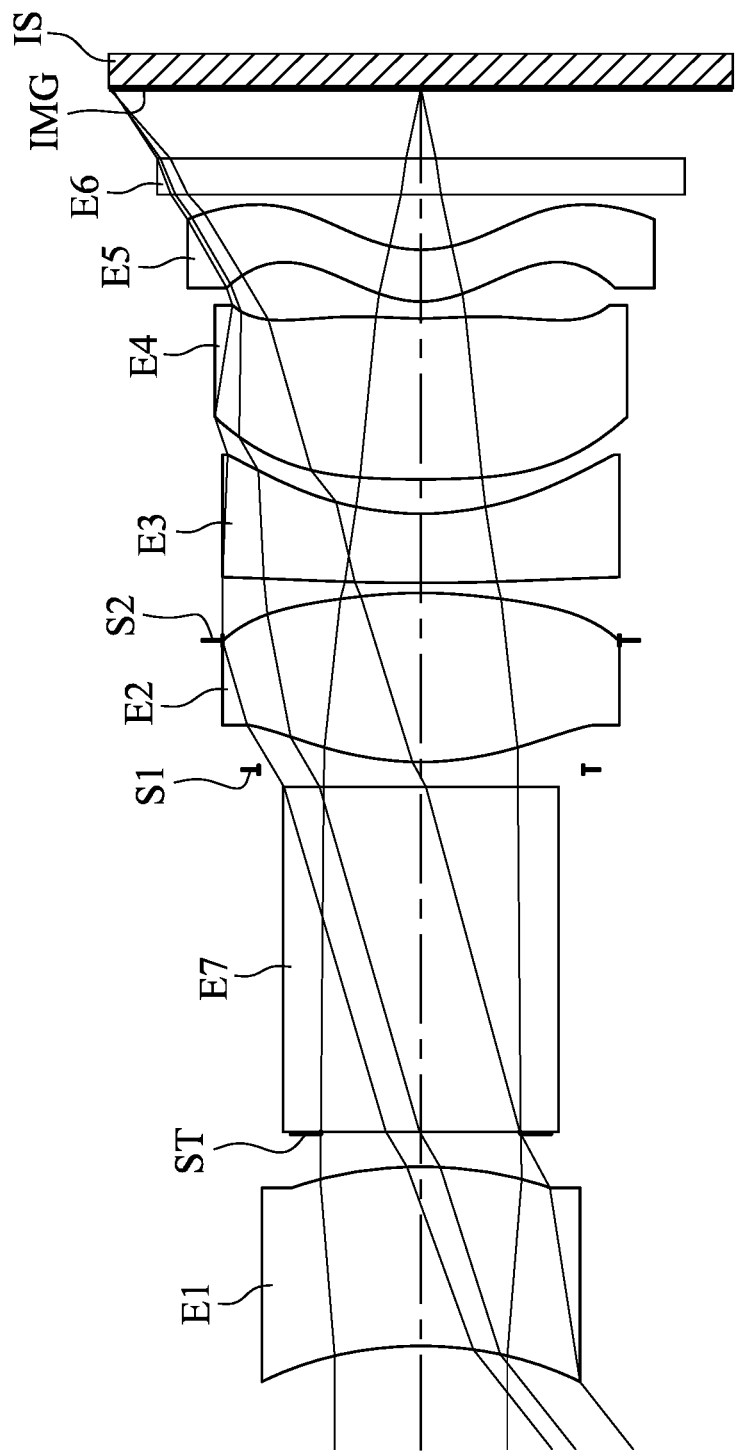
FIG. 7A is a schematic view of an imaging apparatus according to the 4th embodiment of the present disclosure.
Figure 8:
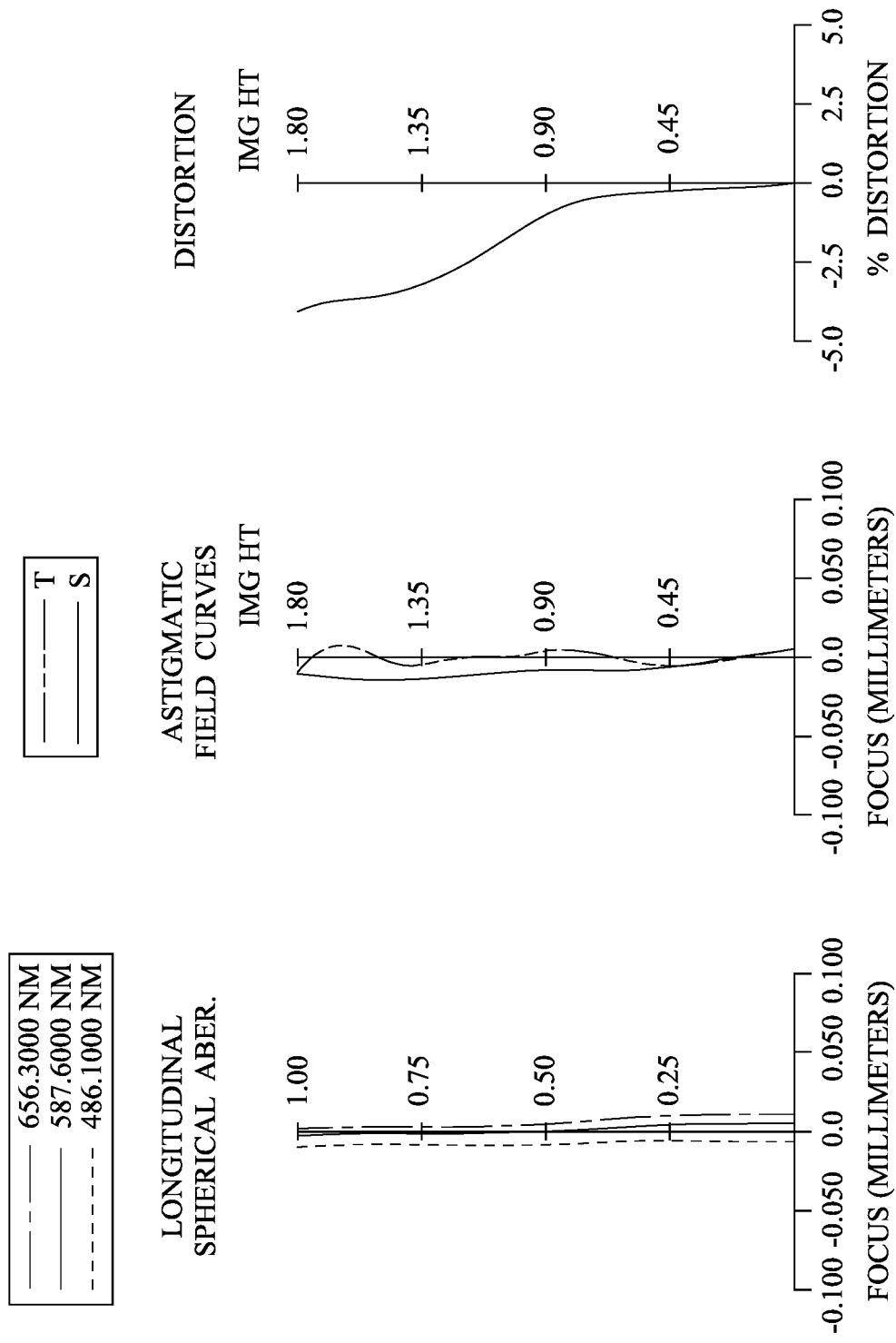
FIG. 8 shows spherical aberration curves, astigmatic field curves and a distortion curve of the imaging apparatus according to the 4th embodiment.

FIG. 7A is a schematic view of an imaging apparatus 4 according to the 4th embodiment of the present disclosure. FIG. 8 shows spherical aberration curves, astigmatic field curves and a distortion curve of the imaging apparatus 4 according to the 4th embodiment. In FIG. 7A, the imaging apparatus 4 includes an image capturing system lens assembly (its reference numeral is omitted) and an image sensor IS. The image capturing system lens assembly includes, in order from an object side to an image side along an optical path, a first lens element E1, an aperture stop ST, a reflective element E7, a stop S1, a second lens element E2, a stop S2, a third lens element E3, a fourth lens element E4, a fifth lens element E5, a filter E6 and an image surface IMG, wherein the image sensor IS is disposed on the image surface IMG of the image capturing system lens assembly. The image capturing system lens assembly includes five lens elements (E1, E2, E3, E4, E5) without additional one or more lens elements inserted between the first lens element E1 and the fifth lens element E5.

The first lens element E1 with negative refractive power has an object-side surface being concave in a paraxial region thereof and an image-side surface being convex in a paraxial region thereof. The first lens element E1 is made of a plastic material, and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of a plastic material, and has the object-side surface and the image-side surface being both aspheric. Furthermore, the object-side surface of the second lens element E2 includes one inflection point.

The third lens element E3 with negative refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes two inflection points, and the image-side surface of the third lens element E3 includes two inflection points.

The fourth lens element E4 with negative refractive power has an object-side surface being convex in a paraxial region thereof and an image-side surface being concave in a paraxial region thereof. The fourth lens element E4 is made of a plastic material, and has the object-side surface and the image-side surface being both aspheric. Furthermore, the image-side surface of the fourth lens element E4 includes two inflection points.

The fifth lens element E5 with positive refractive power has an object-side surface being convex in a paraxial region thereof and an image-side surface being concave in a paraxial region thereof. The fifth lens element E5 is made of a plastic material, and has the object-side surface and the image-side surface being both aspheric. Furthermore, the object-side surface of the fifth lens element E5 includes one inflection point, and the image-side surface of the fifth lens element E5 includes one inflection point and one critical point.

According to the 4th embodiment, the reflective element E7 is a prism, which is made of plastic material and disposed between the first lens element E1 and the second lens element E2.

The filter E6 is made of a glass material, which is located between the fifth lens element E5 and the image surface IMG in order, and will not affect the focal length of the image capturing system lens assembly.

The detailed optical data of the 4th embodiment are shown in Table 4A and the aspheric surface data are shown in Table 4B below.

TABLE 4A

4th Embodiment
f = 2.39 mm, Fno = 2.39, HFOV = 38.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.3194 | ASP | 1.040 | Plastic | 1.545 | 56.1 | 61.10 |
| 2 | | −2.5113 | ASP | 0.192 | | | | |
| 3 | Ape. Stop | Plano | | 0.012 | | | | |

TABLE 4A-continued

4th Embodiment
f = 2.39 mm, Fno = 2.39, HFOV = 38.2 deg.

| Surface # | | Curvature Radius | | Thickness | Material | Index | Abbe # | Focal Length |
|---|---|---|---|---|---|---|---|---|
| 4 | Prism | Plano | | 2.000 | Plastic | 1.793 | 47.6 | — |
| 5 | | Plano | | 0.100 | | | | |
| 6 | Stop | Plano | | 0.043 | | | | |
| 7 | Lens 2 | 1.7870 | ASP | 0.982 | Plastic | 1.534 | 56.0 | 2.31 |
| 8 | | −3.2043 | ASP | −0.275 | | | | |
| 9 | Stop | Plano | | 0.335 | | | | |
| 10 | Lens 3 | 11.2322 | ASP | 0.400 | Plastic | 1.686 | 18.4 | −2.89 |
| 11 | | 1.6612 | ASP | 0.200 | | | | |
| 12 | Lens 4 | 7.1523 | ASP | 0.932 | Plastic | 1.587 | 28.3 | −4.95 |
| 13 | | 1.9684 | ASP | 0.100 | | | | |
| 14 | Lens 5 | 0.5875 | ASP | 0.300 | Plastic | 1.686 | 18.4 | 2.10 |
| 15 | | 0.7862 | ASP | 0.320 | | | | |
| 16 | Filter | Plano | | 0.210 | Glass | 1.517 | 64.2 | — |
| 17 | | Plano | | 0.407 | | | | |
| 18 | Image | Plano | | — | | | | |

Reference wavelength is 587.6 nm (d-line).
Effective radius of Surface 6 (stop S1) is 0.940 mm.
Effective radius of Surface 9 (stop S2) is 1.150 mm.

TABLE 4B

Aspheric Coefficients

| Surface # | 1 | 2 | 7 | 8 | 10 |
|---|---|---|---|---|---|
| k= | 4.2021300E+00 | 6.7460200E+00 | −1.6687400E+00 | 4.6254200E+00 | 7.6213400E+01 |
| A4= | 2.5754534E−02 | 3.2026843E−02 | −1.9555172E−02 | −1.2342879E−01 | −2.8009284E−01 |
| A6= | −5.7634697E−02 | −1.0796339E−01 | −5.7307298E−03 | 1.1510415E+00 | 1.3640047E+00 |
| A8= | 4.8836667E−01 | 1.2877939E+00 | −6.3893534E−02 | −3.1618788E+00 | −3.0148273E+00 |
| A10= | −1.6203940E+00 | −6.1403112E+00 | 2.5612157E−01 | 4.6509303E+00 | 3.4674505E+00 |
| A12= | 3.4372598E+00 | 1.8802062E+01 | −6.2303020E−01 | −4.1801707E+00 | −2.0995043E+00 |
| A14= | −4.2370555E+00 | −3.5292899E+01 | 7.8068544E−01 | 2.2938031E+00 | 5.2302197E−01 |
| A16= | 2.8004640E+00 | 3.7583044E+01 | −5.1024214E−01 | −7.1216691E−01 | 4.6843087E−02 |
| A18= | −7.3574851E−01 | −1.7154202E+01 | 1.3349537E−01 | 9.7061782E−02 | −3.4348163E−02 |

| Surface # | 11 | 12 | 13 | 14 | 15 |
|---|---|---|---|---|---|
| k= | −5.1963500E+00 | 2.0949500E+01 | −8.1208000E+01 | −4.3676000E+00 | −1.9169200E+00 |
| A4= | −9.6267836E−02 | 1.0949524E−01 | −1.0117025E+00 | 3.8685856E−01 | 3.2454713E−01 |
| A6= | 5.6549003E−01 | 6.6334199E−02 | 4.3734062E+00 | −1.5031964E+00 | −2.3868897E+00 |
| A8= | −4.0156032E−01 | 7.2934256E−02 | −1.4613762E+01 | 7.6509358E−01 | 4.4012661E+00 |
| A10= | −1.1499835E+00 | −2.0718294E−01 | 3.7234400E+01 | 1.5022129E+00 | −4.7438271E+00 |
| A12= | 2.5992042E+00 | −1.7557321E−01 | −6.7667167E+01 | −2.9531723E+00 | 3.3224246E+00 |
| A14= | −2.2222517E+00 | 6.7391291E−01 | 8.5284796E+01 | 2.5504403E+00 | −1.5198240E+00 |
| A16= | 8.9134683E−01 | −6.2908650E−01 | −7.2019143E+01 | −1.3053266E+00 | 4.3420777E−01 |
| A18= | −1.3848739E−01 | 2.6052707E−01 | 3.8533688E+01 | 3.7986547E−01 | −6.9220840E−02 |
| A20= | | −4.1877773E−02 | −1.1714362E+01 | −4.7316040E−02 | 4.5457277E−03 |
| A22= | | | 1.5303121E+00 | | |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 4A and Table 4B as the following values and satisfy the following conditions in Table 4C:

TABLE 4C

4th Embodiment

| f [mm] | 2.39 | (R1 − R2)/(R1 + R2) | −0.04 |
|---|---|---|---|
| Fno | 2.39 | (R3 + R4)/(R3 − R4) | −0.28 |
| HFOV [degrees] | 38.2 | (R5 + R6)/(R5 − R6) | 1.35 |

TABLE 4C-continued

4th Embodiment

| ATmax/BL | 2.50 | (R7 − R8)/(R7 + R8) | 0.57 |
|---|---|---|---|
| ATmax/Y11 | 2.55 | SL/TL | 0.83 |
| ATmax/f | 0.98 | T12/f | 0.98 |
| CT1/CTmax | 1.00 | T12/ImgH | 1.30 |
| (CT2 + T23 + CT3 + T34 + CT4 + T45 + CT5)/f | 1.24 | (T23 + T34 + T45)/ΣAT | 0.13 |
| f/f12 | 1.21 | T45/f | 0.04 |
| f/f2 | 1.04 | TL/f | 3.05 |
| f/f3 | −0.83 | (TL − SL)/f | 0.51 |
| f/f45 | 0.55 | V1/N1 | 36.30 |
| f/ImgH | 1.33 | V2/N2 | 36.48 |
| f/R1 | −1.03 | V3/N3 | 10.90 |
| f/R3 | 1.34 | V4/N4 | 17.83 |
| f/R4 | −0.75 | V5/N5 | 10.90 |

TABLE 4C-continued

4th Embodiment

| | | | |
|---|---|---|---|
| f123/f234 | 0.45 | Y11/ImgH | 0.51 |
| f34/f45 | −0.37 | Y52/Y11 | 1.47 |
| (N3 + N5)/2 | 1.686 | FOV [degrees] | 76.3 |

Figure 7B:
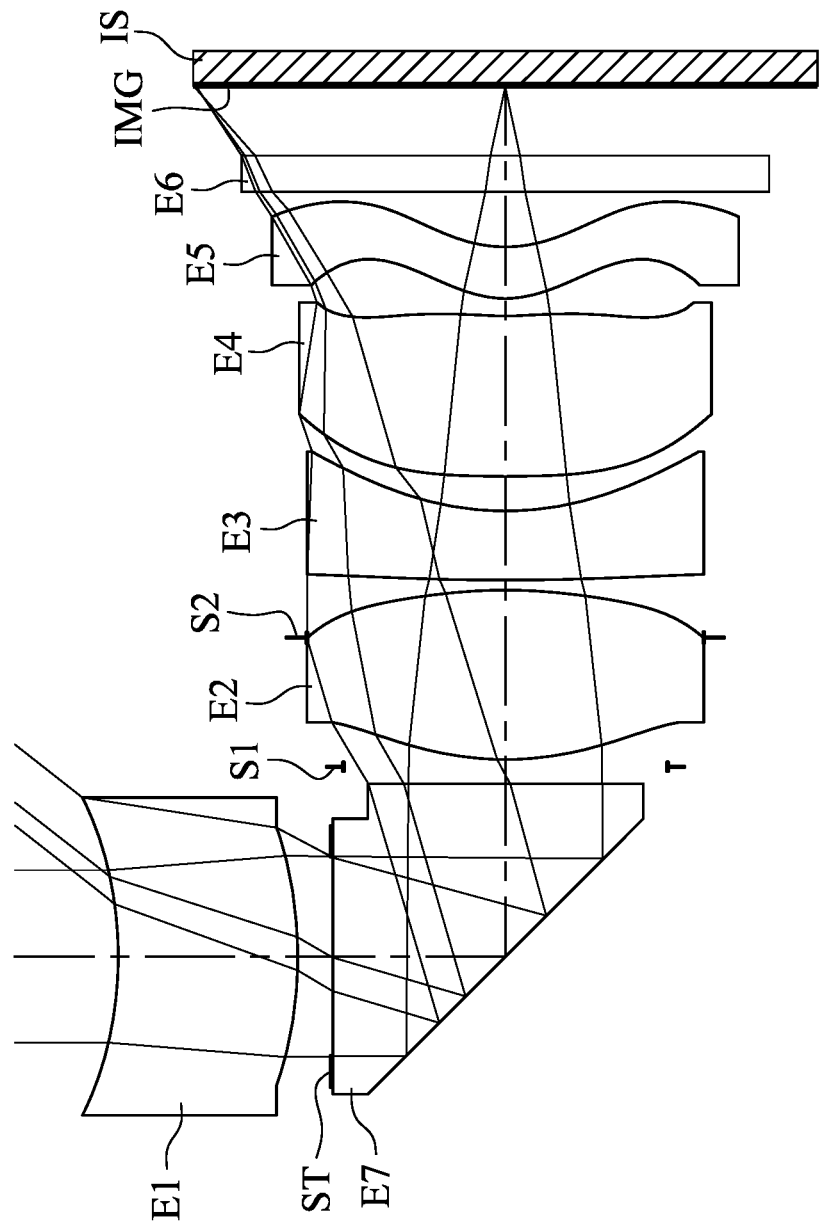
FIG. 7B is a schematic view of the imaging apparatus with another reflective element according to the 4th embodiment of the present disclosure.

Please refer to FIG. 7B, which is a schematic view of the imaging apparatus 4 with another reflective element E7 according to the 4th embodiment of the present disclosure. The difference between the FIG. 7B and FIG. 7A is that the reflective element E7 of FIG. 7B can fold the direction of the optical axis, so that the arrangement is favorable for adapting the electronic device with different requirements.

5th Embodiment

Figure 9A:
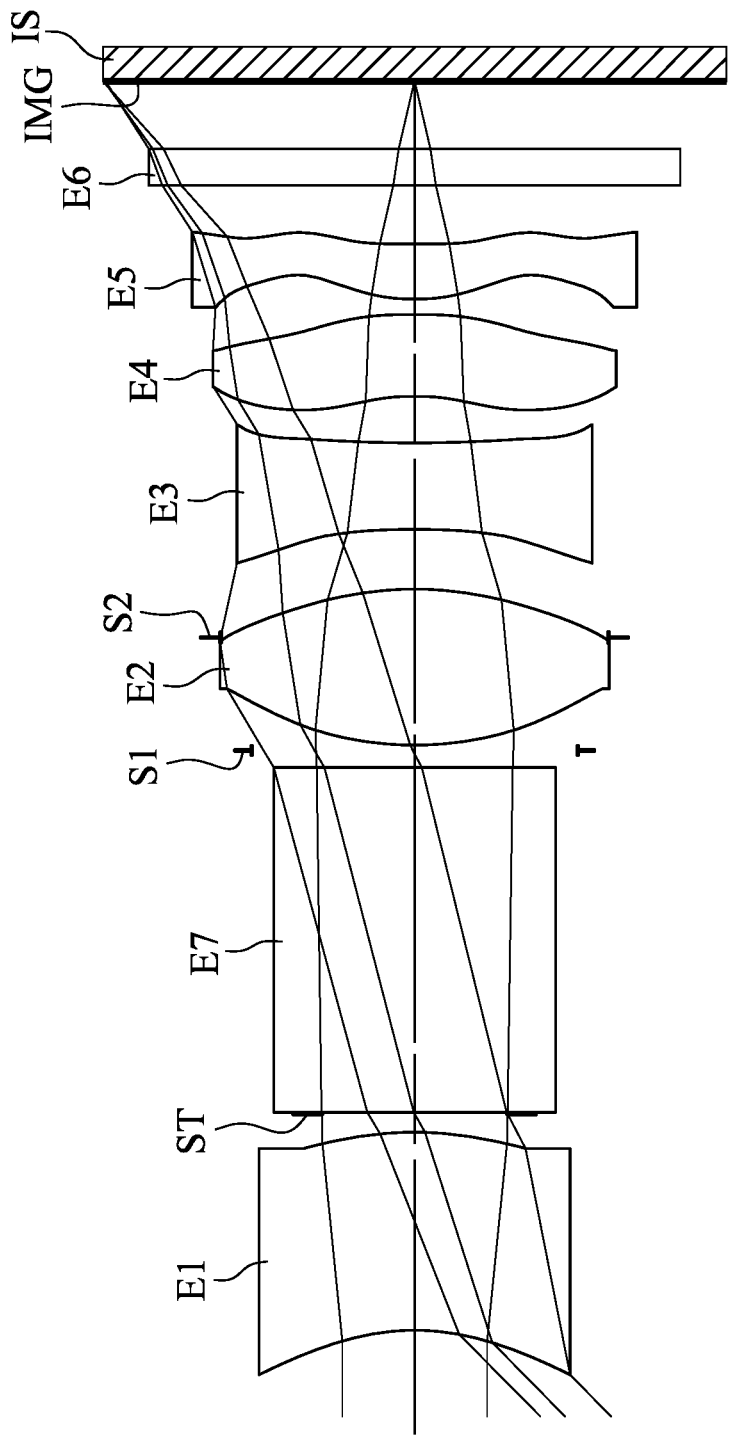
FIG. 9A is a schematic view of an imaging apparatus according to the 5th embodiment of the present disclosure.
Figure 10:
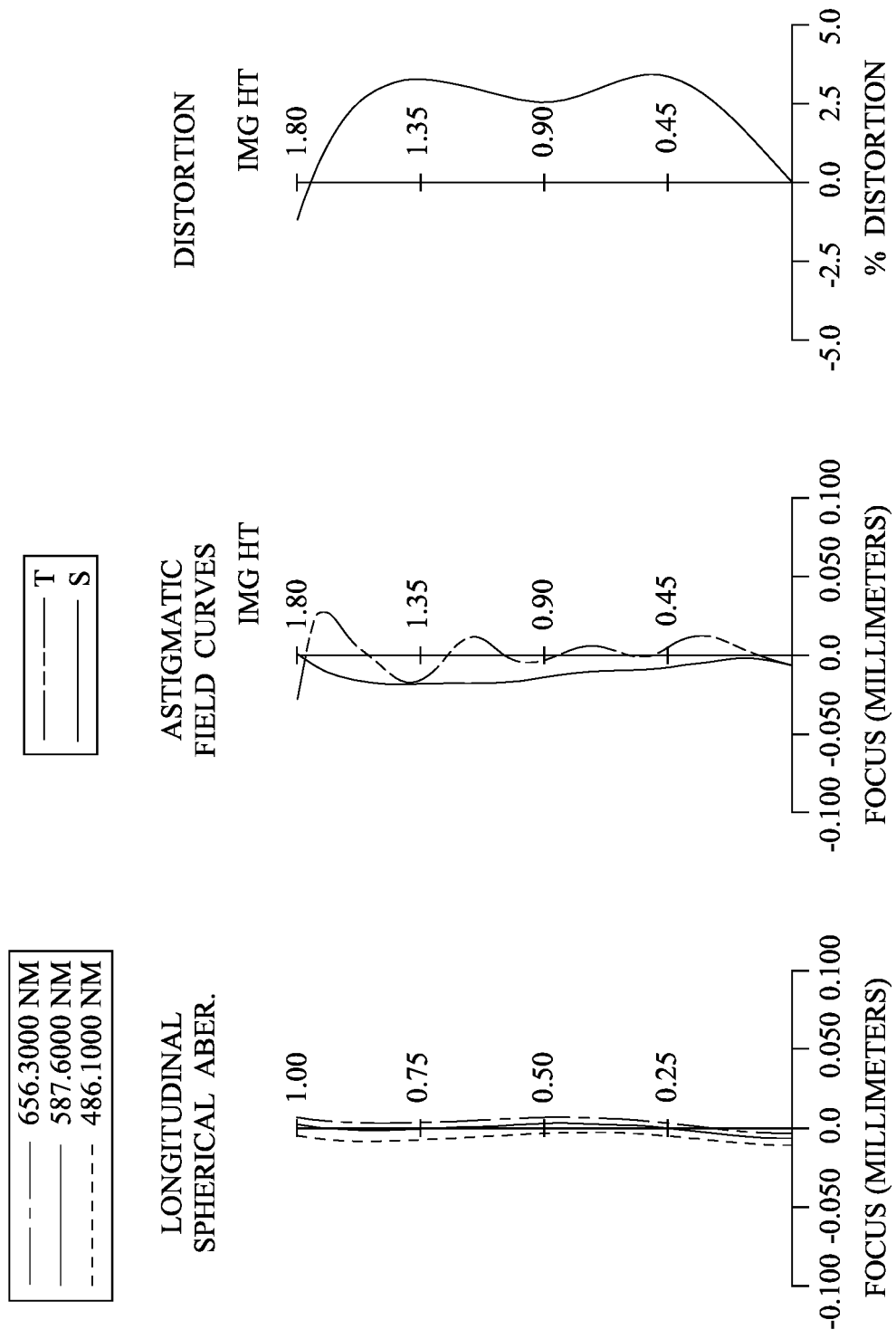
FIG. 10 shows spherical aberration curves, astigmatic field curves and a distortion curve of the imaging apparatus according to the 5th embodiment.

FIG. 9A is a schematic view of an imaging apparatus 5 according to the 5th embodiment of the present disclosure. FIG. 10 shows spherical aberration curves, astigmatic field curves and a distortion curve of the imaging apparatus 5 according to the 5th embodiment. In FIG. 9A, the imaging apparatus 5 includes an image capturing system lens assembly (its reference numeral is omitted) and an image sensor IS. The image capturing system lens assembly includes, in order from an object side to an image side along an optical path, a first lens element E1, an aperture stop ST, a reflective element E7, a stop S1, a second lens element E2, a stop S2, a third lens element E3, a fourth lens element E4, a fifth lens element E5, a filter E6 and an image surface IMG, wherein the image sensor IS is disposed on the image surface IMG of the image capturing system lens assembly. The image capturing system lens assembly includes five lens elements (E1, E2, E3, E4, E5) without additional one or more lens elements inserted between the first lens element E1 and the fifth lens element E5.

The first lens element E1 with negative refractive power has an object-side surface being concave in a paraxial region thereof and an image-side surface being convex in a paraxial region thereof. The first lens element E1 is made of a plastic material, and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of a plastic material, and has the object-side surface and the image-side surface being both aspheric. Furthermore, the object-side surface of the second lens element E2 includes one inflection point.

The third lens element E3 with negative refractive power has an object-side surface being concave in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point, and the image-side surface of the third lens element E3 includes two inflection points.

The fourth lens element E4 with negative refractive power has an object-side surface being concave in a paraxial region thereof and an image-side surface being convex in a paraxial region thereof. The fourth lens element E4 is made of a plastic material, and has the object-side surface and the image-side surface being both aspheric. Furthermore, the object-side surface of the fourth lens element E4 includes one inflection point, and the image-side surface of the fourth lens element E4 includes three inflection points.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes two inflection points, and the image-side surface of the fifth lens element E5 includes five inflection points and three critical points.

According to the 5th embodiment, the reflective element E7 is a prism, which is made of glass material and disposed between the first lens element E1 and the second lens element E2.

The filter E6 is made of a glass material, which is located between the fifth lens element E5 and the image surface IMG in order, and will not affect the focal length of the image capturing system lens assembly.

The detailed optical data of the 5th embodiment are shown in Table 5A and the aspheric surface data are shown in Table 5B below.

TABLE 5A

5th Embodiment
f = 1.85 mm, Fno = 2.20, HFOV = 44.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.3530 | ASP | 1.150 | Plastic | 1.545 | 56.1 | −25.79 |
| 2 | | −1.9460 | ASP | 0.105 | | | | |
| 3 | Ape. Stop | Plano | | 0.010 | | | | |
| 4 | Prism | Plano | | 2.000 | Glass | 1.945 | 17.9 | — |
| 5 | | Plano | | 0.100 | | | | |
| 6 | Stop | Plano | | 0.030 | | | | |
| 7 | Lens 2 | 1.9975 | ASP | 0.905 | Plastic | 1.544 | 56.0 | 1.96 |
| 8 | | −1.9228 | ASP | −0.280 | | | | |
| 9 | Stop | Plano | | 0.627 | | | | |
| 10 | Lens 3 | −4.5696 | ASP | 0.501 | Plastic | 1.686 | 18.4 | −3.64 |
| 11 | | 5.7407 | ASP | 0.270 | | | | |
| 12 | Lens 4 | −1.7784 | ASP | 0.476 | Plastic | 1.566 | 37.4 | −4.94 |
| 13 | | −5.3623 | ASP | 0.090 | | | | |

TABLE 5A-continued

5th Embodiment
f = 1.85 mm, Fno = 2.20, HFOV = 44.6 deg.

| Surface # | | Curvature Radius | Thickness | Material | Index | Abbe # | Focal Length |
|---|---|---|---|---|---|---|---|
| 14 | Lens 5 | 1.4208 ASP | 0.320 | Plastic | 1.544 | 56.0 | 2.10 |
| 15 | | −5.4339 ASP | 0.340 | | | | |
| 16 | Filter | Plano | 0.210 | Glass | 1.517 | 64.2 | — |
| 17 | | Plano | 0.393 | | | | |
| 18 | Image | Plano | — | | | | |

Reference wavelength is 587.6 nm (d-line).
Effective radius of Surface 6 (stop S1) is 0.945 mm.
Effective radius of Surface 9 (stop S2) is 1.123 mm.

TABLE 5B

| Aspheric Coefficients | | | | | |
|---|---|---|---|---|---|
| Surface # | 1 | 2 | 7 | 8 | 10 |
| k = | −1.0238800E+01 | −1.6536100E+01 | 4.3994800E−01 | 1.3452300E+00 | 1.1376000E+01 |
| A4 = | −3.6574770E−01 | −1.7343306E−01 | 2.4960449E−02 | 1.7056621E−01 | −1.4569041E−02 |
| A6 = | 8.8943387E−01 | 1.6038426E−01 | 2.4168644E−02 | −4.6318746E−01 | −2.0817853E−01 |
| A8 = | −1.7691457E+00 | 2.2072972E+00 | −1.7418781E−01 | 1.0935546E+00 | −2.2888153E+00 |
| A10 = | 2.6534226E+00 | −1.5825211E+01 | 4.1314743E−01 | −1.1579671E+00 | 9.0334101E+00 |
| A12 = | −2.7098706E+00 | 5.4177317E+01 | −7.0933088E−01 | 3.9204771E−02 | −1.0093480E+01 |
| A14 = | 1.6944563E+00 | −1.0628873E+02 | 8.3158732E−01 | 1.2902784E+00 | −4.7317739E+00 |
| A16 = | −5.4952526E−01 | 1.1665688E+02 | −6.2274010E−01 | −1.3935501E+00 | 2.3455935E+01 |
| A18 = | 6.0301374E−02 | −5.7157539E+01 | 2.6999888E−01 | 6.2030832E−01 | −2.5103204E+01 |
| A20 = | | | −5.4001629E−02 | −1.0355156E−01 | 1.2247281E+01 |
| A22 = | | | | | −2.3499111E+00 |
| Surface # | 11 | 12 | 13 | 14 | 15 |
| k = | 2.2498700E+01 | −3.0045800E+01 | 4.6403900E+00 | −7.5979600E−01 | 0.0000000E+00 |
| A4 = | −4.9484226E−01 | −2.2778719E+00 | −1.1006336E+00 | 1.5800740E+00 | 2.8242413E+00 |
| A6 = | 3.0811858E+00 | 1.6468866E+01 | 2.0327424E+01 | −1.1064859E+01 | −1.0939134E+01 |
| A8 = | −7.2797769E+00 | −5.5287215E+01 | 4.5593064E+00 | 4.3581282E+01 | 2.2545250E+01 |
| A10 = | −3.6177308E+00 | 1.1608551E+02 | −2.8118019E+01 | −1.3052092E+02 | −3.3122098E+01 |
| A12 = | 5.5353879E+01 | −1.6499086E+02 | 6.3830627E+01 | 2.6346458E+02 | 3.6411371E+01 |
| A14 = | −1.3311798E+02 | 1.6165024E+02 | −8.5124940E+01 | −3.4342319E+02 | −2.7788510E+01 |
| A16 = | 1.6809262E+02 | −1.0727861E+02 | 7.1383172E+01 | 2.8586814E+02 | 1.3399043E+01 |
| A18 = | −1.2264563E+02 | 4.5834363E+01 | −3.6988935E+01 | −1.4716607E+02 | −3.6221372E+00 |
| A20 = | 4.8799996E+01 | −1.1321235E+01 | 1.0818510E+01 | 4.2729428E+01 | 4.1696129E−01 |
| A22 = | −8.1991247E+00 | 1.2235799E+00 | −1.3638692E+00 | −5.3480560E+00 | −4.8407672E−05 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 5A and Table 5B as the following values and satisfy the following conditions in Table 5C:

TABLE 5C

| 5th Embodiment | |
|---|---|
| f [mm] | 1.85 |
| Fno | 2.20 |
| HFOV [degrees] | 44.6 |
| ATmax/BL | 2.38 |
| ATmax/Y11 | 2.49 |
| ATmax/f | 1.22 |
| CT/CTmax | 1.00 |
| (CT2 + T23 + CT3 + T34 + CT4 + T45 + CT5)/f | 1.58 |

TABLE 5C-continued

| 5th Embodiment | |
|---|---|
| f/f12 | 1.21 |
| f/f2 | 0.94 |
| f/f3 | −0.51 |
| f/f45 | 0.61 |
| f/ImgH | 1.03 |
| f/R1 | −1.36 |
| f/R3 | 0.92 |
| f/R4 | −0.96 |
| f123/f234 | 0.58 |
| f34/f45 | −0.67 |
| (N3 + N5)/2 | 1.615 |
| (R1 − R2)/(R1 + R2) | −0.18 |
| (R3 + R4)/(R3 − R4) | 0.02 |
| (R5 + R6)/(R5 − R6) | −0.11 |
| (R7 − R8)/(R7 + R8) | −0.50 |
| SL/TL | 0.83 |
| T12/f | 1.22 |
| T12/ImgH | 1.25 |
| (T23 + T34 + T45)/ΣAT | 0.24 |
| T45/f | 0.05 |
| TL/f | 3.93 |
| (TL − SL)/f | 0.68 |

TABLE 5C-continued

5th Embodiment

| | |
|---|---|
| V1/N1 | 36.30 |
| V2/N2 | 36.26 |
| V3/N3 | 10.90 |
| V4/N4 | 23.91 |
| V5/N5 | 36.26 |
| Y11/ImgH | 0.50 |
| Y52/Y11 | 1.43 |
| FOV [degrees] | 89.1 |

Figure 9B:
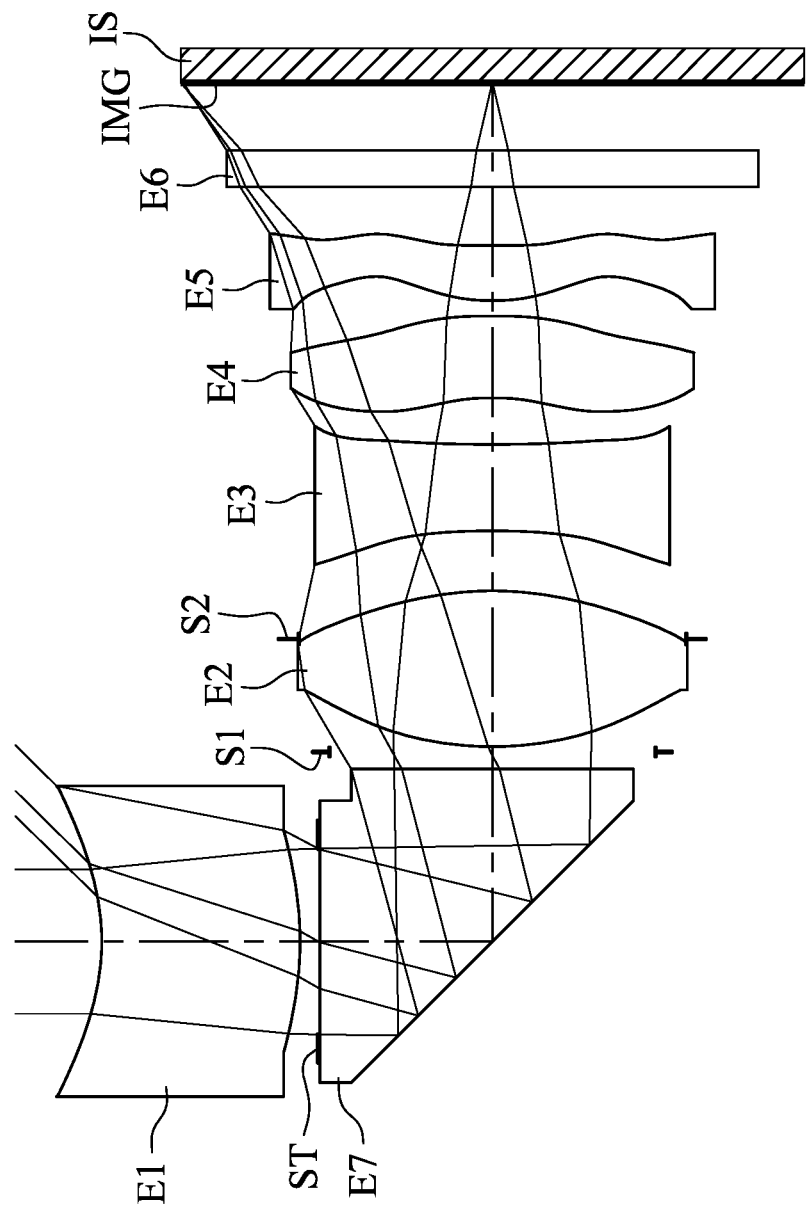
FIG. 9B is a schematic view of the imaging apparatus with another reflective element according to the 5th embodiment of the present disclosure.

Please refer to FIG. 9B, which is a schematic view of the imaging apparatus 5 with another reflective element E7 according to the 5th embodiment of the present disclosure. The difference between the FIG. 9B and FIG. 9A is that the reflective element E7 of FIG. 9B can fold the direction of the optical axis, so that the arrangement is favorable for adapting the electronic device with different requirements.

6th Embodiment

Figure 11A:
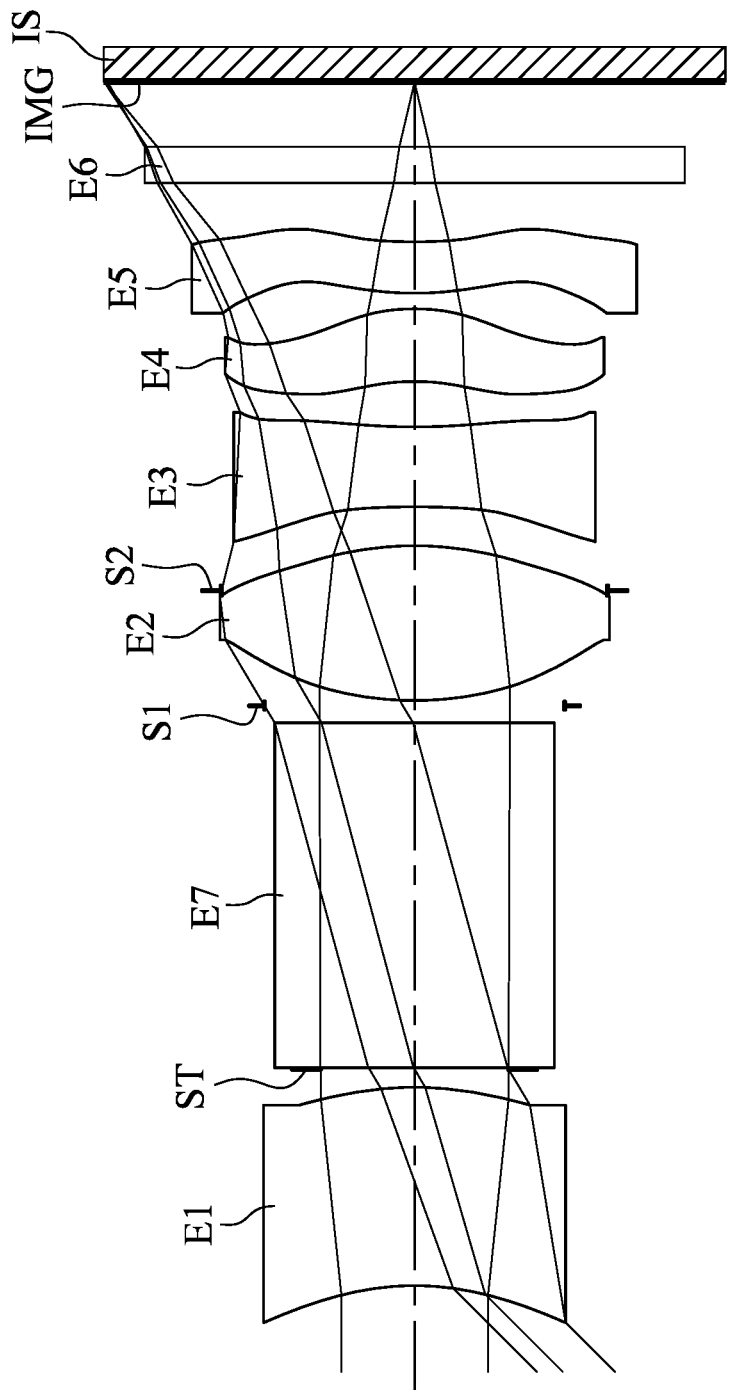
FIG. 11A is a schematic view of an imaging apparatus according to the 6th embodiment of the present disclosure.
Figure 12:
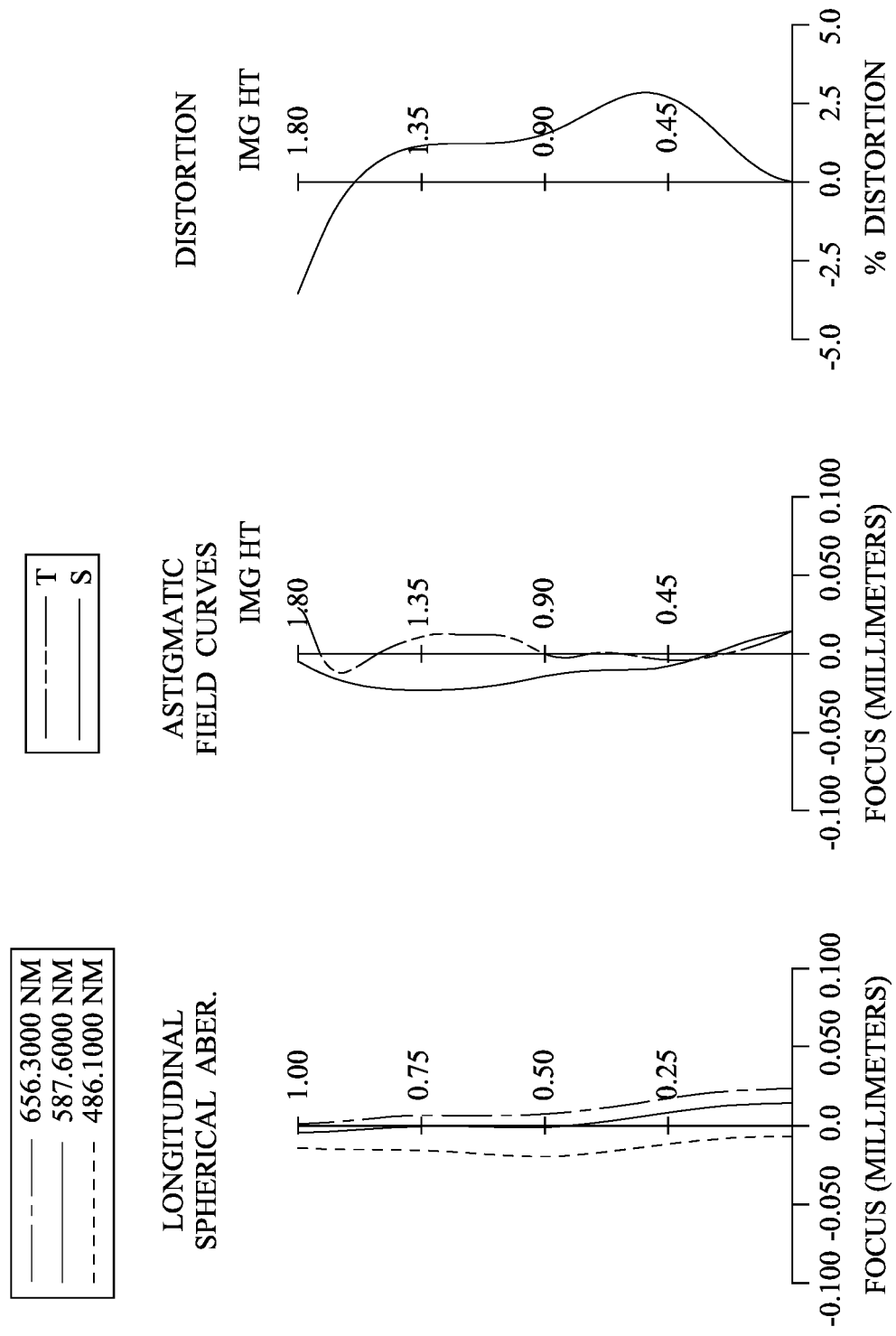
FIG. 12 shows spherical aberration curves, astigmatic field curves and a distortion curve of the imaging apparatus according to the 6th embodiment.

FIG. 11A is a schematic view of an imaging apparatus 6 according to the 6th embodiment of the present disclosure. FIG. 12 shows spherical aberration curves, astigmatic field curves and a distortion curve of the imaging apparatus 6 according to the 6th embodiment. In FIG. 11A, the imaging apparatus 6 includes an image capturing system lens assembly (its reference numeral is omitted) and an image sensor IS. The image capturing system lens assembly includes, in order from an object side to an image side along an optical path, a first lens element E1, an aperture stop ST, a reflective element E7, a stop S1, a second lens element E2, a stop S2, a third lens element E3, a fourth lens element E4, a fifth lens element E5, a filter E6 and an image surface IMG, wherein the image sensor IS is disposed on the image surface IMG of the image capturing system lens assembly. The image capturing system lens assembly includes five lens elements (E1, E2, E3, E4, E5) without additional one or more lens elements inserted between the first lens element E1 and the fifth lens element E5.

The first lens element E1 with positive refractive power has an object-side surface being concave in a paraxial region thereof and an image-side surface being convex in a paraxial region thereof. The first lens element E1 is made of a plastic material, and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of a plastic material, and has the object-side surface and the image-side surface being both aspheric. Furthermore, the object-side surface of the second lens element E2 includes one inflection point.

The third lens element E3 with negative refractive power has an object-side surface being concave in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point, and the image-side surface of the third lens element E3 includes two inflection points.

The fourth lens element E4 with positive refractive power has an object-side surface being convex in a paraxial region thereof and an image-side surface being convex in a paraxial region thereof. The fourth lens element E4 is made of a plastic material, and has the object-side surface and the image-side surface being both aspheric. Furthermore, the object-side surface of the fourth lens element E4 includes one inflection point, and the image-side surface of the fourth lens element E4 includes one inflection point.

The fifth lens element E5 with positive refractive power has an object-side surface being convex in a paraxial region thereof and an image-side surface being concave in a paraxial region thereof. The fifth lens element E5 is made of a plastic material, and has the object-side surface and the image-side surface being both aspheric. Furthermore, the object-side surface of the fifth lens element E5 includes one inflection point, and the image-side surface of the fifth lens element E5 includes three inflection points and one critical point.

According to the 6th embodiment, the reflective element E7 is a prism, which is made of glass material and disposed between the first lens element E1 and the second lens element E2.

The filter E6 is made of a glass material, which is located between the fifth lens element E5 and the image surface IMG in order, and will not affect the focal length of the image capturing system lens assembly.

The detailed optical data of the 6th embodiment are shown in Table 6A and the aspheric surface data are shown in Table 6B below.

TABLE 6A

6th Embodiment
f = 1.87 mm, Fno = 2.20, HFOV = 45.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.5874 | ASP | 1.150 | Plastic | 1.716 | 16.6 | 54.16 |
| 2 | | −1.9860 | ASP | 0.105 | | | | |
| 3 | Ape. Stop | Plano | | 0.010 | | | | |
| 4 | Prism | Plano | | 2.000 | Glass | 1.947 | 18.0 | — |
| 5 | | Plano | | 0.100 | | | | |
| 6 | Stop | Plano | | 0.030 | | | | |
| 7 | Lens 2 | 2.0229 | ASP | 0.898 | Plastic | 1.544 | 56.0 | 1.96 |
| 8 | | −1.9007 | ASP | −0.260 | | | | |
| 9 | Stop | Plano | | 0.485 | | | | |
| 10 | Lens 3 | −4.5387 | ASP | 0.465 | Plastic | 1.686 | 18.4 | −3.64 |
| 11 | | 5.7765 | ASP | 0.263 | | | | |
| 12 | Lens 4 | −1.3844 | ASP | 0.421 | Plastic | 1.544 | 56.0 | 19.12 |
| 13 | | −1.3527 | ASP | 0.090 | | | | |
| 14 | Lens 5 | 2.4079 | ASP | 0.300 | Plastic | 1.686 | 18.4 | 5.65 |

TABLE 6A-continued

6th Embodiment
f = 1.87 mm, Fno = 2.20, HFOV = 45.0 deg.

| Surface # | | Curvature Radius | | Thickness | Material | Index | Abbe # | Focal Length |
|---|---|---|---|---|---|---|---|---|
| 15 | | 6.0310 | ASP | 0.340 | | | | |
| 16 | Filter | Plano | | 0.210 | Glass | 1.517 | 64.2 | — |
| 17 | | Plano | | 0.379 | | | | |
| 18 | Image | Plano | | — | | | | |

Reference wavelength is 587.6 nm (d-line).
Effective radius of Surface 6 (stop S1) is 0.870 mm.
Effective radius of Surface 9 (stop S2) is 1.120 mm.

TABLE 6B

Aspheric Coefficients

| Surface# | 1 | 2 | 7 | 8 | 10 |
|---|---|---|---|---|---|
| k = | −1.2679400E+01 | −1.5925500E+01 | 7.1437300E−01 | 1.2845300E+00 | 1.1142400E+01 |
| A4 = | −2.9338701E−01 | −1.7347126E−01 | 5.5729178E−02 | 2.7380355E−01 | 5.1410685E−01 |
| A6 = | 6.4049813E−01 | 1.1986064E−01 | −2.2239106E−01 | −1.7583082E+00 | −5.5219590E+00 |
| A8 = | −1.2209479E+00 | 2.5680725E+00 | 9.5860150E−01 | 5.7962644E+00 | 1.7551511E+01 |
| A10 = | 1.9079473E+00 | −2.0479736E+01 | −2.3523472E+00 | −8.8045343E+00 | −2.7826148E+01 |
| A12 = | −2.1794373E+00 | 8.1519085E+01 | 3.5002904E+00 | 5.9692521E+00 | 2.4292789E+01 |
| A14 = | 1.5856102E+00 | −1.8512669E+02 | −3.3324156E+00 | −1.1238228E−01 | −1.3091689E+01 |
| A16 = | −5.8836567E−01 | 2.2694787E+02 | 1.9654721E+00 | −2.3277576E+00 | 8.3705459E+00 |
| A18 = | 6.1836509E−02 | −1.1638875E+02 | −6.3889005E−01 | 1.2944783E+00 | −7.8038966E+00 |
| A20 = | | | 8.1994616E−02 | −2.2745175E−01 | 4.4001952E+00 |
| A22 = | | | | | −9.4062826E−01 |

| Surface # | 11 | 12 | 13 | 14 | 15 |
|---|---|---|---|---|---|
| k = | 2.0192900E+01 | −3.8524900E+01 | 0.0000000E+00 | 0.0000000E+00 | 0.0000000E+00 |
| A4 = | 6.5874805E−01 | −2.0545104E+00 | −1.4872259E+00 | 2.9255431E−01 | 1.7178631E+00 |
| A6 = | −5.6269852E+00 | 1.5002571E+01 | 9.3249190E+00 | −5.2049272E−01 | −7.7007219E+00 |
| A8 = | 2.4521740E+01 | −5.1644065E+01 | −2.8431259E+01 | −3.7992053E+00 | 1.6239806E+01 |
| A10 = | −7.1272606E+01 | 1.1766493E+02 | 5.6763715E+01 | 7.1034867E+00 | −2.2120406E+01 |
| A12 = | 1.3857415E+02 | −1.9194009E+02 | −4.8080329E+01 | 4.2159297E+00 | 2.0678353E+01 |
| A14 = | −1.7931395E+02 | 2.2180052E+02 | −9.7476515E+01 | −2.6211070E+01 | −1.2928292E+01 |
| A16 = | 1.5243635E+02 | −1.7385687E+02 | 4.1962942E+02 | 3.5570696E+01 | 5.0465964E+00 |
| A18 = | −8.1659279E+01 | 8.6909946E+01 | −7.7317354E+02 | −2.4146236E+01 | −1.0603828E+00 |
| A20 = | 2.4999460E+01 | −2.4862126E+01 | 9.2026319E+02 | 8.4359213E+00 | 5.9556706E−02 |
| A22 = | −3.3482546E+00 | 3.0894934E+00 | −7.6628641E+02 | −1.2043807E+00 | 1.6836846E−02 |
| A24 = | | | 4.4759019E+02 | 5.0933650E−05 | −3.0903581E−03 |
| A26 = | | | −1.7526296E+02 | | 2.5584608E−04 |
| A28 = | | | 4.1289768E+01 | | |
| A30 = | | | −4.4192073E+00 | | |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 6A and Table 6B as the following values and satisfy the following conditions in Table 6C:

TABLE 6C

6th Embodiment

| | |
|---|---|
| f [mm] | 1.87 |
| Fno | 2.20 |
| HFOV [degrees] | 45.0 |
| ATmax/BL | 2.42 |
| ATmax/Y11 | 2.56 |
| ATmax/f | 1.20 |

TABLE 6C-continued

6th Embodiment

| | |
|---|---|
| CT/CTmax | 1.00 |
| (CT2 + T23 + CT3 + T34 + CT4 + T45 + CT5)/f | 1.42 |
| f/f12 | 1.25 |
| f/f2 | 0.96 |
| f/f3 | −0.52 |
| f/f45 | 0.47 |
| f/ImgH | 1.04 |
| f/R1 | −1.18 |
| f/R3 | 0.93 |
| f/R4 | −0.99 |
| f123/f234 | 0.73 |
| f34/f45 | −1.33 |
| (N3 + N5)/2 | 1.686 |
| (R1 − R2)/(R1 + R2) | −0.11 |
| (R3 + R4)/(R3 − R4) | 0.03 |
| (R5 + R6)/(R5 − R6) | −0.12 |
| (R7 − R8)/(R7 + R8) | 0.01 |
| SL/TL | 0.82 |

TABLE 6C-continued

| 6th Embodiment | |
| --- | --- |
| T12/f | 1.20 |
| T12/ImgH | 1.25 |
| (T23 + T34 + T45)/ΣAT | 0.20 |
| T45/f | 0.05 |
| TL/f | 3.73 |
| (TL − SL)/f | 0.67 |
| V1/N1 | 9.68 |
| V2/N2 | 36.26 |
| V3/N3 | 10.90 |
| V4/N4 | 36.26 |
| V5/N5 | 10.90 |
| Y11/ImgH | 0.49 |
| Y52/Y11 | 1.47 |
| FOV [degrees] | 90.0 |

Figure 11B:
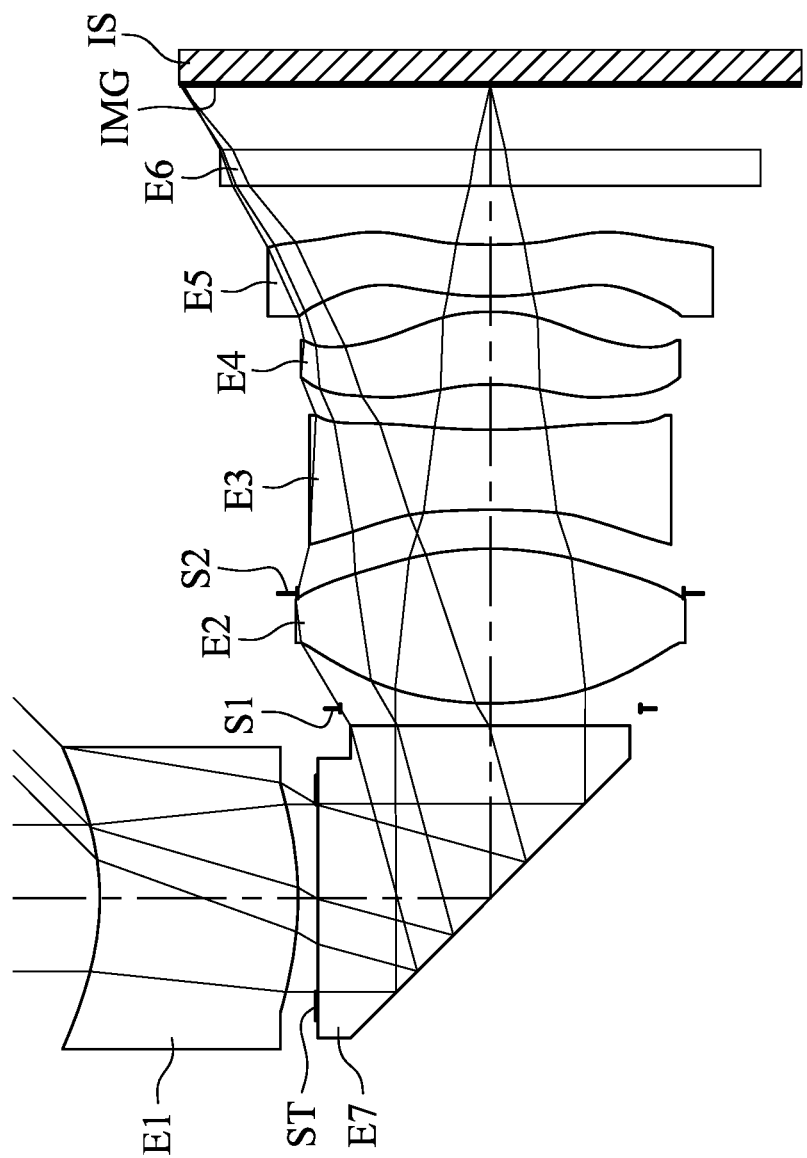
FIG. 11B is a schematic view of the imaging apparatus with another reflective element according to the 6th embodiment of the present disclosure.

Please refer to FIG. 11B, which is a schematic view of the imaging apparatus 6 with another reflective element E7 according to the 6th embodiment of the present disclosure. The difference between the FIG. 11B and FIG. 11A is that the reflective element E7 of FIG. 11B can fold the direction of the optical axis, so that the arrangement is favorable for adapting the electronic device with different requirements.

7th Embodiment

Figure 13A:
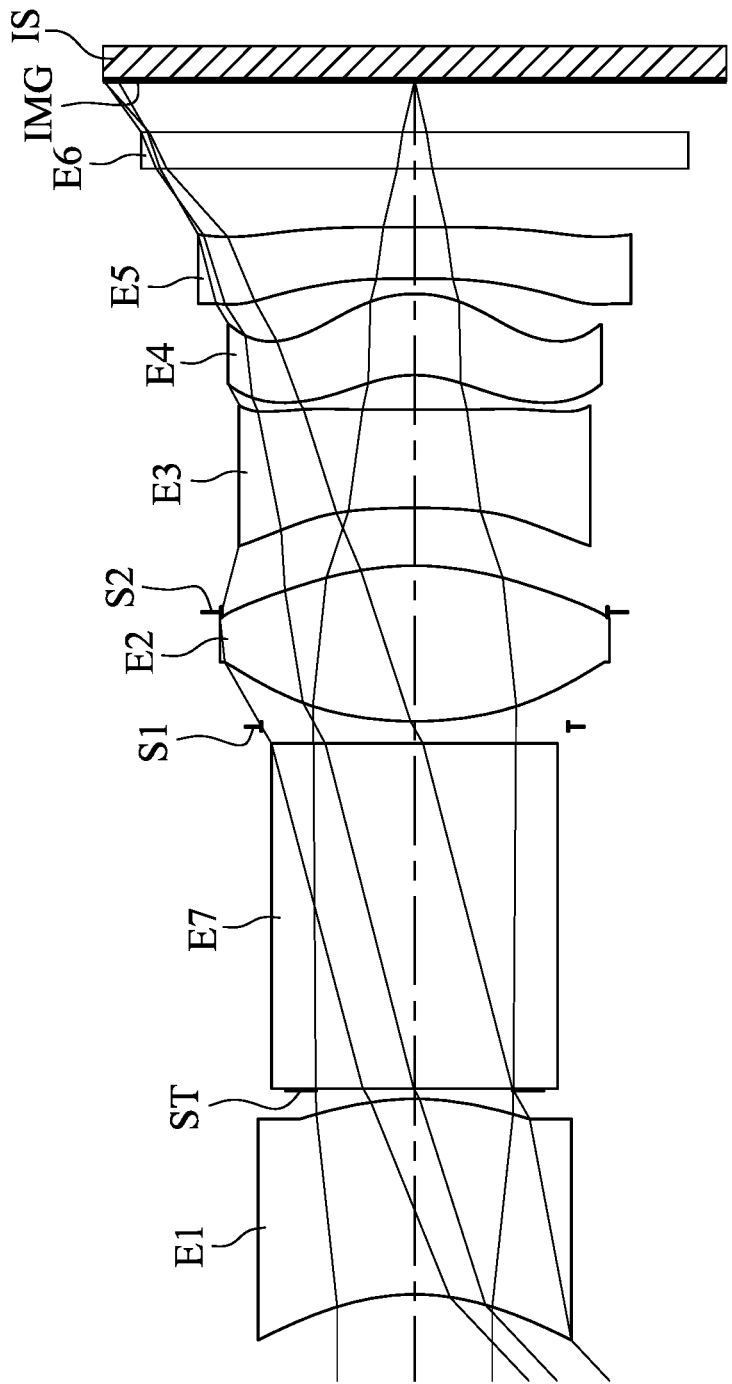
FIG. 13A is a schematic view of an imaging apparatus according to the 7th embodiment of the present disclosure.
Figure 14:
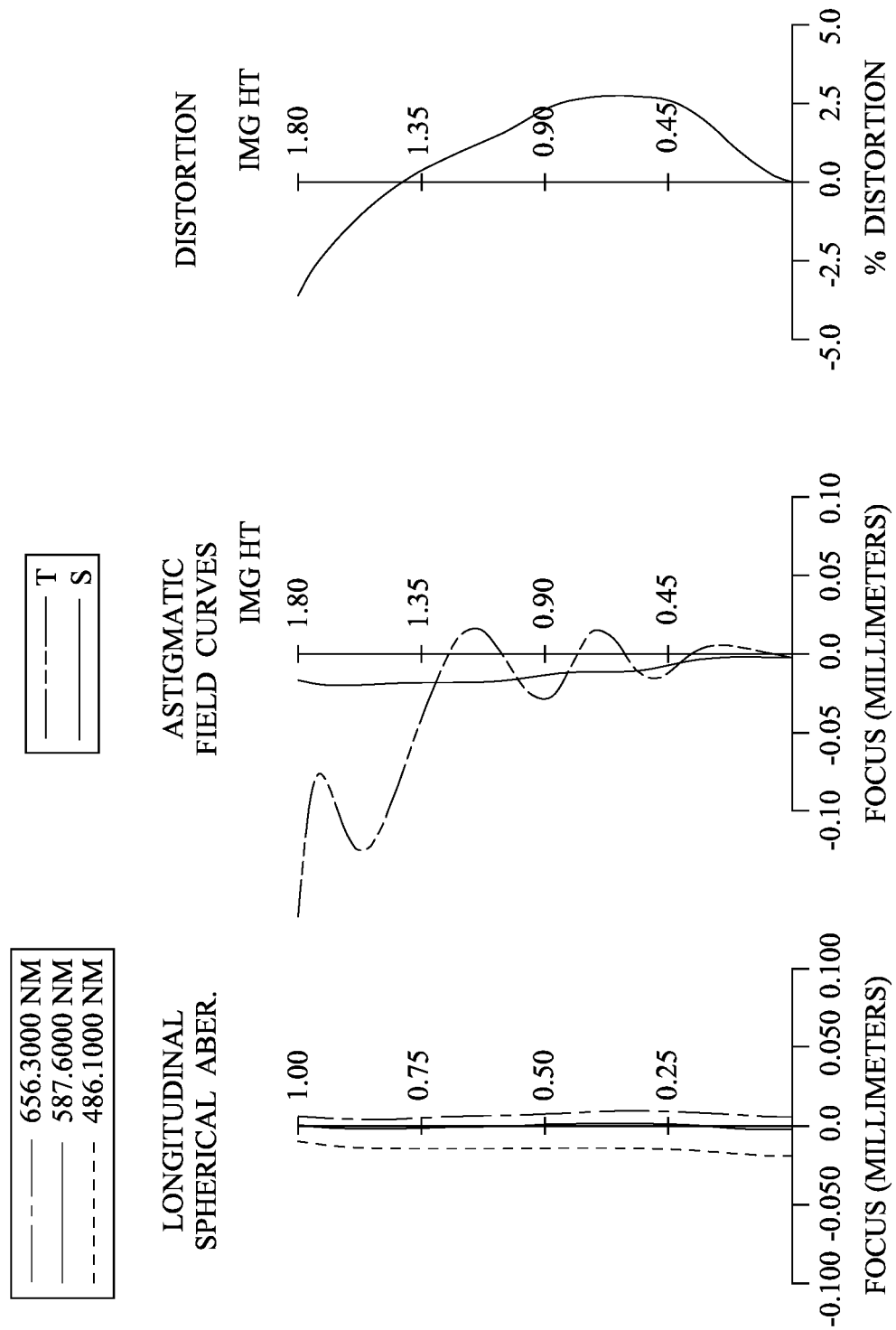
FIG. 14 shows spherical aberration curves, astigmatic field curves and a distortion curve of the imaging apparatus according to the 7th embodiment.

FIG. 13A is a schematic view of an imaging apparatus 7 according to the 7th embodiment of the present disclosure. FIG. 14 shows spherical aberration curves, astigmatic field curves and a distortion curve of the imaging apparatus 7 according to the 7th embodiment. In FIG. 13A, the imaging apparatus 7 includes an image capturing system lens assembly (its reference numeral is omitted) and an image sensor IS. The image capturing system lens assembly includes, in order from an object side to an image side along an optical path, a first lens element E1, an aperture stop ST, a reflective element E7, a stop S1, a second lens element E2, a stop S2, a third lens element E3, a fourth lens element E4, a fifth lens element E5, a filter E6 and an image surface IMG, wherein the image sensor IS is disposed on the image surface IMG of the image capturing system lens assembly. The image capturing system lens assembly includes five lens elements (E1, E2, E3, E4, E5) without additional one or more lens elements inserted between the first lens element E1 and the fifth lens element E5.

The first lens element E1 with positive refractive power has an object-side surface being concave in a paraxial region thereof and an image-side surface being convex in a paraxial region thereof. The first lens element E1 is made of a plastic material, and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of a plastic material, and has the object-side surface and the image-side surface being both aspheric. Furthermore, the object-side surface of the second lens element E2 includes one inflection point.

The third lens element E3 with negative refractive power has an object-side surface being concave in a paraxial region thereof and an image-side surface being convex in a paraxial region thereof. The third lens element E3 is made of a plastic material, and has the object-side surface and the image-side surface being both aspheric. Furthermore, the object-side surface of the third lens element E3 includes one inflection point, and the image-side surface of the third lens element E3 includes three inflection points.

The fourth lens element E4 with positive refractive power has an object-side surface being concave in a paraxial region thereof and an image-side surface being convex in a paraxial region thereof. The fourth lens element E4 is made of a plastic material, and has the object-side surface and the image-side surface being both aspheric. Furthermore, the object-side surface of the fourth lens element E4 includes one inflection point, and the image-side surface of the fourth lens element E4 includes one inflection point.

The fifth lens element E5 with positive refractive power has an object-side surface being convex in a paraxial region thereof and an image-side surface being convex in a paraxial region thereof. The fifth lens element E5 is made of a plastic material, and has the object-side surface and the image-side surface being both aspheric. Furthermore, the object-side surface of the fifth lens element E5 includes two inflection points, and the image-side surface of the fifth lens element E5 includes two inflection points and one critical point.

According to the 7th embodiment, the reflective element E7 is a prism, which is made of glass material and disposed between the first lens element E1 and the second lens element E2.

The filter E6 is made of a glass material, which is located between the fifth lens element E5 and the image surface IMG in order, and will not affect the focal length of the image capturing system lens assembly.

The detailed optical data of the 7th embodiment are shown in Table 7A and the aspheric surface data are shown in Table 7B below.

TABLE 7A

7th Embodiment
f = 1.98 mm, Fno = 2.20, HFOV = 43.3 deg.

| Surface # | | Curvature Radius | | Thickness | Material | Index | Abbe # | Focal Length |
| --- | --- | --- | --- | --- | --- | --- | --- | --- |
| 0 | Object | Plano | | Infinity | | | | |
| 1 | Lens 1 | −1.3468 | ASP | 1.135 | Plastic | 1.545 | 56.1 | 64.33 |
| 2 | | −1.6825 | ASP | 0.050 | | | | |
| 3 | Ape. Stop | Plano | | 0.010 | | | | |
| 4 | Prism | Plano | | 2.000 | Glass | 1.945 | 17.9 | — |
| 5 | | Plano | | 0.100 | | | | |
| 6 | Stop | Plano | | 0.030 | | | | |
| 7 | Lens 2 | 2.1565 | ASP | 0.903 | Plastic | 1.544 | 56.0 | 1.94 |
| 8 | | −1.7690 | ASP | −0.270 | | | | |
| 9 | Stop | Plano | | 0.606 | | | | |
| 10 | Lens 3 | −3.9065 | ASP | 0.571 | Plastic | 1.686 | 18.4 | −10.40 |
| 11 | | −9.1491 | ASP | 0.200 | | | | |

TABLE 7A-continued

7th Embodiment
f = 1.98 mm, Fno = 2.20, HFOV = 43.3 deg.

| Surface # | | Curvature Radius | | Thickness | Material | Index | Abbe # | Focal Length |
|---|---|---|---|---|---|---|---|---|
| 12 | Lens 4 | −0.7023 | ASP | 0.468 | Plastic | 1.544 | 56.0 | 35.66 |
| 13 | | −0.8369 | ASP | 0.090 | | | | |
| 14 | Lens 5 | 11.0237 | ASP | 0.300 | Plastic | 1.686 | 18.4 | 15.81 |
| 15 | | −671.0002 | ASP | 0.340 | | | | |
| 16 | Filter | Plano | | 0.210 | Glass | 1.517 | 64.2 | — |
| 17 | | Plano | | 0.301 | | | | |
| 18 | Image | Plano | | — | | | | |

Reference wavelength is 587.6 nm (d-line).
Effective radius of Surface 6 (stop S1) is 0.890 mm
Effective radius of Surface 9 (stop S2) is 1.120 mm

TABLE 7B

Aspheric Coefficients

| Surface # | 1 | 2 | 7 | 8 | 10 |
|---|---|---|---|---|---|
| k = | −9.2798400E+00 | −1.3934500E+01 | 9.7017700E−01 | 9.0357600E−01 | 9.2905300E+00 |
| A4 = | −3.4161952E−01 | −2.4619081E−01 | 5.0490128E−02 | 1.7887831E−01 | 1.7409314E−01 |
| A6 = | 7.5260165E−01 | 4.2523150E−01 | −1.9902537E−02 | −5.4224012E−01 | −1.3422875E+00 |
| A8 = | −1.3416492E+00 | 1.3986590E+00 | −1.3145575E−01 | 1.3676214E+00 | −1.5795860E+00 |
| A10 = | 1.8472559E+00 | −1.5296014E+01 | 6.2793528E−01 | −1.4517911E+00 | 2.0074297E+01 |
| A12 = | −1.7761829E+00 | 6.2579994E+01 | −1.4913474E+00 | 3.3537023E−01 | −5.1625292E+01 |
| A14 = | 1.0766197E+00 | −1.4040571E+02 | 2.0402429E+00 | 6.0593538E−01 | 6.8510397E+01 |
| A16 = | −3.4752874E−01 | 1.6902061E+02 | −1.6606976E+00 | −4.7847275E−01 | −5.2662413E+01 |
| A18 = | 3.8219652E−02 | −8.5525244E+01 | 7.5595239E−01 | 8.5970434E−02 | 2.3415449E+01 |
| A20 = | | | −1.5042692E−01 | 9.6516660E−03 | −5.5962180E+00 |
| A22 = | | | | | 5.7968636E−01 |

| Surface # | 11 | 12 | 13 | 14 | 15 |
|---|---|---|---|---|---|
| k = | 0.0000000E+00 | −1.0000000E+00 | −1.0000000E+00 | 0.0000000E+00 | 0.0000000E+00 |
| A4 = | 6.4287264E−01 | 1.1049946E+00 | −1.4939281E+00 | −1.6018034E+00 | 2.6910882E−02 |
| A6 = | −2.5622642E+00 | −6.3690302E+00 | 8.8146654E+00 | 7.0247091E+00 | −1.1904713E+00 |
| A8 = | 7.4640600E+00 | 7.5963943E+01 | −2.3239897E+01 | −1.9434666E+01 | 4.5205906E+00 |
| A10 = | −2.4020492E+01 | −4.8957832E+02 | 4.0054733E+01 | 3.6116407E+01 | −8.9898481E+00 |
| A12 = | 5.7989965E+01 | 2.0062112E+03 | −2.9899375E+01 | −4.6501473E+01 | 1.0728964E+01 |
| A14 = | −8.4473520E+01 | −5.7655683E+03 | −5.5495206E+01 | 4.0789948E+01 | −7.8486293E+00 |
| A16 = | 7.0592246E+01 | 1.2105808E+04 | 2.1751869E+02 | −2.2907582E+01 | 3.4508976E+00 |
| A18 = | −3.1239318E+01 | −1.8813046E+04 | −3.7178523E+02 | 7.3390708E+00 | −8.3977230E−01 |
| A20 = | 5.6750418E+00 | 2.1582503E+04 | 4.1859802E+02 | −1.0141262E+00 | 8.7141764E−02 |
| A22 = | −1.5344462E−05 | −1.8009484E+04 | −3.3574036E+02 | | −6.1315917E−08 |
| A24 = | | 1.0611874E+04 | 1.9108238E+02 | | |
| A26 = | | −4.1804115E+03 | −7.3271956E+01 | | |
| A28 = | | 9.8722420E+02 | 1.6938852E+01 | | |
| A30 = | | −1.0562725E+02 | −1.7817125E+00 | | |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 7A and Table 7B as the following values and satisfy the following conditions in Table 7C:

TABLE 7C

| 7th Embodiment | |
|---|---|
| f [mm] | 1.98 |
| Fno | 2.20 |
| HFOV [degrees] | 43.3 |

TABLE 7C-continued

| 7th Embodiment | |
|---|---|
| ATmax/BL | 2.57 |
| ATmax/Y11 | 2.41 |
| ATmax/f | 1.11 |
| CT/CTmax | 1.00 |
| (CT2 + T23 + CT3 + T34 + CT4 + T45 + CT5)/f | 1.45 |
| f/f12 | 1.33 |
| f/f2 | 1.02 |
| f/f3 | −0.19 |
| f/f45 | 0.21 |
| f/ImgH | 1.10 |
| f/R1 | −1.47 |
| f/R3 | 0.92 |
| f/R4 | −1.12 |
| f123/f234 | 0.64 |
| f34/f45 | −2.26 |

TABLE 7C-continued

7th Embodiment

| | |
|---|---|
| (N3 + N5)/2 | 1.686 |
| (R1 − R2)/(R1 + R2) | −0.11 |
| (R3 + R4)/(R3 − R4) | 0.10 |
| (R5 + R6)/(R5 − R6) | −2.49 |
| (R7 − R8)/(R7 + R8) | −0.09 |
| SL/TL | 0.83 |
| T12/f | 1.11 |
| T12/ImgH | 1.22 |
| (T23 + T34 + T45)/ΣAT | 0.22 |
| T45/f | 0.05 |
| TL/f | 3.56 |
| (TL − SL)/f | 0.60 |
| V1/N1 | 36.30 |
| V2/N2 | 36.26 |
| V3/N3 | 10.90 |
| V4/N4 | 36.26 |
| V5/N5 | 10.90 |
| Y11/ImgH | 0.50 |
| Y52/Y11 | 1.38 |
| FOV [degrees] | 86.6 |

Figure 13B:
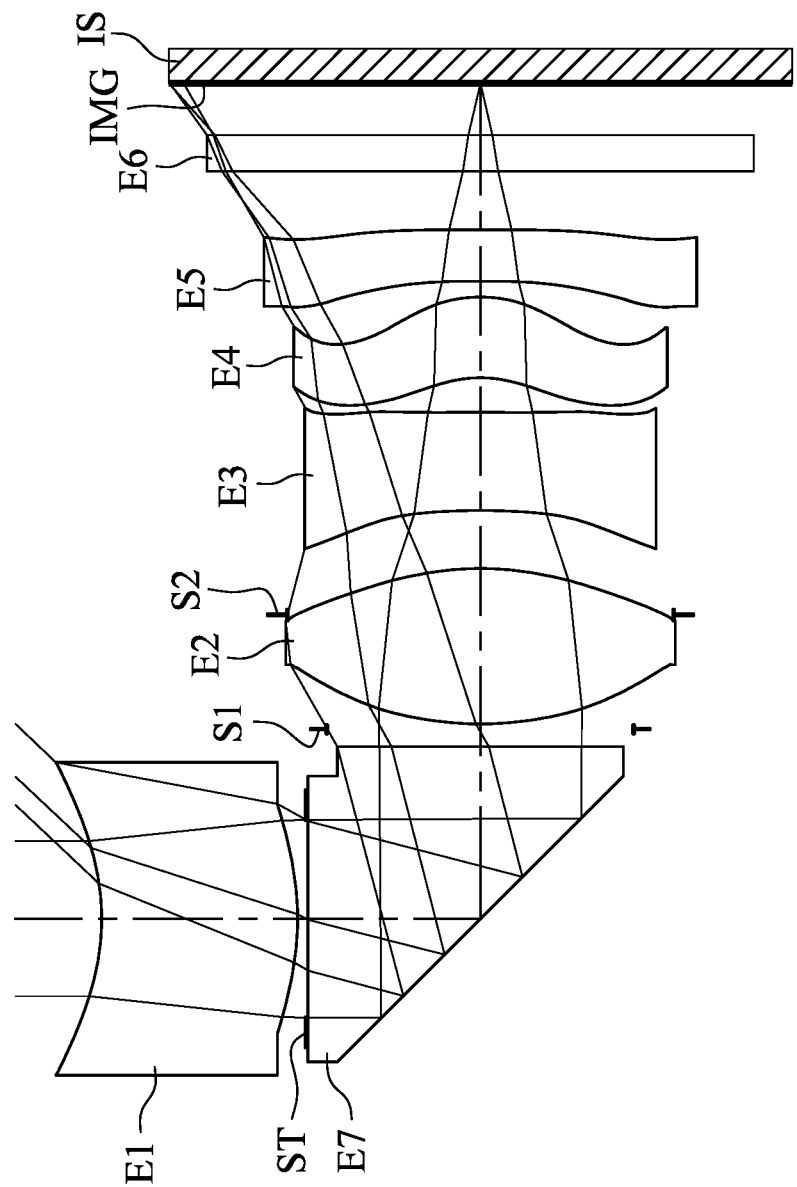
FIG. 13B is a schematic view of the imaging apparatus with another reflective element according to the 7th embodiment of the present disclosure.

Please refer to FIG. 13B, which is a schematic view of the imaging apparatus 7 with another reflective element E7 according to the 7th embodiment of the present disclosure. The difference between the FIG. 13B and FIG. 13A is that the reflective element E7 of FIG. 13B can fold the direction of the optical axis, so that the arrangement is favorable for adapting the electronic device with different requirements.

8th Embodiment

Figure 15A:
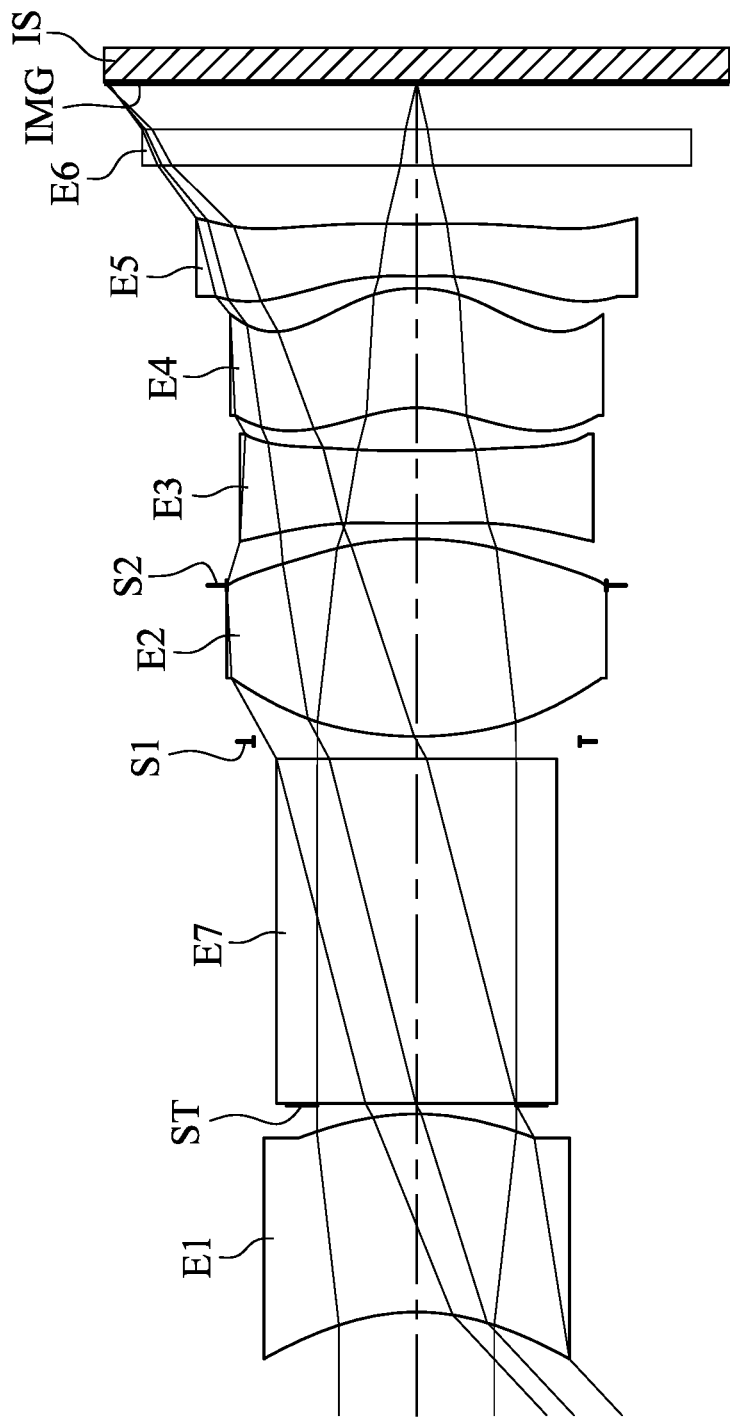
FIG. 15A is a schematic view of an imaging apparatus according to the 8th embodiment of the present disclosure.
Figure 16:
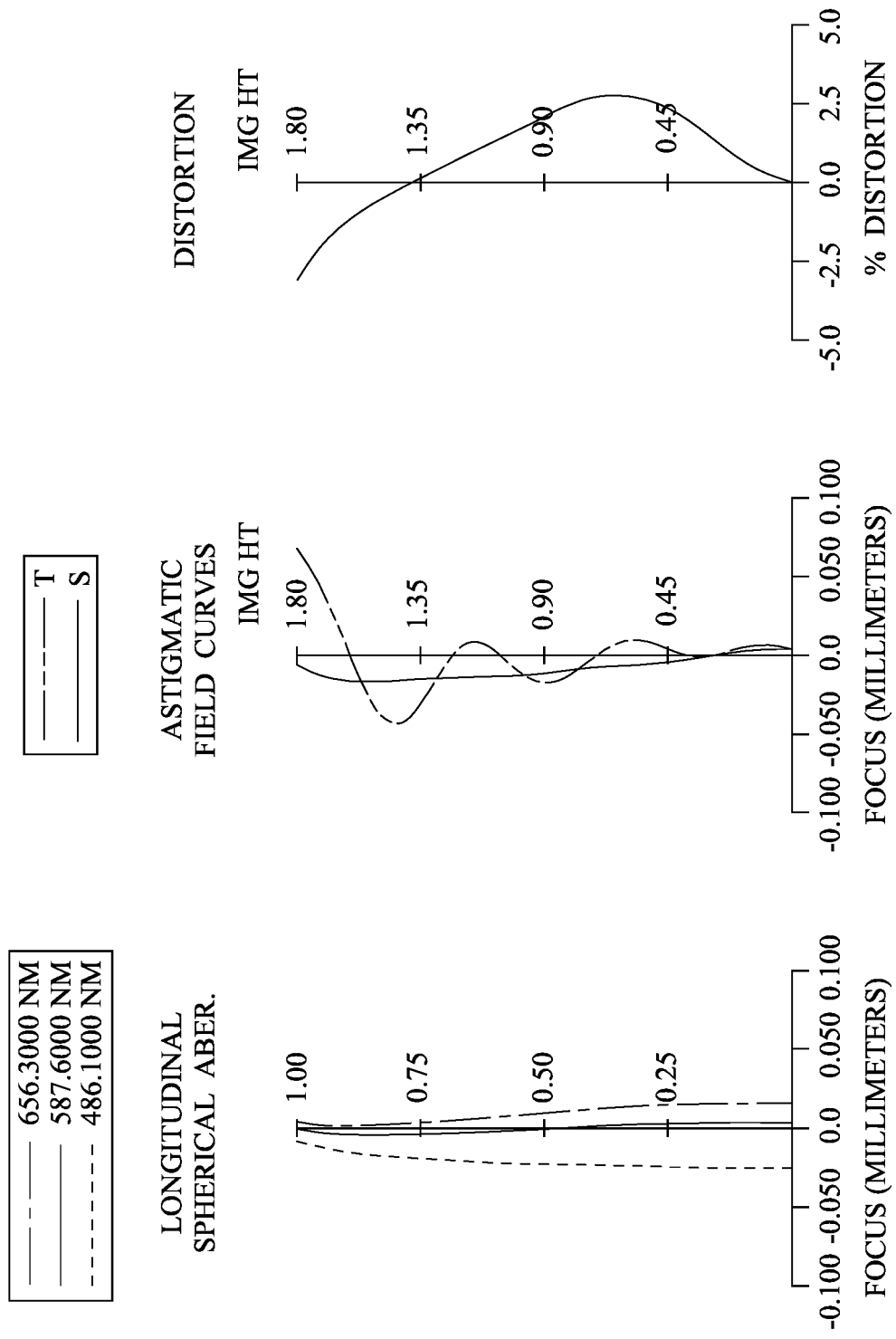
FIG. 16 shows spherical aberration curves, astigmatic field curves and a distortion curve of the imaging apparatus according to the 8th embodiment.

FIG. 15A is a schematic view of an imaging apparatus 8 according to the 8th embodiment of the present disclosure. FIG. 16 shows spherical aberration curves, astigmatic field curves and a distortion curve of the imaging apparatus 8 according to the 8th embodiment. In FIG. 15A, the imaging apparatus 8 includes an image capturing system lens assembly (its reference numeral is omitted) and an image sensor IS. The image capturing system lens assembly includes, in order from an object side to an image side along an optical path, a first lens element E1, an aperture stop ST, a reflective element E7, a stop S1, a second lens element E2, a stop S2, a third lens element E3, a fourth lens element E4, a fifth lens element E5, a filter E6 and an image surface IMG, wherein the image sensor IS is disposed on the image surface IMG of the image capturing system lens assembly. The image capturing system lens assembly includes five lens elements (E1, E2, E3, E4, E5) without additional one or more lens elements inserted between the first lens element E1 and the fifth lens element E5.

The first lens element E1 with positive refractive power has an object-side surface being concave in a paraxial region thereof and an image-side surface being convex in a paraxial region thereof. The first lens element E1 is made of a plastic material, and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of a plastic material, and has the object-side surface and the image-side surface being both aspheric. Furthermore, the object-side surface of the second lens element E2 includes one inflection point.

The third lens element E3 with positive refractive power has an object-side surface being convex in a paraxial region thereof and an image-side surface being convex in a paraxial region thereof. The third lens element E3 is made of a plastic material, and has the object-side surface and the image-side surface being both aspheric. Furthermore, the object-side surface of the third lens element E3 includes three inflection points, and the image-side surface of the third lens element E3 includes three inflection points.

The fourth lens element E4 with positive refractive power has an object-side surface being concave in a paraxial region thereof and an image-side surface being convex in a paraxial region thereof. The fourth lens element E4 is made of a plastic material, and has the object-side surface and the image-side surface being both aspheric. Furthermore, the object-side surface of the fourth lens element E4 includes one inflection point, and the image-side surface of the fourth lens element E4 includes one inflection point.

The fifth lens element E5 with negative refractive power has an object-side surface being convex in a paraxial region thereof and an image-side surface being concave in a paraxial region thereof. The fifth lens element E5 is made of a plastic material, and has the object-side surface and the image-side surface being both aspheric. Furthermore, the object-side surface of the fifth lens element E5 includes two inflection points, and the image-side surface of the fifth lens element E5 includes three inflection points and two critical points.

According to the 8th embodiment, the reflective element E7 is a prism, which is made of glass material and disposed between the first lens element E1 and the second lens element E2.

The filter E6 is made of a glass material, which is located between the fifth lens element E5 and the image surface IMG in order, and will not affect the focal length of the image capturing system lens assembly.

The detailed optical data of the 8th embodiment are shown in Table 8A and the aspheric surface data are shown in Table 8B below.

TABLE 8A

8th Embodiment
f = 1.99 mm, Fno = 2.21, HFOV = 43.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.2990 | ASP | 1.149 | Plastic | 1.535 | 55.9 | 23.93 |
| 2 | | −1.5426 | ASP | 0.050 | | | | |
| 3 | Ape. Stop | Plano | | 0.010 | | | | |
| 4 | Prism | Plano | | 2.000 | Glass | 1.945 | 17.9 | — |
| 5 | | Plano | | 0.100 | | | | |
| 6 | Stop | Plano | | 0.030 | | | | |
| 7 | Lens 2 | 2.1338 | ASP | 1.146 | Plastic | 1.534 | 56.0 | 2.19 |
| 8 | | −2.1137 | ASP | −0.270 | | | | |

TABLE 8A-continued

8th Embodiment
f = 1.99 mm, Fno = 2.21, HFOV = 43.1 deg.

| Surface # | | Curvature Radius | | Thickness | Material | Index | Abbe # | Focal Length |
|---|---|---|---|---|---|---|---|---|
| 9 | Stop | Plano | | 0.360 | | | | |
| 10 | Lens 3 | 16.6667 | ASP | 0.422 | Plastic | 1.686 | 18.4 | 12.63 |
| 11 | | −17.8571 | ASP | 0.250 | | | | |
| 12 | Lens 4 | −0.6971 | ASP | 0.692 | Plastic | 1.544 | 56.0 | 56.61 |
| 13 | | −0.9201 | ASP | 0.070 | | | | |
| 14 | Lens 5 | 6.4119 | ASP | 0.302 | Plastic | 1.686 | 18.4 | −27.50 |
| 15 | | 4.6940 | ASP | 0.340 | | | | |
| 16 | Filter | Plano | | 0.210 | Glass | 1.517 | 64.2 | — |
| 17 | | Plano | | 0.273 | | | | |
| 18 | Image | Plano | | — | | | | |

Reference wavelength is 587.6 nm (d-line).
Effective radius of Surface 6 (stop S1) is 0.945 mm.
Effective radius of Surface 9 (stop S2) is 1.100 mm.

TABLE 8B

Aspheric Coefficients

| Surface # | 1 | 2 | 7 | 8 | 10 |
|---|---|---|---|---|---|
| k = | −8.4369400E+00 | −1.0679200E+01 | 9.3747800E−01 | 1.5554700E+00 | −9.0000000E+01 |
| A4 = | −3.5933085E−01 | −2.6953967E−01 | 3.0671594E−02 | 7.3372644E−02 | 3.0501101E−01 |
| A6 = | 7.7394605E−01 | 6.8386618E−01 | 1.1627672E−01 | −1.8462013E+00 | −4.3652625E+00 |
| A8 = | −1.5374349E+00 | −2.1407299E+00 | −4.8151559E−01 | 9.3895124E+00 | 1.3441609E+01 |
| A10 = | 2.5986088E+00 | 8.2478708E+00 | 1.1191194E+00 | −2.1518748E+01 | −1.7331686E+01 |
| A12 = | −3.23699615E+00 | −2.6465282E+01 | −1.8597396E+00 | 2.8321380E+01 | 2.4980988E+00 |
| A14 = | 2.5482814E+00 | 5.2677976E+01 | 2.1437555E+00 | −2.2839263E+01 | 2.0205189E+01 |
| A16 = | −1.0274148E+00 | −5.3984970E+01 | −1.6169253E+00 | 1.1216039E+01 | −2.5213519E+01 |
| A18 = | 1.2612686E−01 | 2.0645212E+01 | 7.1273882E−01 | −3.1060745E+00 | 1.2826919E+01 |
| A20 = | | | −1.3961376E−01 | 3.7560468E−01 | −2.4930061E+00 |

| Surface # | 11 | 12 | 13 | 14 | 15 |
|---|---|---|---|---|---|
| k = | 7.4474200E+01 | −8.7327500E+00 | −5.9048400E+00 | 2.2298800E+01 | −9.0000000E+01 |
| A4 = | 1.3052512E+00 | −2.6568480E−02 | −1.9677687E+00 | −2.4158741E+00 | −8.2172763E−01 |
| A6 = | −7.8788858E+00 | 3.6107486E+00 | 9.7987597E+00 | 8.0527536E+00 | 2.3508193E+00 |
| A8 = | 2.6909511E+01 | 3.2578899E+00 | −3.2690191E+01 | −1.2938590E+01 | −3.3425041E+00 |
| A10 = | −6.3875565E+01 | −1.8871143E+01 | 9.4335674E+01 | 7.1777966E+00 | 1.9734897E+00 |
| A12 = | 1.1271505E+02 | 4.9706146E+01 | −2.0763342E+02 | 8.6160168E+00 | 9.1731982E−01 |
| A14 = | −1.4125816E+02 | −7.5091757E+01 | 3.1450947E+02 | −1.7964190E+01 | −2.2334185E+00 |
| A16 = | 1.1445573E+02 | 6.5682908E+01 | −3.1102459E+02 | 1.3252150E+01 | 1.4512114E+00 |
| A18 = | −5.2442729E+01 | −3.0782651E+01 | 1.9099759E+02 | −4.6790948E+00 | −4.3139782E−01 |
| A20 = | 1.0202401E+01 | 5.9706882E+00 | −6.6069235E+01 | 6.5925326E−01 | 5.0078080E−02 |
| A22 = | | | 9.8416809E+00 | | |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 8A and Table 8B as the following values and satisfy the following conditions in Table 8C:

TABLE 8C

8th Embodiment

| f [mm] | 1.99 |
|---|---|
| Fno | 2.21 |
| HFOV [degrees] | 43.1 |
| ATmax/BL | 2.66 |
| ATmax/Y11 | 2.47 |

TABLE 8C-continued

8th Embodiment

| ATmax/f | 1.10 |
|---|---|
| CT/CTmax | 1.00 |
| (CT2 + T23 + CT3 + T34 + CT4 + T45 + CT5)/f | 1.49 |
| f/f12 | 1.21 |
| f/f2 | 0.91 |
| f/f3 | 0.16 |
| f/f45 | −0.06 |
| f/ImgH | 1.10 |
| f/R1 | −1.53 |
| f/R3 | 0.93 |
| f/R4 | −0.94 |
| f123/f234 | 0.57 |
| f34/f45 | −0.41 |
| (N3 + N5)/2 | 1.686 |
| (R1 − R2)/(R1 + R2) | −0.09 |
| (R3 + R4)/(R3 − R4) | 0.00 |
| (R5 + R6)/(R5 − R6) | −0.03 |

TABLE 8C-continued

| 8th Embodiment | |
|---|---|
| (R7 − R8)/(R7 + R8) | −0.14 |
| SL/TL | 0.83 |
| T12/f | 1.10 |
| T12/ImgH | 1.22 |
| (T23 + T34 + T45)/ΣAT | 0.16 |
| T45/f | 0.04 |
| TL/f | 3.59 |
| (TL − SL)/f | 0.60 |
| V1/N1 | 36.46 |
| V2/N2 | 36.48 |
| V3/N3 | 10.90 |
| V4/N4 | 36.26 |
| V5/N5 | 10.90 |
| Y11/ImgH | 0.49 |
| Y52/Y11 | 1.44 |
| FOV [degrees] | 86.2 |

Figure 15B:
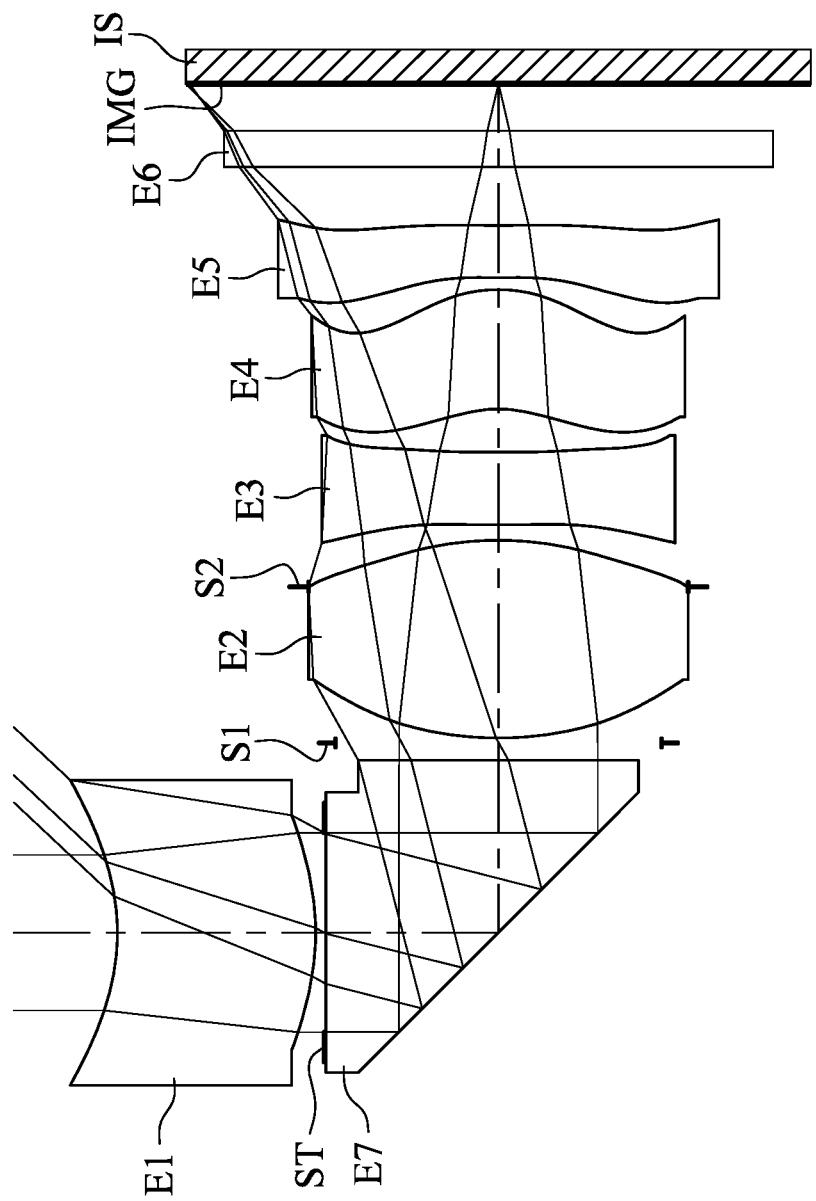
FIG. 15B is a schematic view of the imaging apparatus with another reflective element according to the 8th embodiment of the present disclosure.

Please refer to FIG. 15B, which is a schematic view of the imaging apparatus 8 with another reflective element E7 according to the 8th embodiment of the present disclosure. The difference between the FIG. 15B and FIG. 15A is that the reflective element E7 of FIG. 15B can fold the direction of the optical axis, so that the arrangement is favorable for adapting the electronic device with different requirements.

9th Embodiment

Figure 17A:
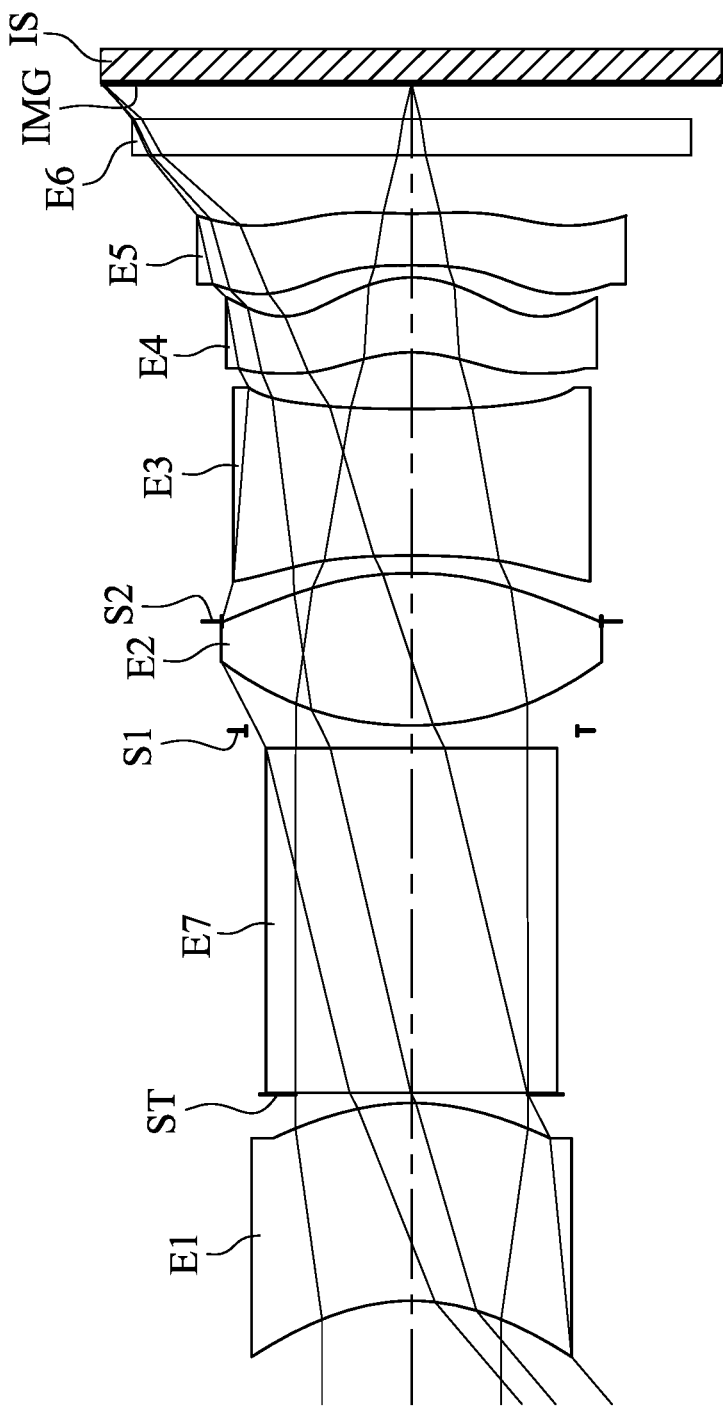
FIG. 17A is a schematic view of an imaging apparatus according to the 9th embodiment of the present disclosure.
Figure 18:
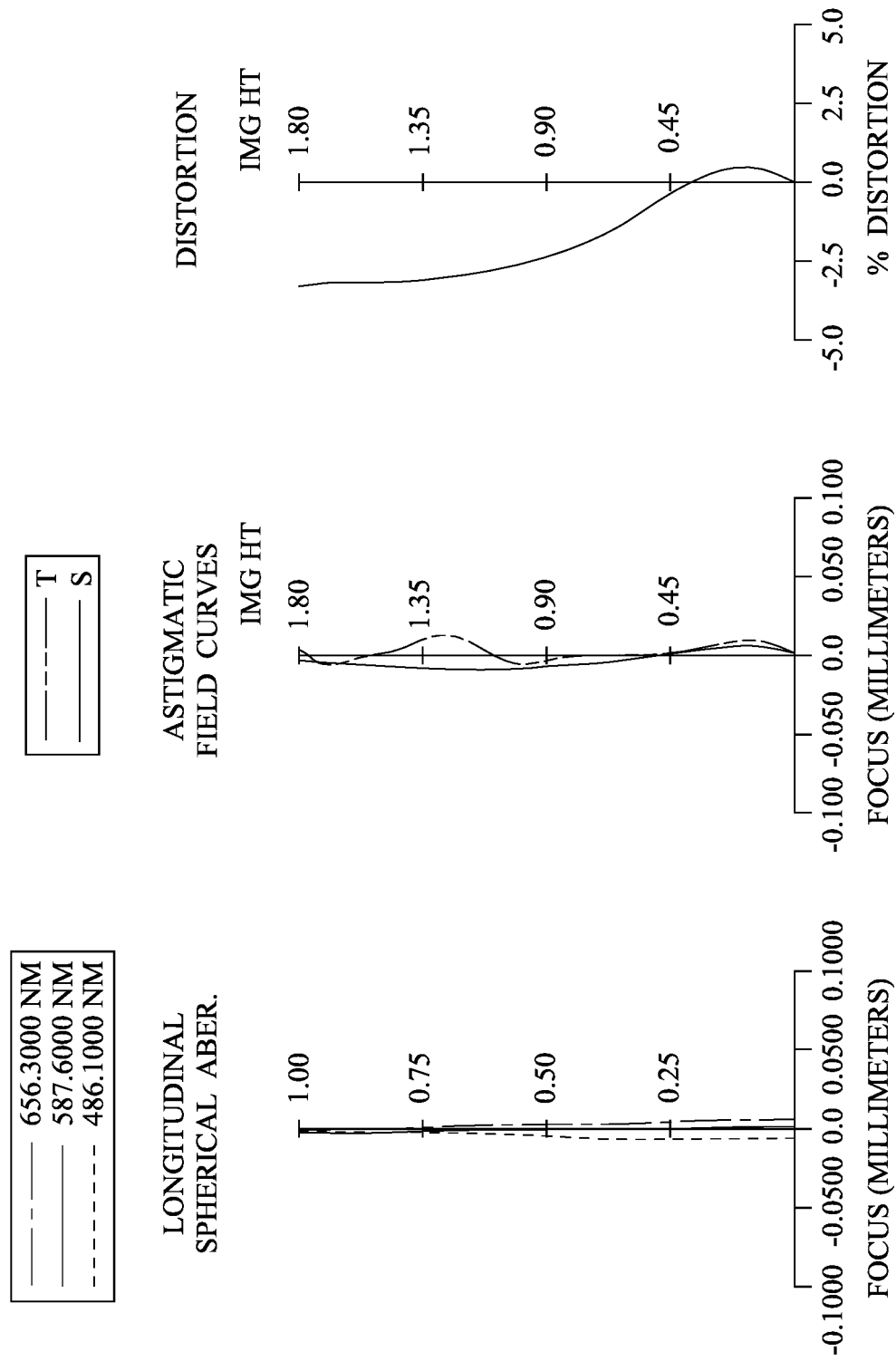
FIG. 18 shows spherical aberration curves, astigmatic field curves and a distortion curve of the imaging apparatus according to the 9th embodiment.

FIG. 17A is a schematic view of an imaging apparatus 9 according to the 9th embodiment of the present disclosure. FIG. 18 shows spherical aberration curves, astigmatic field curves and a distortion curve of the imaging apparatus 9 according to the 9th embodiment. In FIG. 17A, the imaging apparatus 9 includes an image capturing system lens assembly (its reference numeral is omitted) and an image sensor IS. The image capturing system lens assembly includes, in order from an object side to an image side along an optical path, a first lens element E1, an aperture stop ST, a reflective element E7, a stop S1, a second lens element E2, a stop S2, a third lens element E3, a fourth lens element E4, a fifth lens element E5, a filter E6 and an image surface IMG, wherein the image sensor IS is disposed on the image surface IMG of the image capturing system lens assembly. The image capturing system lens assembly includes five lens elements (E1, E2, E3, E4, E5) without additional one or more lens elements inserted between the first lens element E1 and the fifth lens element E5.

The first lens element E1 with positive refractive power has an object-side surface being concave in a paraxial region thereof and an image-side surface being convex in a paraxial region thereof. The first lens element E1 is made of a plastic material, and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of a plastic material, and has the object-side surface and the image-side surface being both aspheric. Furthermore, the object-side surface of the second lens element E2 includes one inflection point, and the image-side surface of the second lens element E2 includes two inflection points.

The third lens element E3 with negative refractive power has an object-side surface being concave in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point.

The fourth lens element E4 with positive refractive power has an object-side surface being concave in a paraxial region thereof and an image-side surface being convex in a paraxial region thereof. The fourth lens element E4 is made of a plastic material, and has the object-side surface and the image-side surface being both aspheric. Furthermore, the object-side surface of the fourth lens element E4 includes one inflection point, and the image-side surface of the fourth lens element E4 includes one inflection point.

The fifth lens element E5 with negative refractive power has an object-side surface being concave in a paraxial region thereof and an image-side surface being concave in a paraxial region thereof. The fifth lens element E5 is made of a plastic material, and has the object-side surface and the image-side surface being both aspheric. Furthermore, the object-side surface of the fifth lens element E5 includes one inflection point, and the image-side surface of the fifth lens element E5 includes three inflection points and two critical points.

According to the 9th embodiment, the reflective element E7 is a prism, which is made of glass material and disposed between the first lens element E1 and the second lens element E2.

The filter E6 is made of a glass material, which is located between the fifth lens element E5 and the image surface IMG in order, and will not affect the focal length of the image capturing system lens assembly.

The detailed optical data of the 9th embodiment are shown in Table 9A and the aspheric surface data are shown in Table 9B below.

TABLE 9A

9th Embodiment
f = 2.20 mm, Fno = 2.12, HFOV = 40.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.2247 | ASP | 1.147 | Plastic | 1.545 | 56.1 | 17.63 |
| 2 | | −1.4451 | ASP | 0.050 | | | | |
| 3 | Ape. Stop | Plano | | 0.010 | | | | |
| 4 | Prism | Plano | | 2.000 | Glass | 1.945 | 17.9 | — |
| 5 | | Plano | | 0.100 | | | | |
| 6 | Stop | Plano | | 0.030 | | | | |
| 7 | Lens 2 | 1.9825 | ASP | 0.884 | Plastic | 1.544 | 56.0 | 2.06 |
| 8 | | −2.1699 | ASP | −0.280 | | | | |
| 9 | Stop | Plano | | 0.383 | | | | |
| 10 | Lens 3 | −6.6004 | ASP | 0.850 | Plastic | 1.660 | 20.4 | −6.13 |

TABLE 9A-continued

9th Embodiment
f = 2.20 mm, Fno = 2.12, HFOV = 40.3 deg.

| Surface # | | Curvature Radius | Thickness | Material | Index | Abbe # | Focal Length |
|---|---|---|---|---|---|---|---|
| 11 | | 10.9933 ASP | 0.329 | | | | |
| 12 | Lens 4 | −0.8493 ASP | 0.434 | Plastic | 1.566 | 37.4 | 3.06 |
| 13 | | −0.6753 ASP | 0.070 | | | | |
| 14 | Lens 5 | −9.5510 ASP | 0.300 | Plastic | 1.686 | 18.4 | −2.97 |
| 15 | | 2.6221 ASP | 0.340 | | | | |
| 16 | Filter | Plano | 0.210 | Glass | 1.517 | 64.2 | — |
| 17 | | Plano | 0.207 | | | | |
| 18 | Image | Plano | — | | | | |

Reference wavelength is 587.6 nm (d-line).
Effective radius of Surface 6 (stop S1) is 0.960 mm.
Effective radius of Surface 9 (stop S2) is 1.100 mm.

TABLE 9B

Aspheric Coefficients

| Surface # | 1 | 2 | 7 | 8 | 10 |
|---|---|---|---|---|---|
| k = | −7.8319500E+00 | −9.3160300E+00 | 8.5683100E−01 | 1.4637900E+00 | −9.0000000E+01 |
| A4 = | −4.2584496E−01 | −2.9334832E−01 | 4.3318630E−02 | −1.1911074E−01 | −2.5985494E−01 |
| A6 = | 9.1924453E−01 | 6.3934422E−01 | −6.2900157E−02 | 3.0009414E−01 | 1.1468238E−02 |
| A8 = | −1.7939212E+00 | −1.3409251E+00 | 1.4560253E−01 | 5.9634105E−03 | 1.9595623E+00 |
| A10 = | 2.7726573E+00 | 2.5010400E+00 | −3.8586064E−01 | −1.2276856E+00 | −8.5137924E+00 |
| A12 = | −2.9664501E+00 | −3.5993241E+00 | 5.8001143E−01 | 2.9699307E+00 | 1.9976507E+01 |
| A14 = | 1.9628353E+00 | 3.4775901E+00 | −4.9551334E−01 | −3.6076993E+00 | −2.8489447E+01 |
| A16 = | −6.7468447E−01 | −1.8402214E+00 | 2.1774168E−01 | 2.5129063E+00 | 2.5544031E+01 |
| A18 = | 7.6509584E−02 | 3.4015013E−01 | −2.6652457E−02 | −9.5827071E−01 | −1.4132200E+01 |
| A20 = | | −8.1362537E−03 | | 1.5416271E−01 | 4.3994917E+00 |
| A22 = | | | | | −5.8503693E−01 |

| Surface # | 11 | 12 | 13 | 14 | 15 |
|---|---|---|---|---|---|
| k = | 1.9929100E+01 | −6.5828600E+00 | −7.4279200E+00 | −8.9998800E+01 | −8.9996900E+01 |
| A4 = | 1.5275507E−01 | 1.3312904E−01 | −1.7180862E+00 | −1.3049560E+00 | −9.4140723E−01 |
| A6 = | −1.3638044E+00 | −2.7517365E+00 | 7.7257136E+00 | −4.5669625E−02 | 1.1680368E+00 |
| A8 = | 9.6038737E+00 | 2.6984024E+01 | −2.3315703E+01 | 1.5268960E+01 | 1.0518532E+00 |
| A10 = | −3.4862679E+01 | −1.0815939E+02 | 6.5063054E+01 | −5.1557196E+01 | −4.7341206E+00 |
| A12 = | 7.6562168E+01 | 2.5953959E+02 | −1.3203960E+02 | 9.3502803E+01 | 6.8729111E+00 |
| A14 = | −1.1061802E+02 | −4.1233570E+02 | 1.7496603E+02 | −1.0712069E+02 | −5.7335170E+00 |
| A16 = | 1.0618358E+02 | 4.3440153E+02 | −1.4790174E+02 | 7.9527476E+01 | 2.9150571E+00 |
| A18 = | −6.3922670E+01 | −2.8877379E+02 | 7.7330885E+01 | −3.7172941E+01 | −8.7462062E−01 |
| A20 = | 2.1386751E+01 | 1.0875982E+02 | −2.2925977E+01 | 9.9627795E+00 | 1.3962082E−01 |
| A22 = | −2.9922489E+00 | −1.7593951E+01 | 2.9657916E+00 | −1.1696543E+00 | −9.0293142E−03 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 9A and Table 9B as the following values and satisfy the following conditions in Table 9C:

TABLE 9C

9th Embodiment

| | |
|---|---|
| f [mm] | 2.20 |
| Fno | 2.12 |
| HFOV [degrees] | 40.3 |
| ATmax/BL | 2.89 |
| ATmax/Y11 | 2.36 |
| ATmax/f | 1.00 |

TABLE 9C-continued

9th Embodiment

| | |
|---|---|
| CT/CTmax | 1.00 |
| (CT2 + T23 + CT3 + T34 + CT4 + T45 + CT5)/f | 1.35 |
| f/f12 | 1.45 |
| f/f2 | 1.07 |
| f/f3 | −0.36 |
| f/f45 | −0.11 |
| f/ImgH | 1.22 |
| f/R1 | −1.79 |
| f/R3 | 1.11 |
| f/R4 | −1.01 |
| f123/f234 | 0.83 |
| f34/f45 | −0.21 |
| (N3 + N5)/2 | 1.673 |
| (R1 − R2)/(R1 + R2) | −0.08 |
| (R3 + R4)/(R3 − R4) | −0.05 |
| (R5 + R6)/(R5 − R6) | −0.25 |
| (R7 − R8)/(R7 + R8) | 0.11 |
| SL/TL | 0.83 |

TABLE 9C-continued

| 9th Embodiment | |
|---|---|
| T12/f | 1.00 |
| T12/ImgH | 1.22 |
| (T23 + T34 + T45)/ΣAT | 0.19 |
| T45/f | 0.03 |
| TL/f | 3.21 |
| (TL − SL)/f | 0.54 |
| V1/N1 | 36.30 |
| V2/N2 | 36.26 |
| V3/N3 | 12.29 |
| V4/N4 | 23.91 |
| V5/N5 | 10.90 |
| Y11/ImgH | 0.52 |
| Y52/Y11 | 1.34 |
| FOV [degrees] | 80.6 |

Figure 17B:
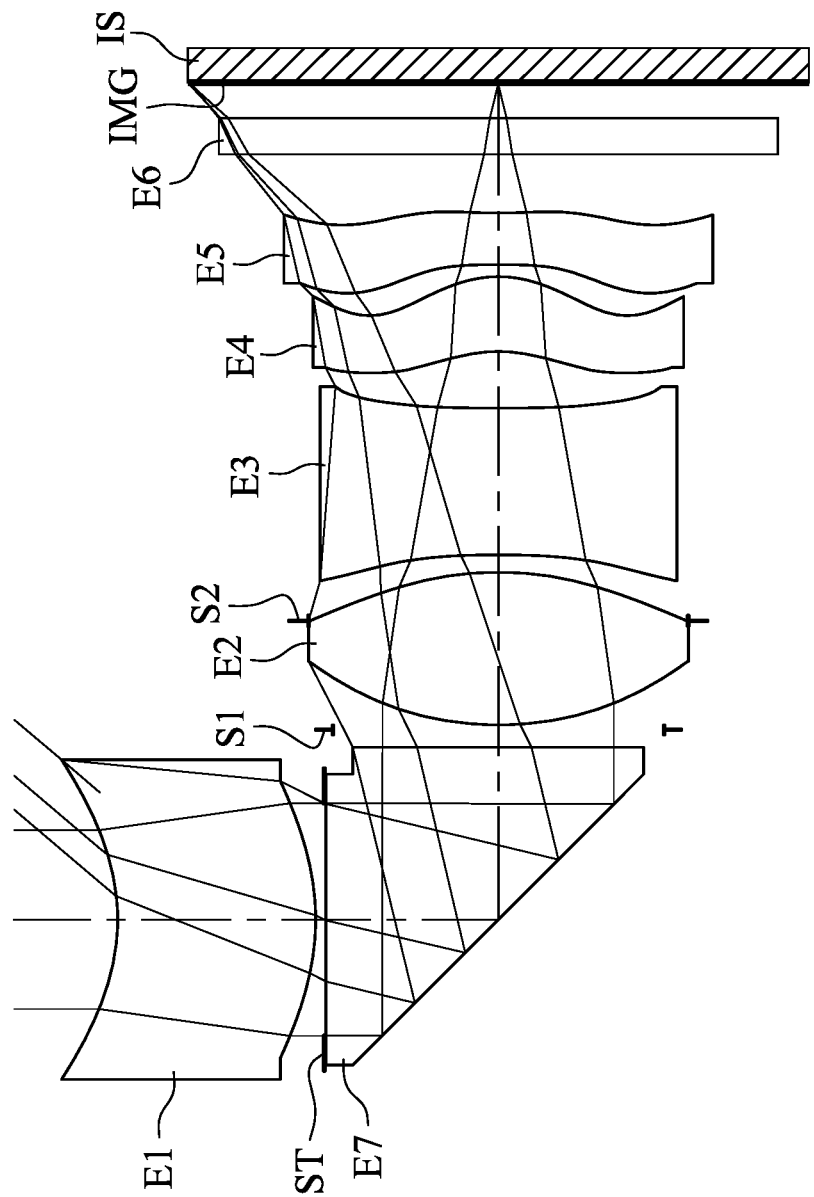
FIG. 17B is a schematic view of the imaging apparatus with another reflective element according to the 9th embodiment of the present disclosure.

Please refer to FIG. 17B, which is a schematic view of the imaging apparatus 9 with another reflective element E7 according to the 9th embodiment of the present disclosure. The difference between the FIG. 17B and FIG. 17A is that the reflective element E7 of FIG. 17B can fold the direction of the optical axis, so that the arrangement is favorable for adapting the electronic device with different requirements.

10th Embodiment

Figure 19A:
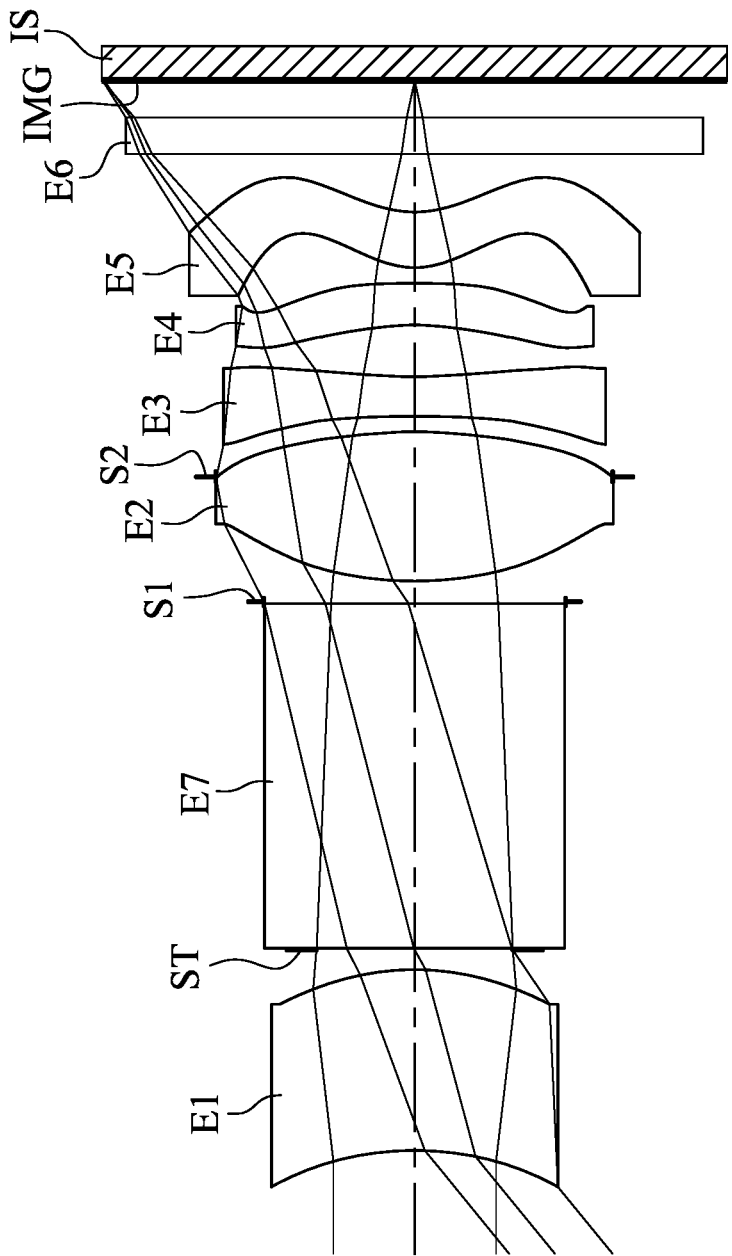
FIG. 19A is a schematic view of an imaging apparatus according to the 10th embodiment of the present disclosure.
Figure 20:
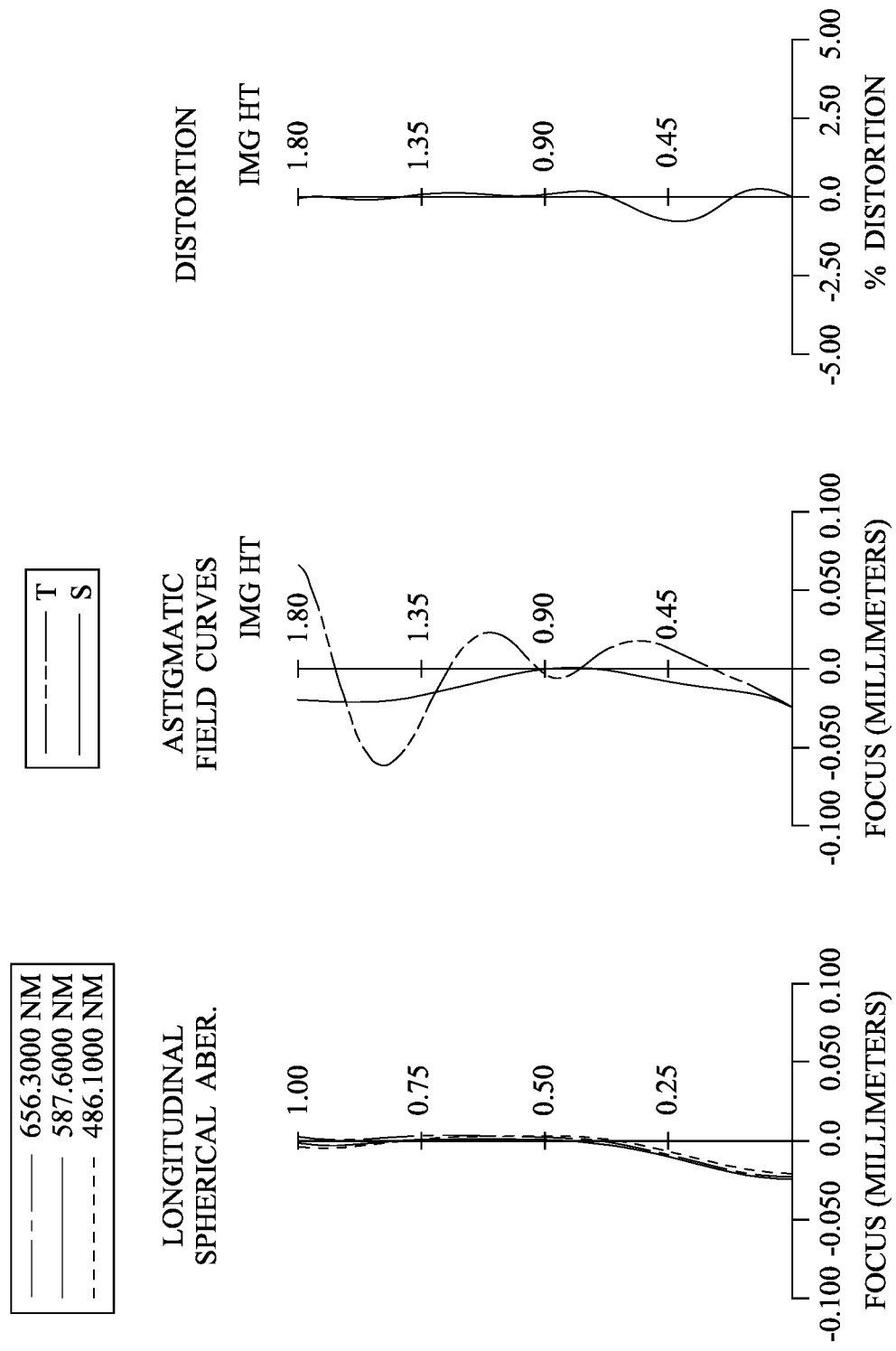
FIG. 20 shows spherical aberration curves, astigmatic field curves and a distortion curve of the imaging apparatus according to the 10th embodiment.

FIG. 19A is a schematic view of an imaging apparatus 10 according to the 10th embodiment of the present disclosure. FIG. 20 shows spherical aberration curves, astigmatic field curves and a distortion curve of the imaging apparatus 10 according to the 10th embodiment. In FIG. 19A, the imaging apparatus 10 includes an image capturing system lens assembly (its reference numeral is omitted) and an image sensor IS. The image capturing system lens assembly includes, in order from an object side to an image side along an optical path, a first lens element E1, an aperture stop ST, a reflective element E7, a stop S1, a second lens element E2, a stop S2, a third lens element E3, a fourth lens element E4, a fifth lens element E5, a filter E6 and an image surface IMG, wherein the image sensor IS is disposed on the image surface IMG of the image capturing system lens assembly. The image capturing system lens assembly includes five lens elements (E1, E2, E3, E4, E5) without additional one or more lens elements inserted between the first lens element E1 and the fifth lens element E5.

The first lens element E1 with positive refractive power has an object-side surface being concave in a paraxial region thereof and an image-side surface being convex in a paraxial region thereof. The first lens element E1 is made of a glass material, and has the object-side surface and the image-side surface being both aspheric.

The second lens element E2 with positive refractive power has an object-side surface being convex in a paraxial region thereof and an image-side surface being convex in a paraxial region thereof. The second lens element E2 is made of a plastic material, and has the object-side surface and the image-side surface being both aspheric. Furthermore, the object-side surface of the second lens element E2 includes one inflection point.

The third lens element E3 with negative refractive power has an object-side surface being concave in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes one inflection point, and the image-side surface of the third lens element E3 includes four inflection points.

The fourth lens element E4 with negative refractive power has an object-side surface being concave in a paraxial region thereof and an image-side surface being convex in a paraxial region thereof. The fourth lens element E4 is made of a plastic material, and has the object-side surface and the image-side surface being both aspheric. Furthermore, the object-side surface of the fourth lens element E4 includes three inflection points, and the image-side surface of the fourth lens element E4 includes one inflection point.

The fifth lens element E5 with positive refractive power has an object-side surface being convex in a paraxial region thereof and an image-side surface being concave in a paraxial region thereof. The fifth lens element E5 is made of a plastic material, and has the object-side surface and the image-side surface being both aspheric. Furthermore, the object-side surface of the fifth lens element E5 includes one inflection point, and the image-side surface of the fifth lens element E5 includes one inflection point and one critical point.

According to the 10th embodiment, the reflective element E7 is a prism, which is made of glass material and disposed between the first lens element E1 and the second lens element E2.

The filter E6 is made of a glass material, which is located between the fifth lens element E5 and the image surface IMG in order, and will not affect the focal length of the image capturing system lens assembly.

The detailed optical data of the 10th embodiment are shown in Table 10A and the aspheric surface data are shown in Table 10B below.

TABLE 10A

10th Embodiment
f = 2.19 mm, Fno = 2.32, HFOV = 39.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.8367 | ASP | 1.050 | Glass | 1.744 | 44.8 | 4.99 |
| 2 | | −1.5288 | ASP | 0.114 | | | | |
| 3 | Ape. Stop | Plano | | 0.010 | | | | |
| 4 | Prism | Plano | | 2.000 | Glass | 1.945 | 17.9 | — |
| 5 | | Plano | | 0.010 | | | | |
| 6 | Stop | Plano | | 0.120 | | | | |
| 7 | Lens 2 | 2.2604 | ASP | 0.866 | Plastic | 1.544 | 56.0 | 2.34 |
| 8 | | −2.5233 | ASP | −0.260 | | | | |
| 9 | Stop | Plano | | 0.350 | | | | |
| 10 | Lens 3 | −14.6201 | ASP | 0.230 | Plastic | 1.698 | 14.5 | −2.81 |
| 11 | | 2.2799 | ASP | 0.300 | | | | |

TABLE 10A-continued

10th Embodiment
f = 2.19 mm, Fno = 2.32, HFOV = 39.2 deg.

| Surface # | | Curvature Radius | | Thickness | Material | Index | Abbe # | Focal Length |
|---|---|---|---|---|---|---|---|---|
| 12 | Lens 4 | −1.2458 | ASP | 0.243 | Plastic | 1.587 | 28.3 | −3.18 |
| 13 | | −4.0202 | ASP | 0.090 | | | | |
| 14 | Lens 5 | 0.4805 | ASP | 0.320 | Plastic | 1.543 | 56.5 | 2.22 |
| 15 | | 0.6106 | ASP | 0.340 | | | | |
| 16 | Filter | Plano | | 0.210 | Glass | 1.517 | 64.2 | — |
| 17 | | Plano | | 0.215 | | | | |
| 18 | Image | Plano | | — | | | | |

Reference wavelength is 587.6 nm (d-line).
Effective radius of Surface 6 (stop S1) is 0.875 mm.
Effective radius of Surface 9 (stop S2) is 1.150 mm.

TABLE 10B

Aspheric Coefficients

| Surface # | 1 | 2 | 7 | 8 | 10 |
|---|---|---|---|---|---|
| k = | 2.2123300E+00 | 1.8571300E+00 | 1.1193600E+00 | 2.7774600E+00 | −8.9993600E+01 |
| A4 = | −8.0949195E−03 | 1.1712820E−01 | 7.4219290E−02 | 2.9843250E−01 | −8.4938603E−01 |
| A6 = | 3.9176838E−01 | −2.3095483E−01 | −4.4973169E−03 | 6.0060380E−01 | 8.0124772E+00 |
| A8 = | −2.5098725E+00 | 2.3245878E+00 | −2.8166086E−01 | −8.2762339E+00 | −4.0681814E+01 |
| A10 = | 1.0172328E+01 | −9.9221035E+00 | 7.7961971E−01 | 2.7383357E+01 | 1.1236402E+02 |
| A12 = | −2.4300754E+01 | 2.5014096E+01 | −1.0582072E+00 | −4.6486398E+01 | −1.8351957E+02 |
| A14 = | 3.4001643E+01 | −3.5447038E+01 | 7.7265051E−01 | 4.5906820E+01 | 1.8364619E+02 |
| A16 = | −2.5547691E+01 | 2.6327975E+01 | −2.8660688E−01 | −2.6757820E+01 | −1.1118585E+02 |
| A18 = | 7.9582545E+00 | −7.6774605E+00 | 3.6384434E−02 | 8.5763935E+00 | 3.7558648E+01 |
| A20 = | | | | −1.1694326E+00 | −5.4515225E+00 |

| Surface# | 11 | 12 | 13 | 14 | 15 |
|---|---|---|---|---|---|
| k = | −8.9997100E+01 | −1.6193100E+01 | −5.0975400E+00 | −4.2539400E+00 | −4.9181300E+00 |
| A4 = | −5.1211879E−01 | 1.3991426E+00 | 8.0873607E−01 | 1.3406284E+00 | 3.2477064E−01 |
| A6 = | 4.4257838E+00 | −1.4814984E+01 | −1.2171549E+01 | −1.3130249E+01 | −1.2043302E+00 |
| A8 = | −1.7294396E+01 | 7.6262832E+01 | 6.0764332E+01 | 6.4027644E+01 | −5.1713923E−01 |
| A10 = | 3.5554835E+01 | −2.2686375E+02 | −1.7170175E+02 | −2.2382080E+02 | 4.4380184E+00 |
| A12 = | −4.0981656E+01 | 4.1348833E+02 | 3.0397380E+02 | 5.4932704E+02 | −6.7660447E+00 |
| A14 = | 2.6537993E+01 | −4.6993977E+02 | −3.4434719E+02 | −9.6031479E+02 | 5.5643758E+00 |
| A16 = | −9.0129334E+00 | 3.2667627E+02 | 2.4346694E+02 | 1.2003692E+03 | −2.8528206E+00 |
| A18 = | 1.2535027E+00 | −1.2776900E+02 | −9.7890831E+01 | −1.0482408E+03 | 9.4049785E−01 |
| A20 = | | 2.1624084E+01 | 1.7082055E+01 | 6.0314771E+02 | −1.8713340E−01 |
| A22 = | | | | −2.0341577E+02 | 1.7014881E−02 |
| A24 = | | | | 3.0166896E+01 | |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 10A and Table 10B as the following values and satisfy the following conditions in Table 10C:

TABLE 10C

| 10th Embodiment | |
|---|---|
| f [mm] | 2.19 |
| Fno | 2.32 |
| HFOV [degrees] | 39.2 |
| ATmax/BL | 2.95 |
| ATmax/Y11 | 2.71 |
| ATmax/f | 1.03 |
| CT/CTmax | 1.00 |

TABLE 10C-continued

| 10th Embodiment | |
|---|---|
| (CT2 + T23 + CT3 + T34 + CT4 + T45 + CT5)/f | 0.98 |
| f/f12 | 1.31 |
| f/f2 | 0.93 |
| f/f3 | −0.78 |
| f/f45 | 0.27 |
| f/ImgH | 1.22 |
| f/R1 | −1.19 |
| f/R3 | 0.97 |
| f/R4 | −0.87 |
| f123/f234 | −0.22 |
| f34/f45 | −0.17 |
| (N3 + N5)/2 | 1.621 |
| (R1 − R2)/(R1 + R2) | 0.09 |
| (R3 + R4)/(R3 − R4) | −0.05 |
| (R5 + R6)/(R5 − R6) | 0.73 |
| (R7 − R8)/(R7 + R8) | −0.53 |
| SL/TL | 0.81 |
| T12/f | 1.03 |
| T12/ImgH | 1.25 |

TABLE 10C-continued

10th Embodiment

| | |
|---|---|
| (T23 + T34 + T45)/ΣAT | 0.18 |
| T45/f | 0.04 |
| TL/f | 2.84 |
| (TL − SL)/f | 0.53 |
| V1/N1 | 25.72 |
| V2/N2 | 36.26 |
| V3/N3 | 8.53 |
| V4/N4 | 17.83 |
| V5/N5 | 36.60 |
| Y11/ImgH | 0.46 |
| Y52/Y11 | 1.57 |
| FOV [degrees] | 78.4 |

Figure 19B:
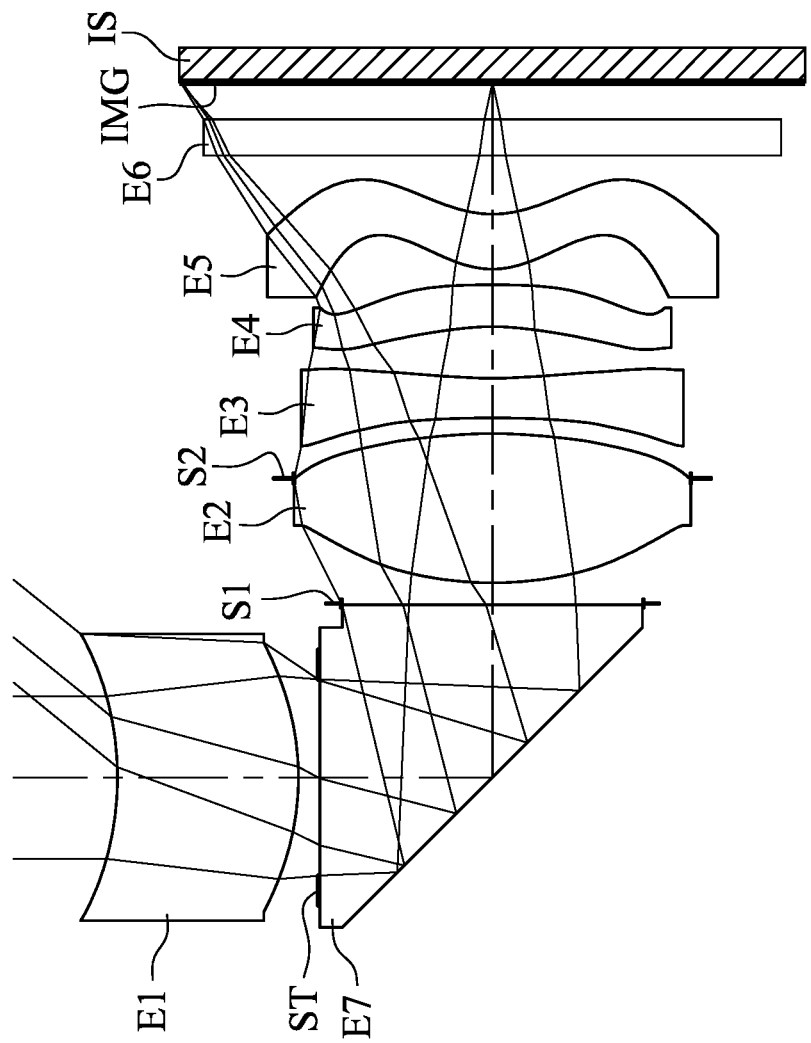
FIG. 19B is a schematic view of the imaging apparatus with another reflective element according to the 10th embodiment of the present disclosure.

Please refer to FIG. 19B, which is a schematic view of the imaging apparatus 10 with another reflective element E7 according to the 10th embodiment of the present disclosure. The difference between the FIG. 19B and FIG. 19A is that the reflective element E7 of FIG. 19B can fold the direction of the optical axis, so that the arrangement is favorable for adapting the electronic device with different requirements.

11th Embodiment

Figure 21A:
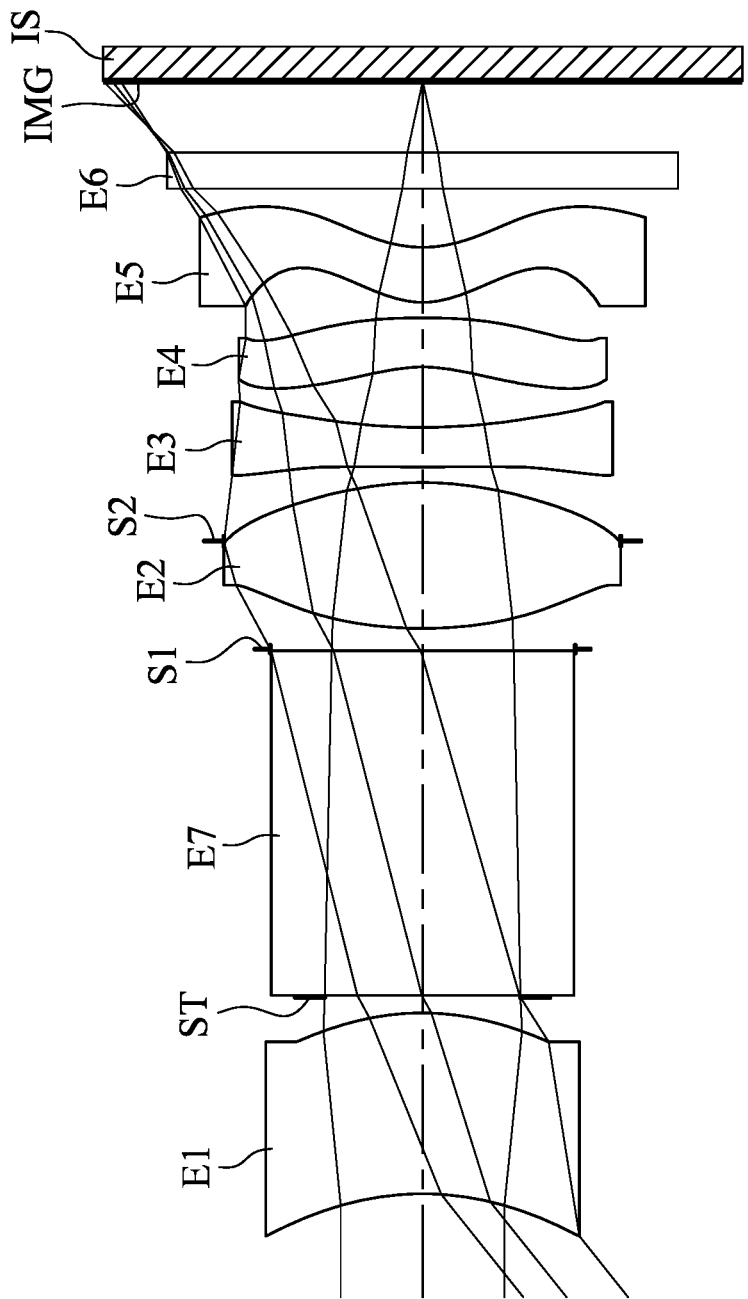
FIG. 21A is a schematic view of an imaging apparatus according to the 11th embodiment of the present disclosure.
Figure 22:
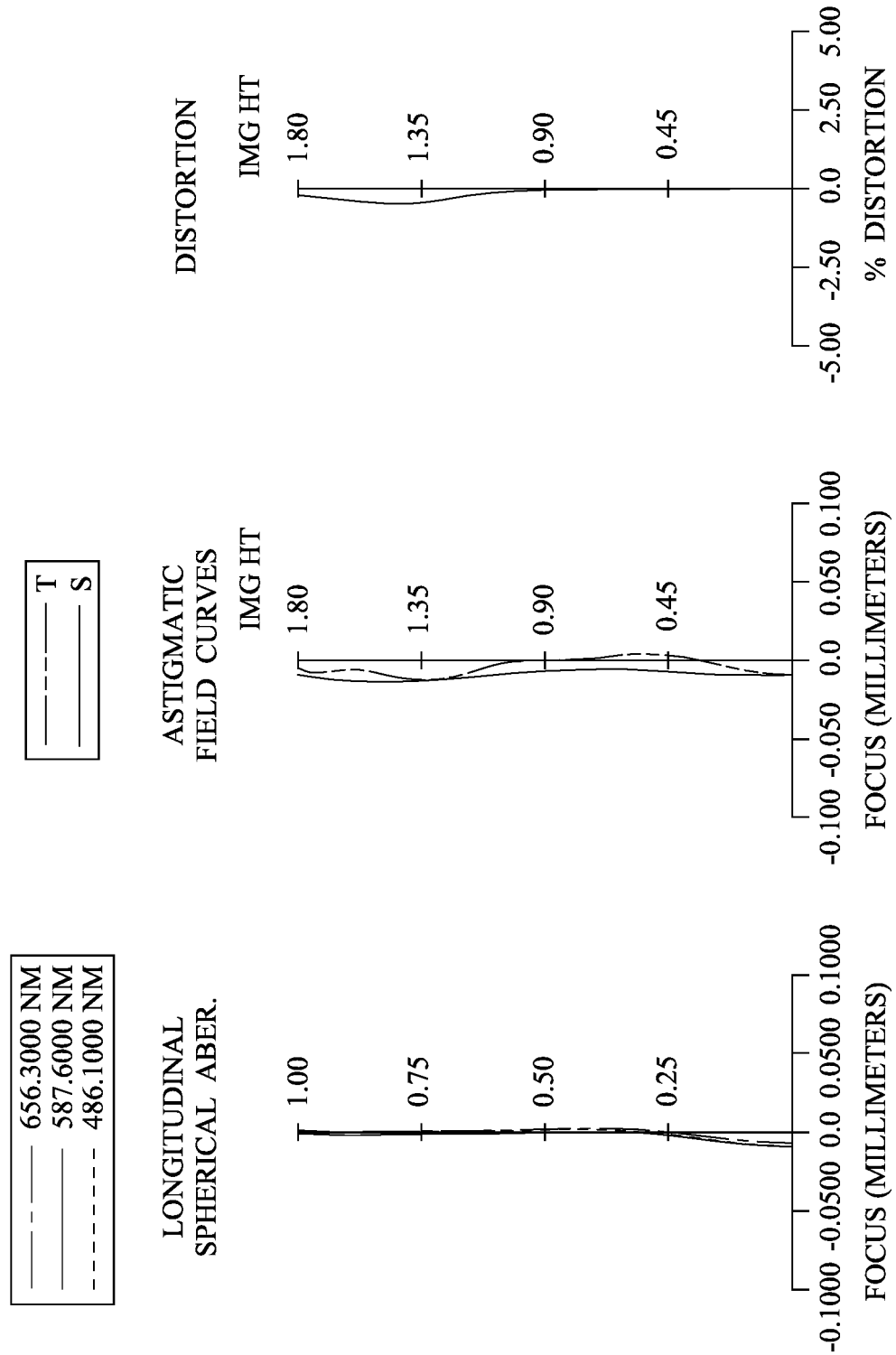
FIG. 22 shows spherical aberration curves, astigmatic field curves and a distortion curve of the imaging apparatus according to the 11th embodiment.

FIG. 21A is a schematic view of an imaging apparatus 11 according to the 11th embodiment of the present disclosure. FIG. 22 shows spherical aberration curves, astigmatic field curves and a distortion curve of the imaging apparatus 11 according to the 11th embodiment. In FIG. 21A, the imaging apparatus 11 includes an image capturing system lens assembly (its reference numeral is omitted) and an image sensor IS. The image capturing system lens assembly includes, in order from an object side to an image side along an optical path, a first lens element E1, an aperture stop ST, a reflective element E7, a stop S1, a second lens element E2, a stop S2, a third lens element E3, a fourth lens element E4, a fifth lens element E5, a filter E6 and an image surface IMG, wherein the image sensor IS is disposed on the image surface IMG of the image capturing system lens assembly. The image capturing system lens assembly includes five lens elements (E1, E2, E3, E4, E5) without additional one or more lens elements inserted between the first lens element E1 and the fifth lens element E5.

The first lens element E1 with positive refractive power has an object-side surface being concave in a paraxial region thereof and an image-side surface being convex in a paraxial region thereof. The first lens element E1 is made of a plastic material, and has the object-side surface and the image-side surface being both aspheric. Furthermore, the object-side surface of the first lens element E1 includes one inflection point.

The second lens element E2 with positive refractive power has an object-side surface being convex in a paraxial region thereof and an image-side surface being convex in a paraxial region thereof. The second lens element E2 is made of a plastic material, and has the object-side surface and the image-side surface being both aspheric. Furthermore, the object-side surface of the second lens element E2 includes one inflection point.

The third lens element E3 with negative refractive power has an object-side surface being convex in a paraxial region thereof and an image-side surface being concave in a paraxial region thereof. The third lens element E3 is made of a plastic material, and has the object-side surface and the image-side surface being both aspheric. Furthermore, the object-side surface of the third lens element E3 includes two inflection points, and the image-side surface of the third lens element E3 includes two inflection points.

The fourth lens element E4 with negative refractive power has an object-side surface being concave in a paraxial region thereof and an image-side surface being convex in a paraxial region thereof. The fourth lens element E4 is made of a plastic material, and has the object-side surface and the image-side surface being both aspheric. Furthermore, the object-side surface of the fourth lens element E4 includes one inflection point, and the image-side surface of the fourth lens element E4 includes one inflection point.

The fifth lens element E5 with positive refractive power has an object-side surface being convex in a paraxial region thereof and an image-side surface being concave in a paraxial region thereof. The fifth lens element E5 is made of a plastic material, and has the object-side surface and the image-side surface being both aspheric. Furthermore, the object-side surface of the fifth lens element E5 includes one inflection point, and the image-side surface of the fifth lens element E5 includes one inflection point and one critical point.

According to the 11th embodiment, the reflective element E7 is a prism, which is made of glass material and disposed between the first lens element E1 and the second lens element E2.

The filter E6 is made of a glass material, which is located between the fifth lens element E5 and the image surface IMG in order, and will not affect the focal length of the image capturing system lens assembly.

The detailed optical data of the 11th embodiment are shown in Table 11A and the aspheric surface data are shown in Table 11B below.

TABLE 11A

11th Embodiment
f = 2.25 mm, Fno = 2.37, HFOV = 38.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −1.6629 | ASP | 1.050 | Plastic | 1.544 | 55.8 | 8.56 |
| 2 | | −1.4980 | ASP | 0.090 | | | | |
| 3 | Ape. Stop | Plano | | 0,010 | | | | |
| 4 | Prism | Plano | | 2.000 | Glass | 1.945 | 17.9 | — |
| 5 | | Plano | | 0.010 | | | | |
| 6 | Stop | Plano | | 0.120 | | | | |
| 7 | Lens 2 | 2.5252 | ASP | 0.847 | Plastic | 1.544 | 56.0 | 2.20 |
| 8 | | −2.0090 | ASP | −0.340 | | | | |
| 9 | Stop | Plano | | 0.430 | | | | |
| 10 | Lens 3 | 12.7339 | ASP | 0.230 | Plastic | 1.698 | 14.5 | −7.19 |
| 11 | | 3.5741 | ASP | 0.350 | | | | |

TABLE 11A-continued

11th Embodiment
f = 2.25 mm, Fno = 2.37, HFOV = 38.6 deg.

| Surface # | | Curvature Radius | | Thickness | Material | Index | Abbe # | Focal Length |
|---|---|---|---|---|---|---|---|---|
| 12 | Lens 4 | −0.8681 | ASP | 0.285 | Plastic | 1.587 | 28.3 | −1.83 |
| 13 | | −5.0697 | ASP | 0.090 | | | | |
| 14 | Lens 5 | 0.5270 | ASP | 0.320 | Plastic | 1.543 | 56.5 | 2.11 |
| 15 | | 0.7663 | ASP | 0.340 | | | | |
| 16 | Filter | Plano | | 0.210 | Glass | 1.517 | 64.2 | — |
| 17 | | Plano | | 0.414 | | | | |
| 18 | Image | Plano | | — | | | | |

Reference wavelength is 587.6 nm (d-line).
Effective radius of Surface 6 (stop S1) is 0.883 mm.
Effective radius of Surface 9 (stop S2) is 1.150 mm.

TABLE 11B

Aspheric Coefficients

| Surface # | 1 | 2 | 7 | 8 | 10 |
|---|---|---|---|---|---|
| k = | 3.4227900E−01 | 6.1765500E−01 | 4.2985800E−02 | 2.9821700E−01 | 2.6209200E+01 |
| A4 = | 1.7297472E−02 | 1.1749990E−01 | 6.1965424E−02 | −5.4657589E−02 | −3.9446710E−01 |
| A6 = | 2.0650727E−01 | −3.2350931E−01 | 2.9589984E−02 | 1.0666176E+00 | 2.3366152E+00 |
| A8 = | −1.1706802E+00 | 2.9249697E+00 | −3.0026074E−01 | −4.1838311E+00 | −8.5821770E+00 |
| A10 = | 4.2821850E+00 | −1.3915282E+01 | 7.3689901E−01 | 8.8860186E+00 | 1.7291638E+01 |
| A12 = | −9.4184790E+00 | 3.8091191E+01 | −1.0650380E+00 | −1.1440285E+01 | −2.0807923E+01 |
| A14 = | 1.2236586E+01 | −5.8579941E+01 | 8.9871701E−01 | 9.2211652E+00 | 1.5753992E+01 |
| A16 = | −8.6343334E+00 | 4.6001451E+01 | −4.1555266E−01 | −4.5999992E+00 | −7.5684486E+00 |
| A18 = | 2.5489058E+00 | −1.3710412E+01 | 7.6917042E−02 | 1.3065412E+00 | 2.1771381E+00 |
| A20 = | | | | −1.6238478E−01 | −2.9158949E−01 |

| Surface # | 11 | 12 | 13 | 14 | 15 |
|---|---|---|---|---|---|
| k = | −2.8319600E+01 | −1.2167900E+01 | −6.2051100E+00 | −3.4496300E+00 | −2.9489500E+00 |
| A4 = | −1.3140561E+00 | 6.9172504E−02 | −4.8531808E−01 | 2.6457616E−01 | 6.6467700E−01 |
| A6 = | 1.6759481E+00 | 4.9931377E−01 | 6.9613821E−01 | −2.6758220E+00 | −4.6126161E+00 |
| A8 = | −6.2406409E+00 | −1.8385584E+00 | 2.8702021E+00 | 4.9255289E+00 | 1.1626586E+01 |
| A10 = | 1.2158470E+01 | 4.6504717E+00 | −1.8903134E+01 | −7.5286853E+00 | −1.8158477E+01 |
| A12 = | −1.4368640E+01 | −8.8407418E+00 | 5.4772563E+01 | 1.5501029E+01 | 1.9131953E+01 |
| A14 = | 1.0552089E+01 | 1.0915544E+01 | −9.6538181E+01 | −3.0152518E+01 | −1.3867842E+01 |
| A16 = | −4.4136290E+00 | −7.8867638E+00 | 1.0827417E+02 | 3.8537761E+01 | 6.8459694E+00 |
| A18 = | 7.9443042E−01 | 3.0587296E+00 | −7.5266991E+01 | −2.9615191E+01 | −2.2039338E+00 |
| A20 = | | −5.0076257E−01 | 2.9537756E+01 | 1.2673782E+01 | 4.1730690E−01 |
| A22 = | | | −4.9898879E+00 | −2.3670668E+00 | −3.5209197E−02 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 11A and Table 11B as the following values and satisfy the following conditions in Table 11C:

TABLE 11C

| 11th Embodiment | |
|---|---|
| f [mm] | 2.25 |
| Fno | 2.37 |
| HFOV [degrees] | 38.6 |
| ATmax/BL | 2.31 |
| ATmax/Y11 | 2.45 |
| ATmax/f | 0.99 |
| CT/CTmax | 1.00 |
| (CT2 + T23 + CT3 + T34 + CT4 + T45 + CT5)/f | 0.98 |

TABLE 11C-continued

| 11th Embodiment | |
|---|---|
| f/f12 | 1.32 |
| f/f2 | 1.02 |
| f/f3 | −0.31 |
| f/f45 | −0.16 |
| f/ImgH | 1.25 |
| f/R1 | −1.35 |
| f/R3 | 0.89 |
| f/R4 | −1.12 |
| f123/f234 | −0.03 |
| f34/f45 | 0.10 |
| (N3 + N5)/2 | 1.621 |
| (R1 − R2)/(R1 + R2) | 0.05 |
| (R3 + R4)/(R3 − R4) | 0.11 |
| (R5 + R6)/(R5 − R6) | 1.78 |
| (R7 − R8)/(R7 + R8) | −0.71 |
| SL/TL | 0.82 |
| T12/f | 0.99 |
| T12/ImgH | 1.24 |
| (T23 + T34 + T45)/ΣAT | 0.19 |
| T45/f | 0.04 |

TABLE 11C-continued

11th Embodiment

| | |
|---|---|
| TL/f | 2.87 |
| (TL − SL)/f | 0.51 |
| V1/N1 | 36.15 |
| V2/N2 | 36.26 |
| V3/N3 | 8.53 |
| V4/N4 | 17.83 |
| V5/N5 | 36.60 |
| Y11/ImgH | 0.50 |
| Y52/Y11 | 1.42 |
| FOV [degrees] | 77.2 |

Figure 21B:
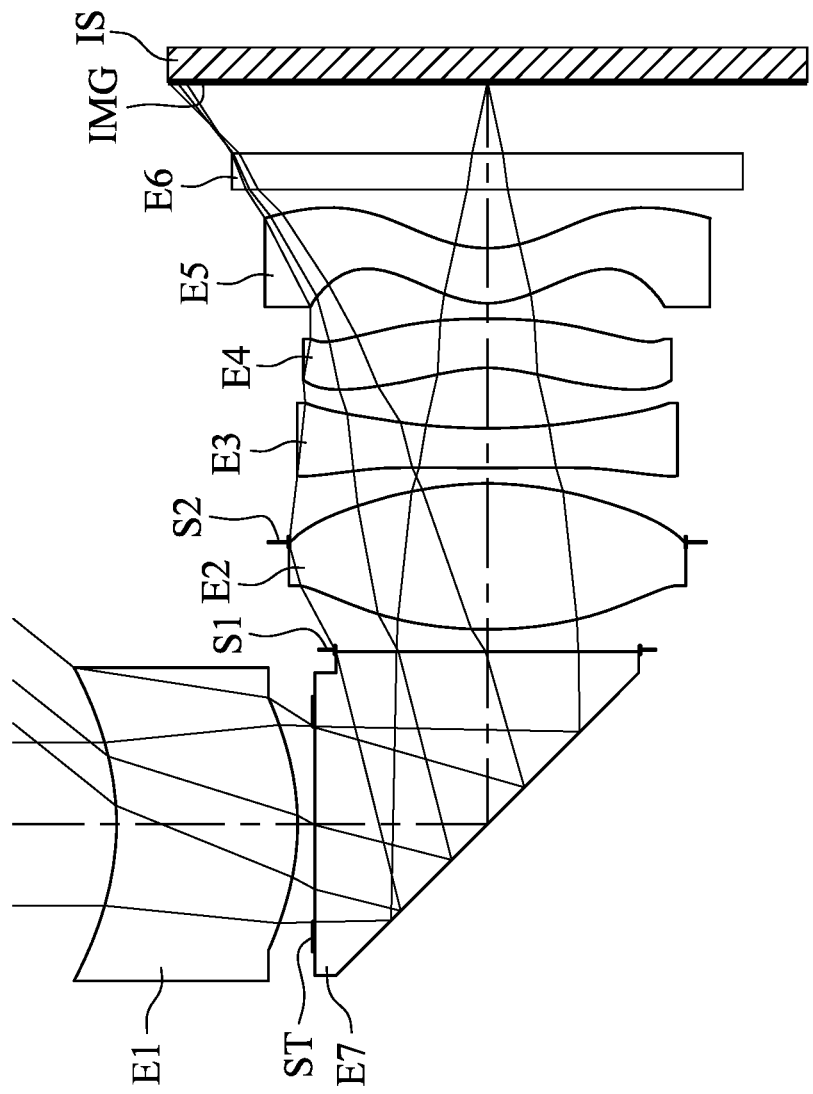
FIG. 21B is a schematic view of the imaging apparatus with another reflective element according to the 11th embodiment of the present disclosure.

Please refer to FIG. 21B, which is a schematic view of the imaging apparatus 11 with another reflective element E7 according to the 11th embodiment of the present disclosure. The difference between the FIG. 21B and FIG. 21A is that the reflective element E7 of FIG. 21B can fold the direction of the optical axis, so that the arrangement is favorable for adapting the electronic device with different requirements.

12th Embodiment

Figure 26:
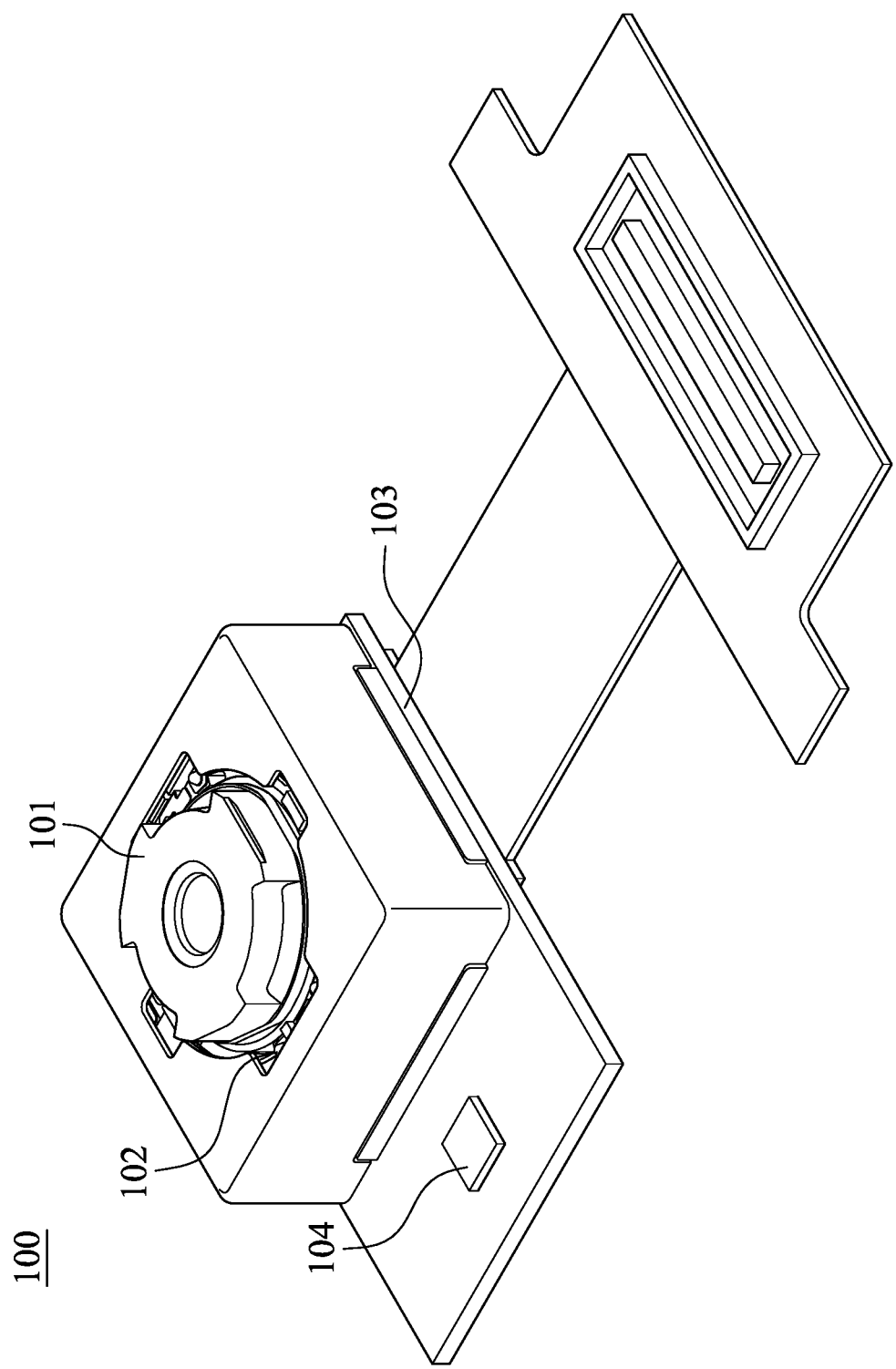
FIG. 26 is a schematic view of an imaging apparatus according to the 12th embodiment of the present disclosure.

FIG. 26 is a schematic view of an imaging apparatus 100 according to the 12th embodiment of the present disclosure. In FIG. 26, the imaging apparatus 100 of the 12th embodiment is a camera module, the imaging apparatus 100 includes an imaging lens assembly 101, a driving apparatus 102 and an image sensor 103, wherein the imaging lens assembly 101 includes the image capturing system lens assembly of the present disclosure and a lens barrel (not shown in drawings) for carrying the image capturing system lens assembly. The imaging apparatus 100 can focus light from an imaged object via the imaging lens assembly 101, perform image focusing by the driving apparatus 102, and generate an image on the image sensor 103, and the imaging information can be transmitted.

The driving apparatus 102 can be an auto-focus module, which can be driven by driving systems, such as voice coil motors (VCM), micro electro-mechanical systems (MEMS), piezoelectric systems, and shape memory alloys etc. The image capturing system lens assembly can obtain a favorable imaging position by the driving apparatus 102 so as to capture clear images when the imaged object is disposed at different object distances.

The imaging apparatus 100 can include the image sensor 103 located on the image surface of the image capturing system lens assembly, such as CMOS and CCD, with superior photosensitivity and low noise. Thus, it is favorable for providing realistic images with high definition image quality thereof. Moreover, the imaging apparatus 100 can further include an image stabilization module 104, which can be a kinetic energy sensor, such as an accelerometer, a gyro sensor, and a Hall Effect sensor. In the 12th embodiment, the image stabilization module 104 is a gyro sensor, but is not limited thereto. Therefore, the variation of different axial directions of the image capturing system lens assembly can adjusted so as to compensate the image blur generated by motion at the moment of exposure, and it is further favorable for enhancing the image quality while photographing in motion and low light situation. Furthermore, advanced image compensation functions, such as optical image stabilizations (OIS) and electronic image stabilizations (EIS) etc., can be provided.

13th Embodiment

Figure 27A:
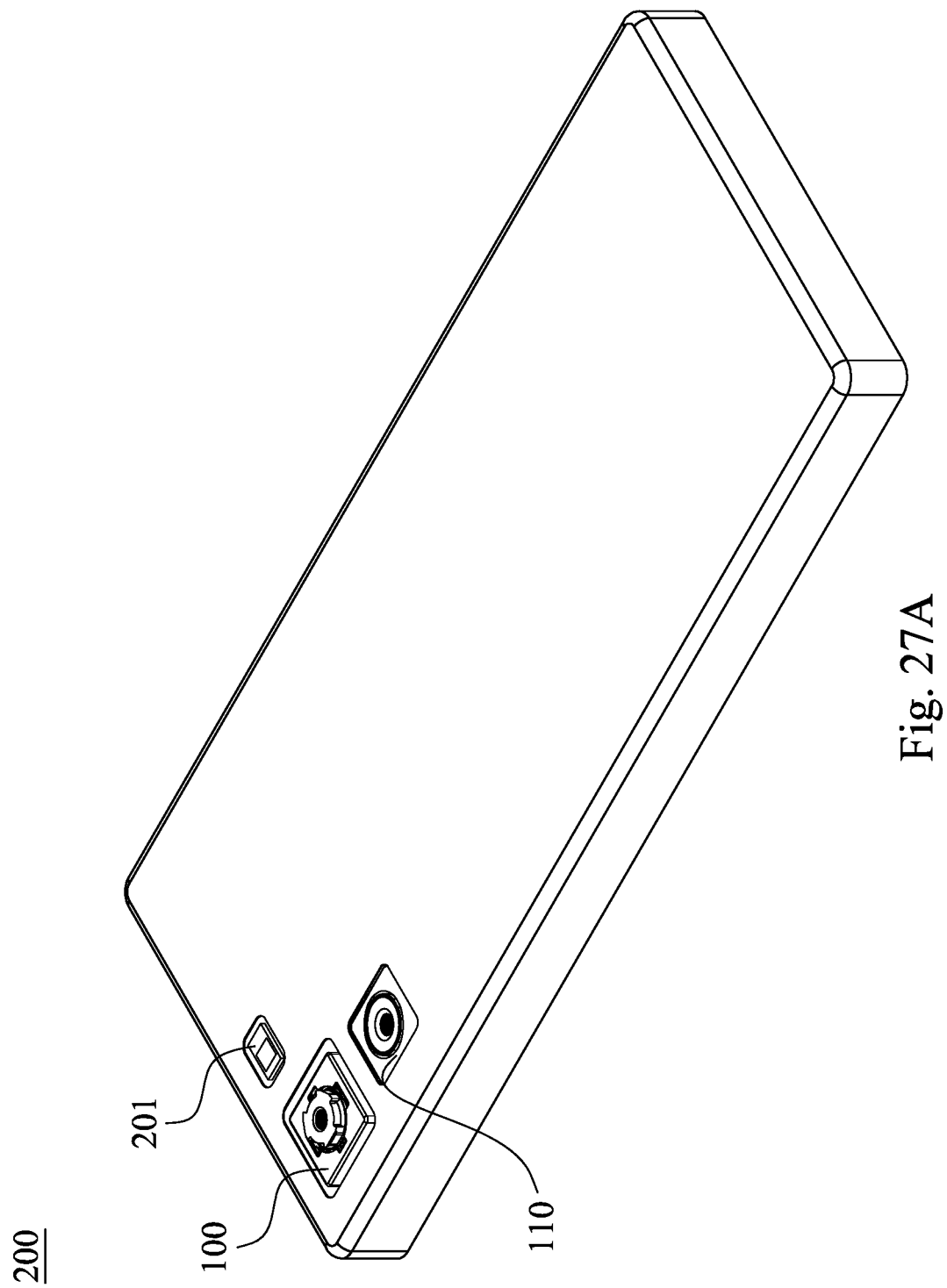
FIG. 27A is a schematic view of one side of an electronic device according to the 13th embodiment of the present disclosure.
Figure 27B:
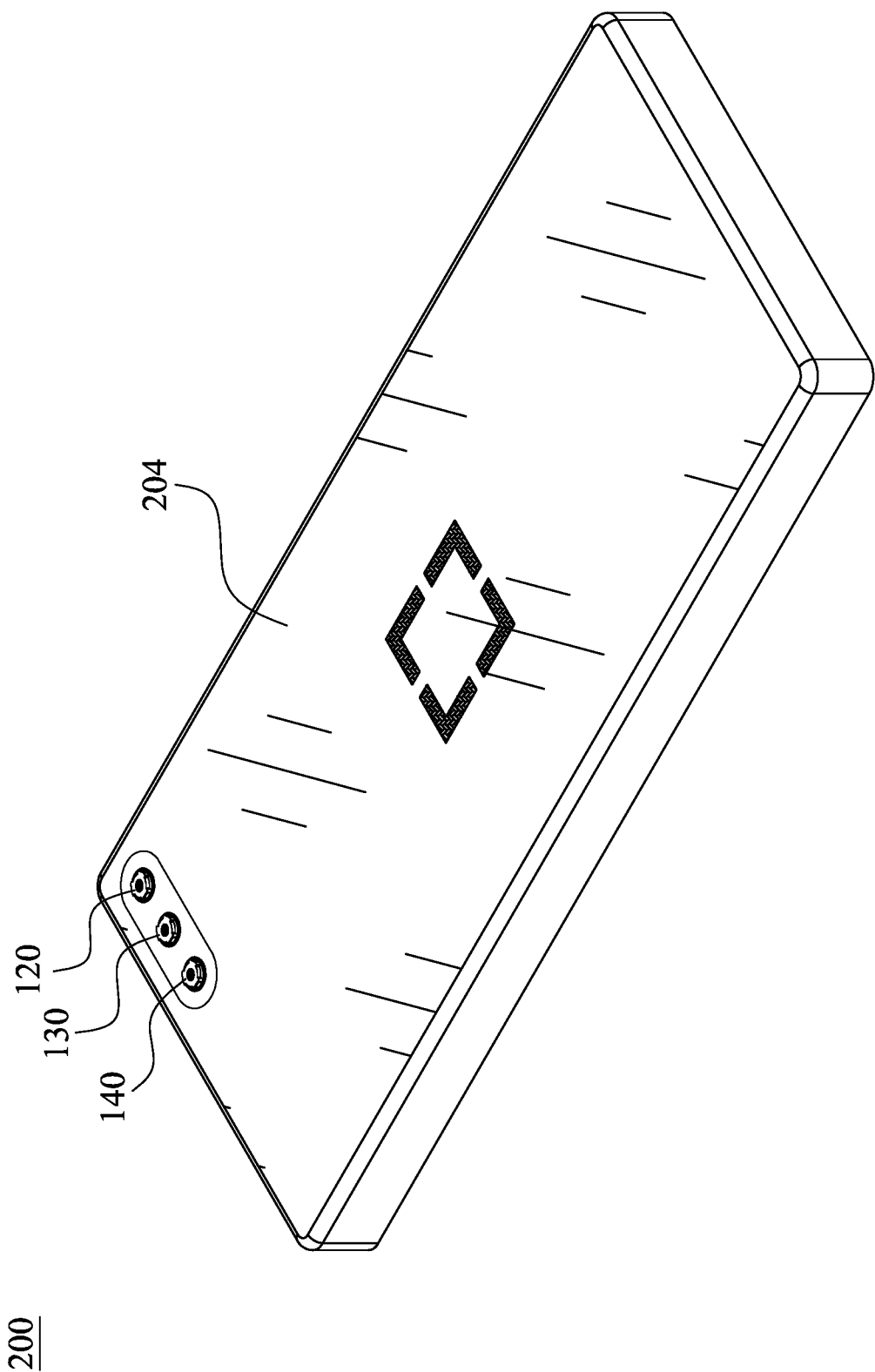
FIG. 27B is a schematic view of another side of the electronic device of FIG. 27A.
Figure 27C:
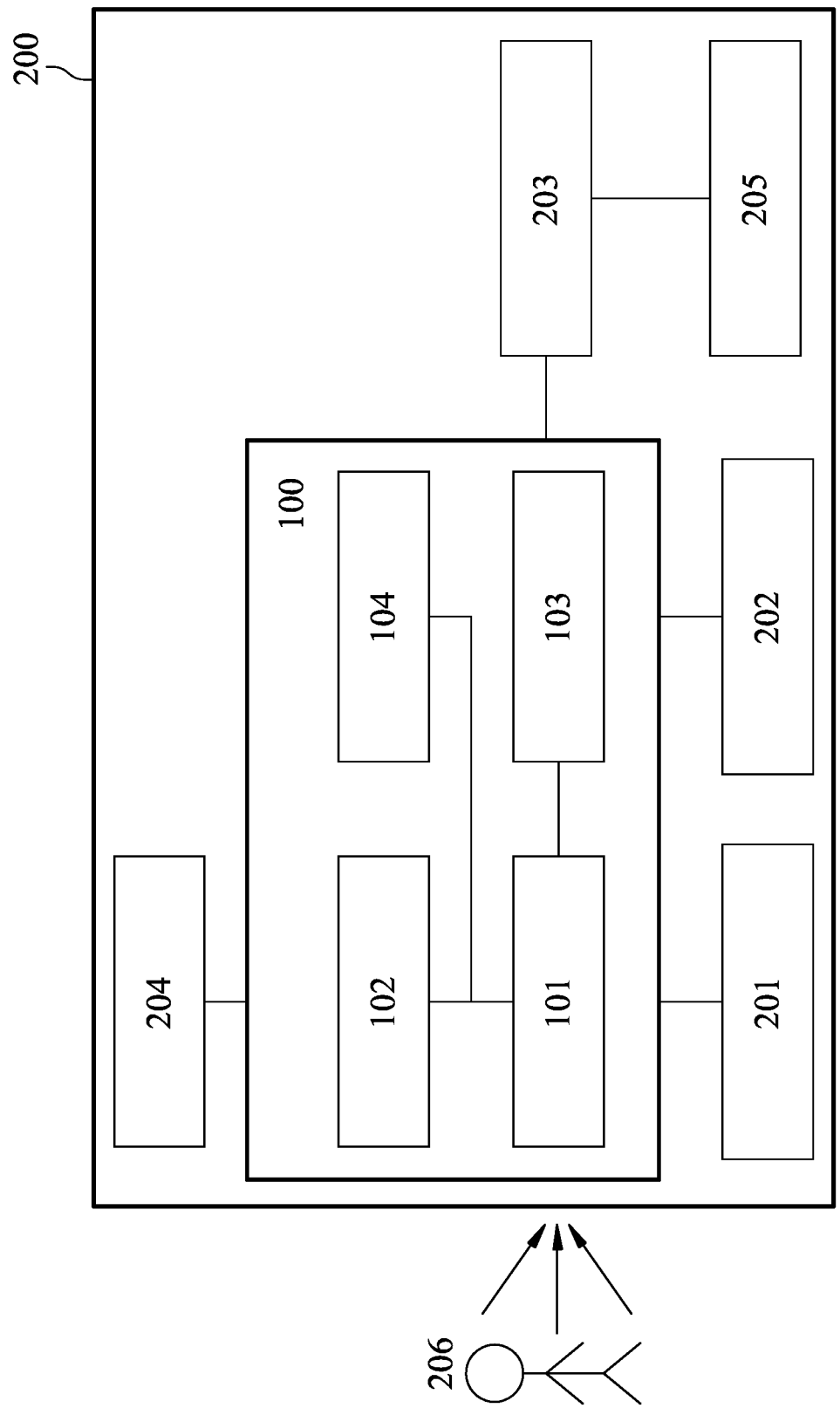
FIG. 27C is a system schematic view of the electronic device of FIG. 27A.

FIG. 27A is a schematic view of one side of an electronic device 200 according to the 13th embodiment of the present disclosure. FIG. 27B is a schematic view of another side of the electronic device 200 of FIG. 27A. FIG. 27C is a system schematic view of the electronic device 200 of FIG. 27A. In FIGS. 27A, 27B and 27C, the electronic device 200 according to the 13th embodiment is a smartphone, which include imaging apparatuses 100, 110, 120, 130, 140, a flash module 201, a focusing assisting module 202, an image signal processor (ISP) 203, a user interface 204 and an image software processor 205, wherein each of the imaging apparatuses 120, 130, 140 is a front camera. When the user captures images of an imaged object 206 via the user interface 204, the electronic device 200 focuses and generates an image via at least one of the imaging apparatuses 100, 110, 120, 130, 140, while compensating for low illumination via the flash module 201 when necessary. Then, the electronic device 200 quickly focuses on the imaged object 206 according to its object distance information provided by the focusing assisting module 202, and optimizes the image via the image signal processor 203 and the image software processor 205. Thus, the image quality can be further enhanced. The focusing assisting module 202 can adopt conventional infrared or laser for obtaining quick focusing, and the user interface 204 can utilize a touch screen or a physical button for capturing and processing the image with various functions of the image processing software.

Each of the imaging apparatuses 100, 110, 120, 130, 140 according to the 13th embodiment can include the image capturing system lens assembly of the present disclosure, and can be the same or similar to the imaging apparatus 100 according to the aforementioned 12th embodiment, and will not describe again herein. In detail, according to the 13th embodiment, the imaging apparatuses 100, 110 can be wide angle imaging apparatus and ultra-wide angle imaging apparatus, respectively. The imaging apparatuses 120, 130, 140 can be wide angle imaging apparatus, ultra-wide angle imaging apparatus and TOF (Time-Of-Flight) module, respectively, or can be others imaging apparatuses, which will not be limited thereto. Further, the connecting relationships between each of the imaging apparatuses 110, 120, 130, 140 and other elements can be the same as the imaging apparatus 100 in FIG. 27C, or can be adaptively adjusted according to the type of the imaging apparatuses, which will not be shown and detailed descripted again.

14th Embodiment

Figure 28:
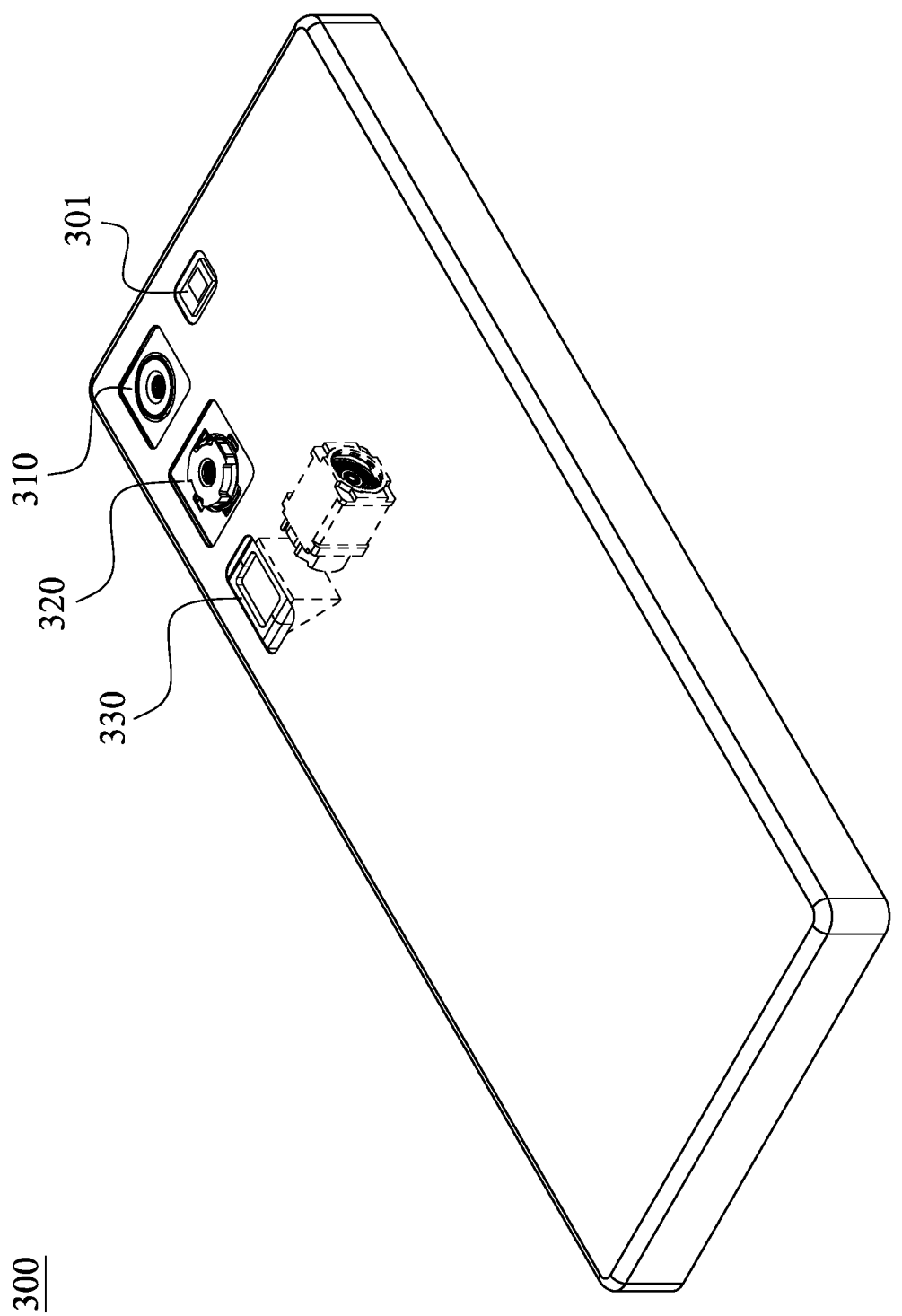
FIG. 28 is a schematic view of one side of an electronic device according to the 14th embodiment of the present disclosure.

FIG. 28 is a schematic view of one side of an electronic device 300 according to the 14th embodiment of the present disclosure. According to the 14th embodiment, the electronic device 300 is a smartphone, which include imaging apparatuses 310, 320, 330 and a flash module 301.

The electronic device 300 according to the 14th embodiment can include the same or similar elements to that according to the 13th embodiment, and each of the imaging apparatuses 310, 320, 330 according to the 14th embodiment can have a configuration which is the same or similar to that according to the 13th embodiment, and will not describe again herein. In detail, according to the 14th embodiment, each of the imaging apparatuses 310, 320, 330 can include the image capturing system lens assembly of the present disclosure, and can be the same or similar to the imaging apparatus 100 according to the aforementioned 12th embodiment, and will not describe again herein. In detail, the imaging apparatus 310 can be ultra-wide angle imaging apparatus, the imaging apparatus 320 can be wide angle imaging apparatus, the imaging apparatus 330 can be telephoto imaging apparatus (which can include light path folding element), or can be adaptively adjusted according to the type of the imaging apparatuses, which will not be limited to the arrangement.

15th Embodiment

Figure 29:
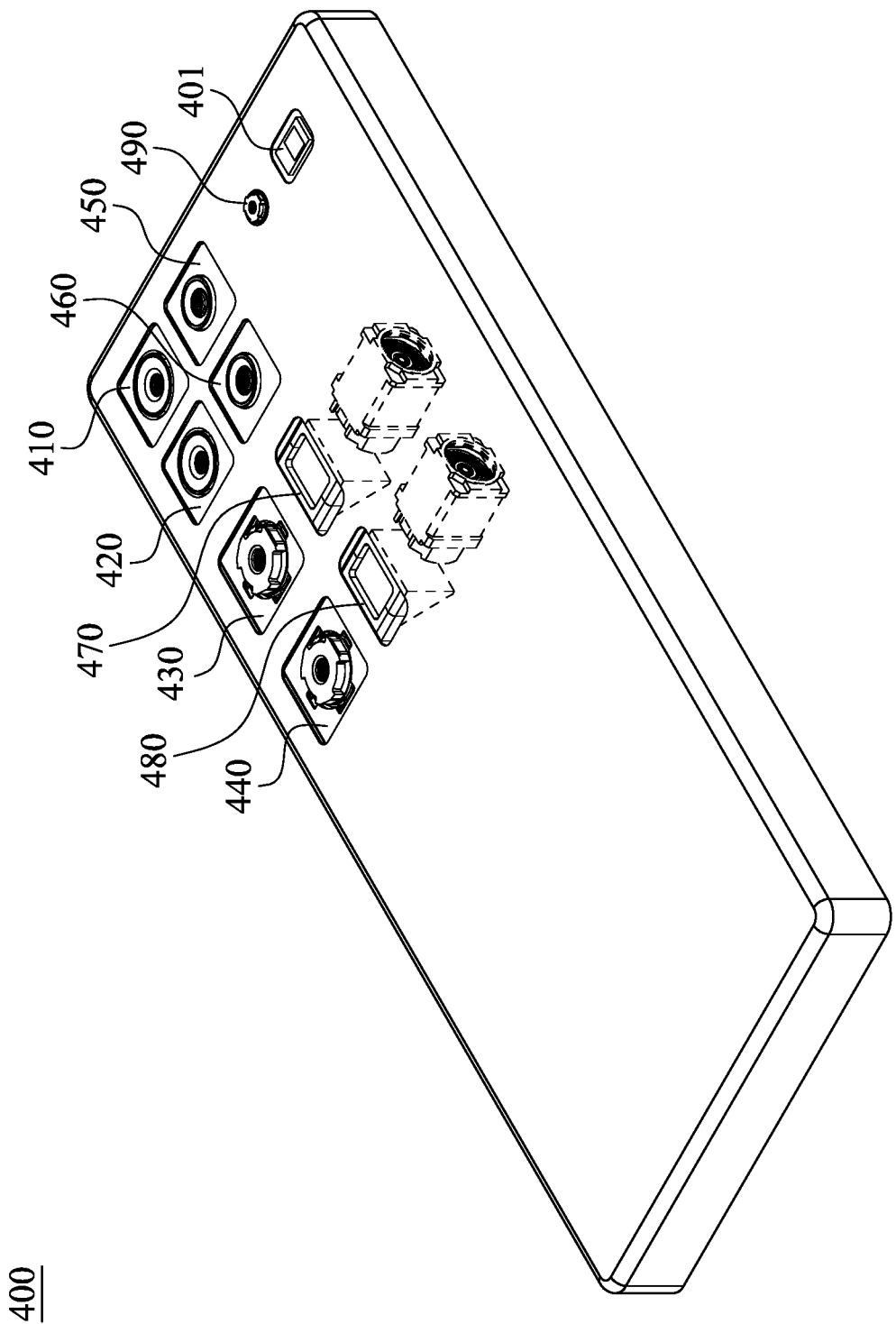
FIG. 29 is a schematic view of one side of an electronic device according to the 15th embodiment of the present disclosure.

FIG. 29 is a schematic view of one side of an electronic device 400 according to the 15th embodiment of the present disclosure. According to the 15th embodiment, the electronic device 400 is a smartphone, which include imaging apparatuses 410, 420, 430, 440, 450, 460, 470, 480, 490 and a flash module 401.

The electronic device 400 according to the 15th embodiment can include the same or similar elements to that according to the 13th embodiment, and each of the imaging apparatuses 410, 420, 430, 440, 450, 460, 470, 480, 490 and the flash module 401 can have a configuration which is the same or similar to that according to the 13th embodiment, and will not describe again herein. In detail, according to the 15th embodiment, each of the imaging apparatuses 410, 420, 430, 440, 450, 460, 470, 480, 490 can include the image capturing system lens assembly of the present disclosure, and can be the same or similar to the imaging apparatus 100 according to the aforementioned 12th embodiment, and will not describe again herein.

In detail, each of the imaging apparatuses 410, 420 can be ultra-wide angle imaging apparatus, each of the imaging apparatuses 430, 440 can be wide angle imaging apparatus, each of the imaging apparatuses 450, 460 can be telephoto imaging apparatus, each of the imaging apparatuses 470, 480 can be telephoto imaging apparatus (which can include light path folding element), the imaging apparatus 490 can be TOF module, or can be adaptively adjusted according to the type of the imaging apparatuses, which will not be limited to the arrangement.

16th Embodiment

Figure 30B:
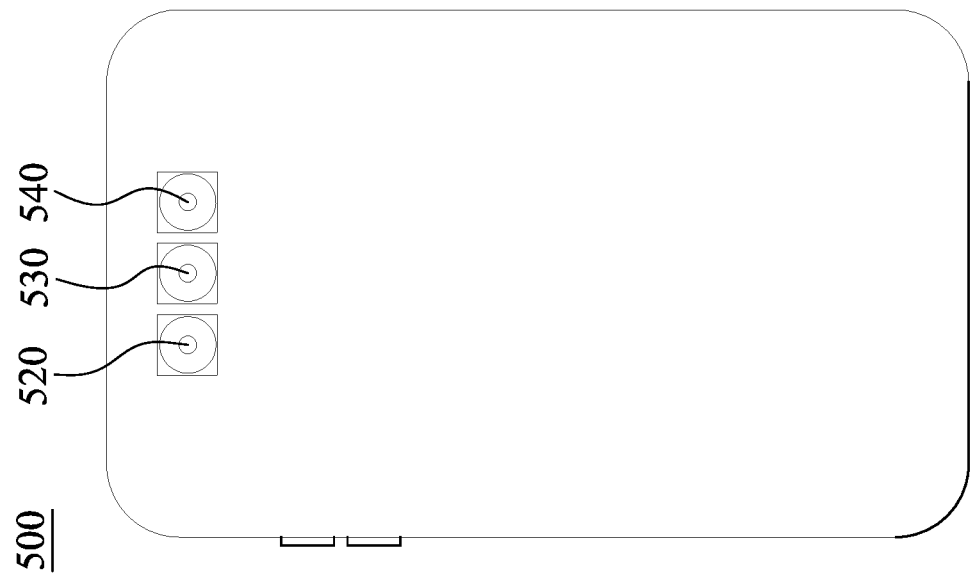
FIG. 30B is a schematic view of another side of the electronic device according to the 16th embodiment of FIG. 30A.
Figure 30A:
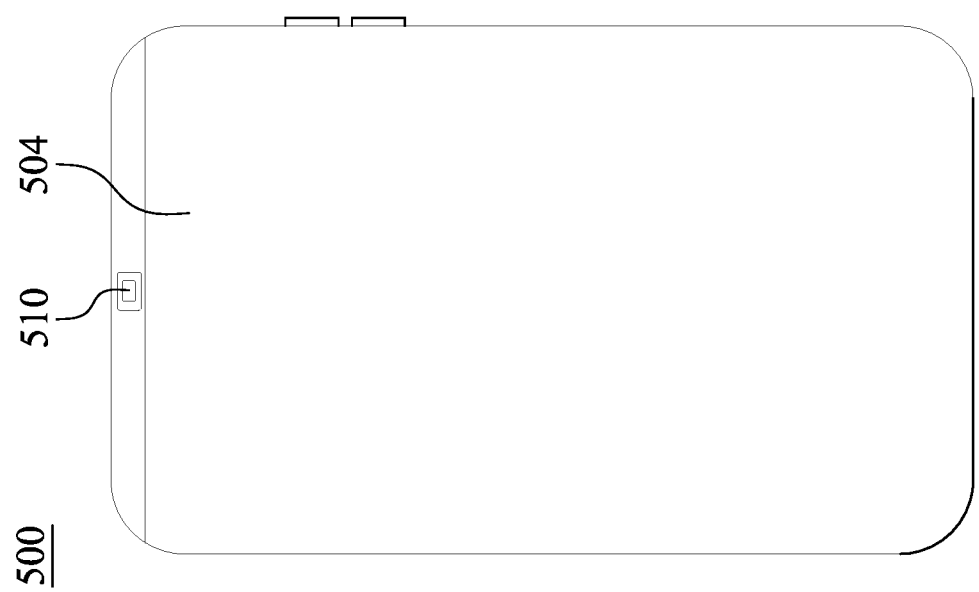
FIG. 30A is a schematic view of one side of an electronic device according to the 16th embodiment of the present disclosure.

FIG. 30A is a schematic view of one side of an electronic device 500 according to the 16th embodiment of the present disclosure. FIG. 30B is a schematic view of another side of the electronic device 500 according to the 16th embodiment of FIG. 30A. In FIG. 30A and FIG. 30B, according to the 16th embodiment, the electronic device 500 is a smartphone, which include imaging apparatuses 510, 520, 530, 540 and a user interface 504.

The electronic device 500 according to the 16th embodiment can include the same or similar elements to that according to the 13th embodiment, and each of the imaging apparatuses 510, 520, 530, 540 and the user interface 504 can have a configuration which is the same or similar to that according to the 13th embodiment, and will not describe again herein. In detail, according to the 16th embodiment, the imaging apparatus 510 corresponds to a non-circular opening located on an outer side of the electronic device 500 for capturing the image, and the imaging apparatuses 520, 530, 540 can be telephoto imaging apparatus, wide angle imaging apparatus and ultra-wide angle imaging apparatus, respectively, or can be adaptively adjusted according to the type of the imaging apparatuses, which will not be limited to the arrangement.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing system lens assembly comprising five lens elements, the five lens elements being, in order from an object side to an image side along an optical path:
   a first lens element, a second lens element, a third lens element, a fourth lens element and a fifth lens element, each of the five lens elements has an object-side surface towards the object side and an image-side surface towards the image side;
   wherein the second lens element has positive refractive power; the third lens element has negative refractive power; at least one of the object-side surface and the image-side surface of at least one of the first lens element to the fifth lens element comprises at least one inflection point;
   wherein the image capturing system lens assembly further comprises an aperture stop, an axial distance between the aperture stop and an image surface is SL, an axial distance between the object-side surface of the first lens element and the image surface is TL, a focal length of the image capturing system lens assembly is f, a composite focal length of the third lens element and the fourth lens element is f34, a composite focal length of the fourth lens element and the fifth lens element is f45, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a curvature radius of the object-side surface of the second lens element is R3, a curvature radius of the image-side surface of the second lens element is R4, a curvature radius of the object-side surface of the third lens element is R5, a curvature radius of the image-side surface of the third lens element is R6, a central thickness of the second lens element is CT2, a central thickness of the third lens element is CT3, a central thickness of the fourth lens element is CT4, a central thickness of the fifth lens element is CT5, and the following conditions are satisfied:

$0.76 < SL/TL < 1.50;$ $0.82 < T12/f < 1.38;$ $1.05 < (R3+R4)/(R3-R4) < 0.70;$ $3.50 < (R5+R6)/(R5-R6) < 3.00;$ $2.50 < f/f45 < 0.88;$ $5.00 < f34/f45 < 3.60;$ and $0.30 < (CT2+T23+CT3+T34+CT4+T45+CT5)/f < 2.02.$ 2. The image capturing system lens assembly of claim 1, wherein the image-side surface of the fourth lens element is convex in a paraxial region thereof; the image-side surface of the fifth lens element is concave in a paraxial region thereof.

3. The image capturing system lens assembly of claim 1, wherein the object-side surface of the second lens element is convex in a paraxial region thereof, the image-side surface of the second lens element is convex in a paraxial region thereof; a maximum field of view of the image capturing system lens assembly is FOV, and the following condition is satisfied:

50 degrees<$FOV$<120 degrees.

4. The image capturing system lens assembly of claim 1, wherein the axial distance between the second lens element and the third lens element is T23, the axial distance between the third lens element and the fourth lens element is T34, the axial distance between the fourth lens element and the fifth lens element is T45, a sum of all axial distances between adjacent lens elements of the image capturing system lens assembly is ΣAT, and the following condition is satisfied:

0.10<($T$23+$T$34+$T$45)/Σ$AT$<0.50.

5. The image capturing system lens assembly of claim 1, further comprising:
a reflective element disposed between the first lens element and the fifth lens element;
wherein a maximum distance between an optical effective region of the object-side surface of the first lens element and an optical axis is Y11, a maximum distance between an optical effective region of the image-side surface of the fifth lens element and the optical axis is Y52, and the following condition is satisfied:

1.00<$Y$52/$Y$11<2.00.

6. The image capturing system lens assembly of claim 1, wherein there is an air gap between each of adjacent lens elements of the five lens elements; the focal length of the image capturing system lens assembly is f, the curvature radius of the object-side surface of the second lens element is R3, and the following condition is satisfied:

0.70<$f/R$3<1.81.

7. The image capturing system lens assembly of claim 1, wherein the first lens element belongs to a front lens group, the second lens element, the third lens element, the fourth lens element and the fifth lens element belong to a rear lens group, there is a relative displacement between the rear lens group and the front lens group.

8. An image capturing system lens assembly comprising five lens elements, the five lens elements being, in order from an object side to an image side along an optical path:
a first lens element, a second lens element, a third lens element, a fourth lens element and a fifth lens element, each of the five lens elements has an object-side surface towards the object side and an image-side surface towards the image side;
wherein the second lens element has positive refractive power; at least one of the object-side surface and the image-side surface of at least one of the first lens element to the fifth lens element comprises at least one inflection point;
wherein the image capturing system lens assembly further comprises an aperture stop, an axial distance between the aperture stop and an image surface is SL, an axial distance between the object-side surface of the first lens element and the image surface is TL, a focal length of the image capturing system lens assembly is f, a composite focal length of the first lens element and the second lens element is f12, a composite focal length of the first lens element, the second lens element and the third lens element is f123, a composite focal length of the second lens element, the third lens element and the fourth lens element is f234, an axial distance between the first lens element and the second lens element is T12, a curvature radius of the object-side surface of the third lens element is R5, a curvature radius of the image-side surface of the third lens element is R6, a maximum image height of the image capturing system lens assembly is ImgH, and the following conditions are satisfied:

0.74<$SL/TL$<1.05;

0.80<$T$12/$f$<1.40;

2.70<($R$5+$R$6)/($R$5−$R$6)<2.70;

0.40<$f/f$12<2.00;

0.40<$f$123/$f$234<1.85; and 0.80<$f$/ImgH<2.25.

9. The image capturing system lens assembly of claim 8, wherein there is a relative displacement between the first lens element and the fifth lens element; a maximum distance between an optical effective region of the object-side surface of the first lens element and an optical axis is Y11, a maximum distance between an optical effective region of the image-side surface of the fifth lens element and the optical axis is Y52, and the following condition is satisfied:

0.90<$Y$52/$Y$11<2.10.

10. The image capturing system lens assembly of claim 8, wherein the focal length of the image capturing system lens assembly is f, a composite focal length of the fourth lens element and the fifth lens element is f45, and the following condition is satisfied:

−2.00<$f/f$45<0.88.

11. The image capturing system lens assembly of claim 8, wherein a curvature radius of the object-side surface of the second lens element is R3, a curvature radius of the image-side surface of the second lens element is R4, and the following condition is satisfied:

−1.00<($R$3+$R$4)/($R$3−$R$4)<1.50.

12. The image capturing system lens assembly of claim 8, wherein the focal length of the image capturing system lens assembly is f, a curvature radius of the image-side surface of the second lens element is R4, and the following condition is satisfied:

−2.50<$f/R$4<−0.50.

13. The image capturing system lens assembly of claim 8, wherein the image-side surface of the fifth lens element comprises at least one critical point; a curvature radius of the object-side surface of the fourth lens element is R7, a curvature radius of the image-side surface of the fourth lens element is R8, and the following condition is satisfied:

−1.00<($R$7−$R$8)/($R$7+$R$8)<1.00.

14. The image capturing system lens assembly of claim 8, wherein a refractive index of the third lens element is N3, a refractive index of the fifth lens element is N5, and the following condition is satisfied:

$$1.60<(N3+N5)/2<1.90.$$

15. An image capturing system lens assembly comprising five lens elements, the five lens elements being, in order from an object side to an image side along an optical path:
a first lens element, a second lens element, a third lens element, a fourth lens element and a fifth lens element, each of the five lens elements has an object-side surface towards the object side and an image-side surface towards the image side;
wherein the second lens element has positive refractive power; the object-side surface of the second lens element is convex in a partial region thereof; at least one of the object-side surface and the image-side surface of at least one of the first lens element to the fifth lens element comprises at least one inflection point;
wherein the image capturing system lens assembly further comprises an aperture stop, an axial distance between the aperture stop and an image surface is SL, an axial distance between the object-side surface of the first lens element and the image surface is TL, a focal length of the image capturing system lens assembly is f, a composite focal length of the third lens element and the fourth lens element is f34, a composite focal length of the fourth lens element and the fifth lens element is f45, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a maximum image height of the image capturing system lens assembly is ImgH, a central thickness of the second lens element is CT2, a central thickness of the third lens element is CT3, a central thickness of the fourth lens element is CT4, a central thickness of the fifth lens element is CT5, and the following conditions are satisfied:

$$0.74<T12/f<1.40;$$

$$0.74<SL/R<1.50;$$

$$-2.50<f/f45<1.04;$$

$$-8.00<f34/f45<2.02;$$

$$0.80<f/ImgH<1.45; \text{ and}$$

$$0.30<(CT2+T23+CT3+T34+CT4+T45+CT5)/f<3.40.$$

16. The image capturing system lens assembly of claim 15, wherein the object-side surface of the first lens element is concave in a paraxial region thereof; the image-side surface of the second lens element is convex in a paraxial region thereof.

17. The image capturing system lens assembly of claim 15, wherein the axial distance between the first lens element and the second lens element is T12, the maximum image height of the image capturing system lens assembly is ImgH, and the following condition is satisfied:

$$0.90<T12/ImgH<1.90.$$

18. The image capturing system lens assembly of claim 15, wherein an f-number of the image capturing system lens assembly is Fno, a curvature radius of the object-side surface of the first lens element is R1, a curvature radius of the image-side surface of the first lens element is R2, and the following conditions are satisfied:

$$1.60<Fno<2.5; \text{ and}$$

$$-1.00<(R1-R2)/(R1+R2)<1.00.$$

19. The image capturing system lens assembly of claim 15, wherein a maximum distance between an optical effective region of the object-side surface of the first lens element and an optical axis is Y11, a maximum distance between an optical effective region of the image-side surface of the fifth lens element and the optical axis is Y52, and the following condition is satisfied:

$$1.10<Y52/Y11<2.00.$$

20. The image capturing system lens assembly of claim 15, further comprising:
a reflective element disposed between the first lens element and the fifth lens element;
wherein the axial distance between the aperture stop and the image surface is SL, the axial distance between the object-side surface of the first lens element and the image surface is TL, the focal length of the image capturing system lens assembly is f, and the following condition is satisfied:

$$0.30<(TL-SL)/f<0.85.$$

21. The image capturing system lens assembly of claim 15, wherein a curvature radius of the object-side surface of the second lens element is R3, a curvature radius of the image-side surface of the second lens element is R4, and the following condition is satisfied:

$$-0.80<(R3+R4)/(R3-R4)<1.50.$$

22. The image capturing system lens assembly of claim 15, wherein the focal length of the image capturing system lens assembly is f, a curvature radius of the image-side surface of the second lens element is R4, and the following condition is satisfied:

$$-2.70<f/R4<-0.40.$$

23. An imaging apparatus, comprising:
the image capturing system lens assembly of claim 15; and
an image sensor disposed on the image surface of the image capturing system lens assembly.

24. An electronic device, comprising:
the imaging apparatus of claim 23.

25. An image capturing system lens assembly comprising five lens elements, the five lens elements being, in order from an object side to an image side along an optical path:
a first lens element, a second lens element, a third lens element, a fourth lens element and a fifth lens element, each of the five lens elements has an object-side surface towards the object side and an image-side surface towards the image side;
wherein at least one of the object-side surface and the image-side surface of at least one of the first lens element to the fifth lens element comprises at least one inflection point; at least one of the first lens element to the fifth lens element is made of plastic material and has the object-side surface and the image-side surface being both aspheric;
wherein the image capturing system lens assembly further comprises an aperture stop, an axial distance between the aperture stop and an image surface is SL, an axial distance between the object-side surface of the first lens element and the image surface is TL, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a maximum among T12, T23, T34, T45 is ATmax, an axial distance between the image-side surface of the fifth lens element and the image surface is BL, a focal length of the image capturing system lens assembly is f, a focal length of the second lens element is f2, a focal length of the third lens element is f3, a curvature radius of the object-side surface of the first lens element is R1, a refractive index of the third lens element is N3, a refractive index of the fifth lens element is N5, and the following conditions are satisfied:

$0.75 < SL/TL < 1.50;$ $0.78 < AT\max/f < 9.00;$ $1.50 < AT\max/BL < 7.00;$ $1.00 < TL/f < 5.00;$ $-5.00 < f/R1 < 0.45;$ $-0.60 < f/f2 < 3.00;$ $-2.00 < f/f3 < 0.85;$ and $1.60 < (N3 + N5)/2 < 1.90.$ 26. The image capturing system lens assembly of claim 25, wherein the axial distance between the aperture stop and the image surface is SL, the axial distance between the object-side surface of the first lens element and the image surface is TL, the focal length of the image capturing system lens assembly is f, and the following condition is satisfied:

$0.30 < (TL-SL)/f < 0.85.$

27. The image capturing system lens assembly of claim 25, wherein the axial distance between the first lens element and the second lens element is T12, the axial distance between the second lens element and the third lens element is T23, the axial distance between the third lens element and the fourth lens element is T34, the axial distance between the fourth lens element and the fifth lens element is T45, the maximum among T12, T23, T34, T45 is ATmax, the focal length of the image capturing system lens assembly is f, and the following condition is satisfied:

$0.85 < AT\max/f < 2.0.$

28. The image capturing system lens assembly of claim 25, wherein the axial distance between the second lens element and the third lens element is T23, the axial distance between the third lens element and the fourth lens element is T34, the axial distance between the fourth lens element and the fifth lens element is T45, a sum of all axial distances between adjacent lens elements of the image capturing system lens assembly is ΣAT, and the following condition is satisfied:

$0.12 < (T23+T34+T45)/\Sigma AT < 0.5.$

29. The image capturing system lens assembly of claim 25, wherein a curvature radius of the object-side surface of the second lens element is R3, a curvature radius of the image-side surface of the second lens element is R4, and the following condition is satisfied:

$-1.00 < (R3+R4)/(R3-R4) < 1.50.$

30. The image capturing system lens assembly of claim 25, wherein the axial distance between the first lens element and the second lens element is T12, a maximum image height of the image capturing system lens assembly is ImgH, and the following condition is satisfied:

$0.90 < T12/\text{ImgH} < 1.90.$

31. The image capturing system lens assembly of claim 25, further comprising:
    a reflective element disposed between the first lens element and the fifth lens element.
32. An imaging apparatus, comprising:
    the image capturing system lens assembly of claim 25; and
    an image sensor disposed on the image surface of the image capturing system lens assembly.
33. An electronic device, comprising:
    the imaging apparatus of claim 32.
34. An image capturing system lens assembly comprising five lens elements, the five lens elements being, in order from an object side to an image side along an optical path:
    a first lens element, a second lens element, a third lens element, a fourth lens element and a fifth lens element, each of the five lens elements has an object-side surface towards the object side and an image-side surface towards the image side;
    wherein the third lens element has negative refractive power; at least one of the object-side surface and the image-side surface of at least one of the first lens element to the fifth lens element comprises at least one inflection point;
    wherein the image capturing system lens assembly further comprises an aperture stop, an axial distance between the aperture stop and an image surface is SL, an axial distance between the object-side surface of the first lens element and the image surface is TL, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, a maximum among T12, T23, T34, T45 is ATmax, an axial distance between the image-side surface of the fifth lens element and the image surface is BL, a focal length of the image capturing system lens assembly is f, a focal length of the second lens element is f2, and the following conditions are satisfied:

$0.75 < SL/TL < 1.50;$ $0.78 < AT\max/f < 9.00;$ $2.00 < AT\max/BL < 7.00;$ $2.60 < TL/f < 5.00;$ $0 < T45/f < 0.90;$ and $-0.60 < f/f2 < 3.00.$ 35. The image capturing system lens assembly of claim 34, wherein the object-side surface of the second lens element is convex in a paraxial region thereof; a refractive index of the third lens element is N3, a refractive index of the fifth lens element is N5, and the following condition is satisfied:

$1.60 < (N3+N5)/2 < 1.90$.

36. The image capturing system lens assembly of claim 34, wherein an f-number of the image capturing system lens assembly is Fno, a maximum distance between an optical effective region of the object-side surface of the first lens element and an optical axis is Y11, the axial distance between the first lens element and the second lens element is T12, the axial distance between the second lens element and the third lens element is T23, the axial distance between the third lens element and the fourth lens element is T34, the axial distance between the fourth lens element and the fifth lens element is T45, the maximum among T12, T23, T34, T45 is ATmax, and the following conditions are satisfied:

$1.60 < Fno < 2.5$; and $1.80 < AT\max/Y11 < 3.40$.

37. The image capturing system lens assembly of claim 34, wherein a maximum distance between an optical effective region of the object-side surface of the first lens element and an optical axis is Y11, a maximum image height of the image capturing system lens assembly is ImgH, and the following condition is satisfied:

$0.34 < Y11/ImgH < 0.70$.

38. The image capturing system lens assembly of claim 34, wherein a central thickness of the first lens element is CT1, a central thickness of the second lens element is CT2, a central thickness of the third lens element is CT3, a central thickness of the fourth lens element is CT4, a central thickness of the fifth lens element is CT5, a maximum among CT1, CT2, CT3, CT4, CT5 is CTmax, and the following condition is satisfied:

$0.50 < CT1/CT\max \leq 1.0$.

39. The image capturing system lens assembly of claim 34, wherein the focal length of the image capturing system lens assembly is f, a curvature radius of the image-side surface of the second lens element is R4, the axial distance between the fourth lens element and the fifth lens element is T45, and the following conditions are satisfied:

$-2.70 < f/R4 < -0.40$; and $0 < T45/f < 0.60$.

40. The image capturing system lens assembly of claim 34, wherein an Abbe number of one of the lens elements is Vi, and a refractive index of the lens element is Ni, and at least one of the five lens elements satisfies the following condition:

$5.0 < Vi/Ni < 11.9$, wherein $i=1, 2, 3, 4, 5$.

41. The image capturing system lens assembly of claim 34, wherein there is a relative displacement between the first lens element and the fifth lens element.

* * * * *

UNITED STATES PATENT AND TRADEMARK OFFICE
CERTIFICATE OF CORRECTION

PATENT NO. : 12,422,650 B2
APPLICATION NO. : 17/839779
DATED : September 23, 2025
INVENTOR(S) : Hsin-Hsuan Huang and Meng-Kuan Cho Page 1 of 2

It is certified that error appears in the above-identified patent and that said Letters Patent is hereby corrected as shown below:

On the Title Page

Immediately following the prior publication data of "US 2023/0141883A1 May 11, 2023" please insert item --(30) Foreign Application Priority Data, TW 110141420--.

In the Claims

In Column 64, Line 57, Claim 1, please delete "1.05<(R3+R4)/(R3–R4)<0.70", and substitute therefore: "-1.05<(R3+R4)/(R3–R4)<0.70".

In Column 64, Line 59, Claim 1, please delete "3.50<(R5+R6)/(R5–R6)<3.00", and substitute therefore: "-3.50<(R5+R6)/(R5–R6)<3.00".

In Column 64, Line 61, Claim 1, please delete "2.50<f/f45<0.88", and substitute therefore: "-2.50<f/f45<0.88".

In Column 64, Line 63, Claim 1, please delete "5.00<f34/f45<3.60", and substitute therefore: "-5.00<f34/f45<3.60".

In Column 66, Line 20, Claim 8, please delete "2.70<(R5+R6)/(R5–R6)<2.70", and substitute therefore: "-2.70<(R5+R6)/(R5–R6)<2.70".

In Column 66, Line 24, Claim 8, please delete "0.40<f123/f234<1.85", and substitute therefore: "-0.40<f123/f234<1.85".

Signed and Sealed this
Twenty-seventh Day of January, 2026

John A. Squires
*Director of the United States Patent and Trademark Office*

CERTIFICATE OF CORRECTION (continued)
U.S. Pat. No. 12,422,650 B2

In Column 67, Line 45, Claim 15, please delete "$0.74<SUR<1.50$", and substitute therefore: "$0.74<SL/TL<1.50$".

In Column 67, Line 65, Claim 17, please delete "$0.90<T12/IgH<1.90$", and substitute therefore: "$0.90<T12/ImgH<1.90$".